US012293640B2

(12) United States Patent
Colvin et al.

(10) Patent No.: US 12,293,640 B2
(45) Date of Patent: May 6, 2025

(54) SYSTEMS AND METHODS FOR CHANGING FUTURE GAME OUTCOMES BY DELAYING THE UTILIZATION OF RESULTS OF A RANDOM NUMBER GENERATOR

(71) Applicant: Gaming Arts, LLC, Las Vegas, NV (US)

(72) Inventors: David Colvin, Las Vegas, NV (US); Eric Colvin, Las Vegas, NV (US)

( * ) Notice: Subject to any disclaimer, the term of this patent is extended or adjusted under 35 U.S.C. 154(b) by 0 days.

(21) Appl. No.: 18/092,557

(22) Filed: Jan. 3, 2023

(65) Prior Publication Data

US 2023/0394925 A1 Dec. 7, 2023

Related U.S. Application Data

(63) Continuation of application No. 17/809,230, filed on Jun. 27, 2022, now Pat. No. 11,545,005, which is a continuation-in-part of application No. 17/649,541, filed on Jan. 31, 2022, now Pat. No. 11,741,789, which is a continuation-in-part of application No. 17/305,716, filed on Jul. 13, 2021, now Pat. No. 11,257,329, which is a continuation-in-part of application No. 16/886,449, filed on May 28, 2020, now Pat. No. 11,100,756, which is a continuation of application No. 16/576,709, filed on Sep. 19, 2019, now Pat. No. 10,692,329.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
None
See application file for complete search history.

(56) References Cited

U.S. PATENT DOCUMENTS

2014/0057693 A1* 2/2014 Watkins .................. G07F 17/32 463/20
2017/0263078 A1* 9/2017 Mound ................. G07F 17/329
2022/0335788 A1* 10/2022 Colvin .................... G07F 17/34

* cited by examiner

*Primary Examiner* — Ronald Laneau

(74) *Attorney, Agent, or Firm* — FisherBroyles, LLP; Rob L. Phillips

(57) ABSTRACT

A system and method for operating a game of chance. A gaming system includes one or more game displays, a user interface, at least one processor running executable instructions related to a game of chance and memory in communication with said at least one processor. The game of chance including one or more random number generators in communication with the at least one processor, wherein a player may selectively delay the processor from utilizing results from the at least one RNG to change a future game outcome by interacting with the gaming machine and preventing game play for a delay period.

96 Claims, 66 Drawing Sheets

Decreasing Frequency Variance with Increasing X

SYSTEMS AND METHODS FOR CHANGING FUTURE GAME OUTCOMES BY DELAYING THE UTILIZATION OF RESULTS OF A RANDOM NUMBER GENERATOR

CROSS-REFERENCE

This application is a continuation of U.S. patent application Ser. No. 17/809,230, filed Jun. 27, 2022, which is a continuation-in-part of, and claims priority to, U.S. patent application Ser. No. 17/649,541 filed Jan. 31, 2022 which claims priority to U.S. patent application Ser. No. 17/305,716 filed Jul. 13, 2021, now U.S. Pat. No. 11,257,329, which claims priority to U.S. patent application Ser. No. 16/886,449 filed May 28, 2020, now U.S. Pat. No. 11,100,756, which claims priority to U.S. patent application Ser. No. 16/576,709 filed Sep. 19, 2019, now U.S. Pat. No. 10,692,329 all of which are incorporated herein by reference for all purposes.

FIELD OF THE INVENTION

The embodiments of the present invention relate to systems and methods for generating prizes based on primary game outcomes driving a secondary game wherein associated prizes are awarded once prize blocks associated with the second game reach threshold points.

BACKGROUND

Casinos derive much of their gaming revenue from electronic gaming machines ("EGMs") such as slot machines. Unfortunately, even with the introduction of new technology (e.g., curved displays), slot machines and the like can become stale after even short game play sessions. Moreover, younger players do not tend to play traditional slot machines because they are not exciting or attractive to play. Therefore, as the player demographic continues to trend younger, new and exciting electronic games of chance are needed.

The slot machine bonus game is one of the seminal slot machine improvements in history. A bonus game is a secondary game triggered by the outcomes of the primary game. The most popular bonus game in history is the Wheel of Fortune slot machine. Wheel of Fortune includes a bonus wheel which is activated based on one or more pre-established primary game outcomes. Responsive to the bonus wheel being activated, the player is afforded the opportunity to spin the bonus wheel to win a bonus prize. The inclusion of the bonus wheel rendered the slot machine more exciting and entertaining. It is in this vein, that the industry must continue to advance.

Accordingly, the new system and method detailed herein involves driving secondary game prizes based on primary game outcomes. In one embodiment, a secondary game display depicts a video-based secondary game advancing dynamically responsive to pre-established primary game outcomes. In one embodiment, the primary game is a video-based slot game having multiple video reels wherein outcomes on certain of said reels drive associated sections of the video-based secondary game. In one such embodiment, the primary game includes one or more virtual dice, playing cards, icons, dominos, etc., which, when appearing on the primary game display, act to advance sections (e.g., prize blocks) of the secondary game toward a threshold point. Ultimately, when sections of the secondary game advance to a threshold point, a corresponding prize is awarded.

SUMMARY

The embodiments of the present invention relate to systems and methods for generating prizes based on primary game outcomes driving a secondary game wherein associated prizes are awarded once the secondary game reaches a threshold point.

In one embodiment of the present invention, a gaming machine includes a primary game display and secondary game display with the secondary game display mapped with one or more prize blocks arranged in a grid that generally mimics a primary game reel grid. The prize blocks can be any depiction including characters, animation, numeral values and the like representing different prize values. Each prize block has a prize value and a health value. When the health value of a prize block is exhausted (or reaches a threshold value) based on primary game outcomes, the prize block is destroyed and removed awarding its corresponding prize value. New prize blocks may fill voids left by removed prize blocks or the voids may be left blank without any associated prize value. The prize block may award prizes selected from a group consisting of; monetary, prize multipliers, free plays, advancement to a bonus game, merchandise, no value or credits, and/or comps.

In one embodiment, dice appearing on the primary game display randomly resolve into a pip value (e.g., 1-6). Each pip 'attacks' the prize block directly above it in the secondary game display. A single prize block may reside over one or more primary game reels such that dice appearing on multiple reels may serve to attack the same prize block. Such attacks deplete the health value of the corresponding prize block until the health value is exhausted and the block is destroyed awarding its corresponding prize value. While dice are used in one embodiment, those skilled in the art will recognize that any type of reel symbol or indicia may be used to facilitate the attack on the prize blocks. In one alternative example, virtual dominoes may be used to generate the attack on the prize blocks whereby the number of spots on each domino corresponds to the attack value. In another example, a simple attack integer may be displayed on the primary game reels.

In one embodiment, when a prize block is destroyed, it is removed from the secondary game display, the one or more prize blocks above the removed prize block lower into the vacated space and one or more new prize blocks are positioned at the upper portion of the secondary game display thereby filing the secondary game display with a new arrangement of prize blocks.

As detailed below, the secondary game facilitated by the prize block grid is dynamic and exciting as the secondary game prize blocks are destroyed and new prize blocks, with new depictions, are used to fill in the vacated spaces.

Other variations, embodiments and features of the present invention will become evident from the following detailed description, drawings and claims.

DETAILED DESCRIPTION

Figure 1:
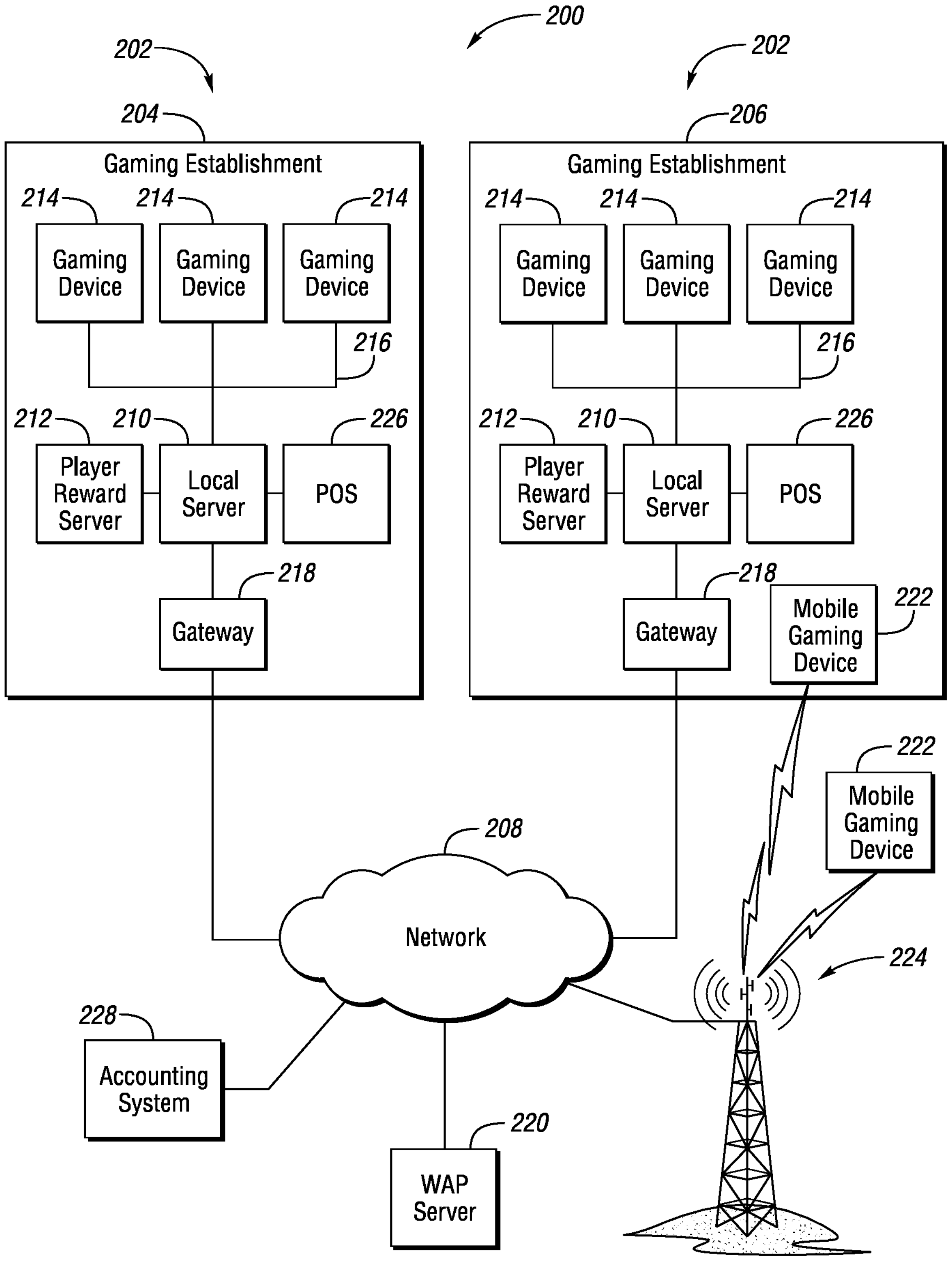
FIG. 1 illustrates a block diagram of a multiple casino property system of the type that may be used to facilitate the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements, which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wired, wireless, wireline, optical fiber cable, RF, Bluetooth and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the “C” programming language, AJAX, PHP, HTML, XHTML, Ruby, CSS or similar programming languages. The programming code may be configured in an application, an operating system, as part of a system firmware, or any suitable combination thereof. The programming code may execute entirely on the user’s computer, partly on the user’s computer, as a standalone software package, partly on the user’s computer and partly on a remote computer or entirely on a remote computer or server as in a client/server relationship sometimes known as cloud computing. In the latter scenario, the remote computer may be connected to the user’s computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a “gaming machine” should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

Those skilled in the art will recognize that certain types of EGMs, generally utilized in regulated casino environments, are still commonly referred to as “slot machines”. Although the etymology of the term “slot machine” was originally derived from a coin slot in the gaming machines at the time, coin slots have long since generally been replaced by payment input devices or bill validators which only accept paper currency or ticket-in-ticket-out vouchers and/or electronic fund transfer means, such as card readers, mobile device payment means or account interfaces. As a result, the term EGM and slot machine are used interchangeably and are defined to mean something different than a laptop or desktop computer, cell phones, tablet computer gaming devices and the like.

FIG. 1 illustrates a block diagram of a multiple property system that may be used to play a game of chance. This figure provides a view of exemplary gaming systems in one or more casinos. In one embodiment, a plurality of gaming devices 214 are connected to one or more servers 210 over a network 208, such as a wide area network (WAN) and/or a local area network (LAN). In one embodiment, the gaming devices 214 are electronic gaming machines (EGMs), otherwise known as “slot machines.” These may be classified as Class II, Class III, video lottery terminals (VLT), or the like. EGMs may present either one or a plurality of games to the player such as video reels, video poker, video keno, video bingo, electronic table games, and the like. In another embodiment, the gaming devices are gaming kiosks or terminals. Alternatively, the gaming devices may include remote gaming devices, for example, cellular phones, laptop or desktop computers, and/or any other suitable devices. The servers may include one or more local servers within a gaming establishment and/or one or more wide area progressive (WAP) servers connected to the local servers and/or to the gaming devices through the network.

In one embodiment, each gaming device presents either one or a plurality of games of chance to a player to enable the player to select and play the games of chance. In addition, each gaming device may include a randomization device, such as a random number generator (RNG) and/or a permutation generator, that is used to play a selected game on the gaming device. The randomization device may be used to randomly determine a game outcome for the game of chance. For example, if the player selects a game of bingo to be played on a gaming device, the gaming device uses the randomization device to select a plurality of house indicia from a pool of indicia to be used during the game. In another embodiment, at least some aspects of the game are provided by one or more servers, such as a local server 210, a wide area server, a local area progressive server (LAP), or a wide area progressive server (WAP) 220. The server or servers may include a randomization device for randomly selecting the house indicia in the bingo game or any other wagering event.

In the example of a video poker game, either one or a plurality of games are presented to the player. After game selection and wagering, a number of playing cards, generally selected from a 52-card deck, are distributed to the player. In the case of draw poker or its many variants, the player selectively chooses to retain one or more of the original cards dealt and to discard those cards not chosen to be retained. The discarded cards are then replaced by new cards. If the player obtains a predefined winning combination of cards, the player wins an amount associated with the particular combination of cards.

In the example of mechanical, electromechanical, or video reel machines, the games may include a number of mechanical or simulated rotating reels that are arranged in a horizontal configuration forming columns or vertical configurations forming rows. Alternatively, simulated rotating reels may be arranged in a vertical configuration forming columns or vertical configurations forming rows. One or a number of rows are presented to the player to allow for one or many different winning pay lines. Pay lines may be straight across or designed in any convenient fashion. A typical game many include five reels or columns and three or four rows or the like or a vertical configuration of five rows and three or four columns and the like.

In the example of the bingo game, the house indicia are compared to a plurality of player indicia that are included within a pattern selected for one or more player cards. If at least some of the player indicia within the pattern are matched by the house indicia, the player may win a prize based on the number of house indicia that have been matched and an associated pay table.

In the example of a keno game or a keno-related game of chance, the gaming device uses the randomization device to randomly select a plurality of house indicia in a similar manner as described with respect to the game of bingo. However, twenty house indicia are typically randomly selected or called from a pool of 80 house indicia, although other sizes of house indicia pools may be used. The called house indicia are compared to a plurality of player indicia to determine how many player indicia are matched by the house indicia and may be irrespective of a pattern of the player indicia. The embodiments described herein may include allowing the player to select the number of and specific player indicia to be utilized for a keno game or may include an automated or quick pick selection. For example, a player may select one player indicia or spot to play a 1 spot game, 2 player indicia or spots for a 2-spot game, 3 player indicia or spots for a 3-spot game, etc. Embodiments may also require a minimum number of player indicia or spots to match to win a game. For example, 10-player indicia or 10 spot game may require a minimum of 5-player indicia or spots to match the randomly selected player indicia. Embodiments may also include a maximum number of player indicia or spots that are playable. For example, in an 80-number game, the maximum number of house indicia or spots selectable by the player may be confined to 20 numbers or less or more. Accordingly, in an 80-number game, the minimum number of player indicia or spots may be 2 and the maximum player indicia or spots may be 20. The player may win one or more prizes based on the number of player indicia matched by the called house indicia.

In the example of sports wagering, a player may be seated in a player area that may include a betting terminal which includes a monitor and input means. A player may make or place periodic wagers on a variety of sporting events.

As the player plays the games, the gaming device and/or a server or another computing device tracks data representative of the gameplay of the player (referred to herein as "gameplay data"), such as a theoretical win or loss, a past history, wager amounts, a number of plays per hour, wager amounts relative to an amount of time spent playing games on the gaming device, a number of wins or losses of the player, a cumulative amount wagered by the player, an amount of money won or lost by the player, and/or any other suitable data. The gameplay data is used to determine whether the player is eligible to receive a comp. The comp may include, for example, one or more free beverages, free meals, free tickets, reduced price meals or tickets, and/or the like.

In one embodiment, a comp indicator is included within, attached to, or displayed on the gaming device. The comp indicator may be energized or activated in any conventional way to indicate status including displaying on the game monitor, player tracking module or the like. The comp indicator is used to display to the player and/or to gaming establishment employees whether the player is eligible to receive the comp. If the gameplay data indicates that the player has reached a predetermined threshold of play and/or wagering activity, for example, the player is determined to be eligible to receive the comp. The comp indicator may then be activated to notify the player and/or gaming establishment employees that the player is eligible to receive the comp. The comp indicator activation may include any suitable means for displaying comp status, comp eligibility, change in comp status, incremental progress toward comps, continual progress toward comps, reduction in comp status after awarding of comps, etc., and may include any visual or sensory indicator or indication. Gaming establishment employees may then take action in response to the notification, such as by awarding the comp to the player. While the comp indicator is sometimes described as being a visual indicator, it should be recognized that the comp indicator may notify the player and/or gaming establishment employees using any suitable sensory perception, via printed comp tickets or the like.

A technical effect of the systems and methods described herein includes one or more of: (a) presenting a game of chance to a player on a gaming device; (b) enabling the player to input money or credits or physical items representing money or credits for use in the game of chance using a payment input device of the gaming device; (c) enabling the player to withdraw money or credits from the gaming device using a payment output device of the gaming device; (d) providing a comp indicator attached to or integrated within the gaming device, wherein the comp indicator is configured to provide an indication if the player is determined to be eligible for a comp; (e) generating gameplay data associated with the game of chance or skill-based game of chance for the player using the gaming device; (f) receiving input from the player at the gaming device to enable the player to play the game of chance; (g) randomly determining a game outcome for the game of chance using a randomization device; (h) transmitting the gameplay data from the gaming device to a computing device; (i) determining, by the computing device, whether the player is eligible for the comp based on the gameplay data; and (j) transmitting data representative of whether the player is determined to be eligible for the comp from the computing device to the gaming device.

Comp monitoring or accounting may also be monitored locally or remotely by management to insure proper compliance. Systems and methods described herein may be self-contained within a gaming device or may reside in a server-based system such as a slot accounting system (SAS).

As used herein, a "game of chance" or "game" refers to a manual or an electronic game that is played by a player in which an outcome of the game of chance is at least partially based on chance or a random selection of game components or skill-based game components. A game may be categorized by a game variety and/or a game size, for example. It should be recognized by those of ordinary skill in the art that the term "random" is not limited to true randomness, such as truly random numbers. Rather, pseudorandom numbers and pseudorandom algorithms are included within the meaning of "random." In addition, those of ordinary skill in the art will recognize that permutation generators may additionally or alternatively be used to generate player card indicia or other game components.

Gaming devices described herein may use real money for play or may utilize a credit-based system in which the credits used for the games may or may not have a cash value. Similarly, prizes for the games may be in the form of credits, cash, and/or physical prizes such as televisions, automobiles, or the like.

A "local game" is a game that is played by players within a predetermined location, such as within a single gaming establishment, or players playing the game across a local area network. A "local prize" or a "local payout" (including a local progressive prize or a local progressive payout) is a prize that may be won during a local game.

As used herein, the terms "connect" and "couple" are not limited to only including direct connections. Rather, unless otherwise specified, indirect connections are included within the definitions of "connect" and "couple." For example, two devices may be considered to be connected together even if there are other devices or components connected between the two devices. Any suitable means to connect or couple devices or components together may be used.

A player reward card refers to a physical or electronic card, token, or other device or data that enables a system to identify a player in connection with, among other things, a reward program or campaign. Accordingly, the player reward card may serve to identify the player and may enable gameplay, credits, funds, or other data to be associated with the player. In addition, player card tier levels may be established to denote the level of player play or relative worth to the casino operator.

FIG. 1 is a block diagram of a system 200 that may be used to play one or more games of chance, such as video poker, video slots, sports betting, bingo, keno or any the wagering game. The games of chance may be played by a player against other players or may be played by the player against the house.

System 200 is operated using components and devices within one or more gaming establishments 202, such as a first gaming establishment 204, a second gaming establishment 206, and a third gaming establishment 209. It should be recognized that any suitable number of gaming establishments 202 may be provided within system 200. Accordingly, system 200 is not limited to including two gaming establishments 202 as illustrated. In one embodiment, gaming establishments 202 are locations in which devices (e.g., gaming devices) that play or operate at least a portion of the game of chance are located. For example, gaming establishments 202 may be casinos, racetracks, bingo halls, keno parlors, or any other establishments. In another example, gaming establishments 102 may be residences or businesses in which one or more devices are located for playing or operating the game of chance. Gaming establishments 202 may additionally or alternatively include any combination of the examples described herein.

In one embodiment, gaming establishments 202 are physically remote from each other and are communicatively connected to at least one network 208, such as a wide area network (WAN), a metropolitan area network (MAN), and/or the Internet, for example. Alternatively, the gaming establishments 202 may be separate rooms or sections of a casino or another facility that are communicatively connected by network 208. It should be recognized that network 208 may be a wired Ethernet network, a wireless Ethernet network, a combination of wired and wireless Ethernet networks, or any other suitable wired and/or wireless network.

In one embodiment, each gaming establishment 202 includes a local game server 210 (referred to herein as a "local server") and a player reward server 212. Local server 210 and player reward server 212 may alternatively be implemented as or within a single server. The local server 210 is coupled to a plurality of the gaming devices 214 through an internal network 216, such as a private local area network (LAN) within the gaming establishment 102, for example. The gaming devices 214 may be located in separate gaming establishments 202, or within the same gaming establishment 202. In one embodiment, a gateway 218 is provided to enable the local server 210 of each gaming establishment 202 to securely connect to the network 208.

In one embodiment, the local server 210 is a server computer (or "server") that monitors and controls the games played on gaming devices 214, including local games. In one embodiment, the local games include games that are played against the house and/or that are played against other players within gaming establishment 202.

In addition, the local server 210 may administer other background tasks that enable games to be played on the gaming devices 214. For example, the local server 210 may facilitate authenticating gaming devices 214 and the players using the gaming devices 214 and may facilitate allocating payments or credits between players and the house. The local server 210 may include payment processing capabilities to enable players to receive electronic funds from a bank or another financial institution or to deposit electronic funds to the bank or financial institution. Alternatively, the payment processing capabilities may be included in a separate server or another device that is communicatively connected to the local server 210. In addition, the local server 210 may interface with the player reward server 212 to facilitate tracking and administering player rewards. Each gaming device 214, group of gaming devices 214, local servers 210, player reward servers 212, or the like may collect and/or generate data desired for accounting purposes, such as for use in slot accounting systems.

In one embodiment, the local server 210 may enable the gaming devices 214 within the gaming establishment 202 to participate in one or more games that share one or more progressive or pari-mutuel prizes with other gaming establishments 202 and/or gaming devices 214. While progressive prizes are described in embodiments herein, it should be recognized that pari-mutual prizes may be substituted as desired, and vice versa. In such an embodiment, each local server 210 may be coupled to a wide area progressive (WAP) server 220 that administers the prizes. For example, the WAP server 220 receives data from each local server 210 and/or from gaming devices 214 regarding an amount wagered by each player playing the game. WAP server 220 may allocate a portion of each wager to the prizes and may communicate the current prize amounts to local servers 210 and/or to the gaming devices 214.

The gaming devices 214 may include one or more kiosks or electronic gaming machines (EGMs) (also known as "slot machines"). The gaming devices 214 may additionally or alternatively include one or more desktop computers or one or more mobile gaming devices 222, such as, without limitation, cellular phones, tablet computing devices, and/or laptops. Mobile gaming devices 222 may connect to local server 210, WAP server 220, and network 208 via a wireless data network represented by cell tower 224. For example, mobile gaming devices 222 may connect to any suitable network 108 (and thereby to local servers 210 and/or WAP server 120) via a "3G", "4G" or a "5G" wireless data network. It should be recognized that mobile gaming devices 222 may additionally or alternatively connect to network 208 using another suitable wireless network, such as a wireless Ethernet network. For convenience, gaming devices 214 described herein may also include mobile gaming devices 222.

One or more point-of-sale ("POS") terminals 226 or redemption kiosks may also be included within each gaming establishment 202 to enable players to "cash out" winnings from one or more gaming devices 214 and/or to perform other account management activities related to player accounts. The POS terminals 226 may be connected to the local server 210, for example, and/or to the WAP server 220 as desired.

In addition, the system 200 may include an auditing system 128 coupled to WAP server 220, the local server 210, and/or a gaming device 214, for example, through network 208. Accounting (auditing) system 228 may be used to audit and/or track components of system 200 to ensure compliance with applicable regulations.

In one embodiment, a plurality of gaming devices 214 having different operating systems and/or system architectures may connect to the local server 210 or to another suitable server to play one or more games of chance. In such an embodiment, the gaming devices 214 may be used to play a session bingo game, for example, or any other game of chance.

During operation, the player utilizes or selects a gaming device 214 and initiates a gaming session for playing one or more games of chance ("Games"). Optionally, the player inserts a player reward card or enters a player reward number or other identification information into gaming device 214. If the identification information is entered, the gaming device 214 may transmit the identification information to local server 210 for authentication, or authentication may be accomplished locally within the gaming device 214. The local server 210 communicates with player reward server 212 to establish the player's identity and to associate the gameplay with the player account. The local server 210 authenticates the player and gaming device 214 and authorizes the player to play the game or games on gaming device 214 if desired or required.

When game play is initiated, during selection of the game, or during play of the game, the player may be required to purchase or generate credits. The player may purchase or generate credits by inserting cash or a ticket-in-ticket-out voucher into gaming device 214 or another device. Cash, ticket-in-ticket-out vouchers, credit cards or debit cards are examples of physical items associated with the gaming device. Alternatively, or additionally, the player may transfer credits or cash to the gaming device 214 from banking accounts, credit accounts, gaming establishment accounts, and/or gaming company accounts. In one embodiment, computer-generated credits may be used with gaming device 214, for example, as part of a free-to-play game.

The player selects a game to play and enters a wager on the gaming device 214. The gaming device 214 transmits data representative of the selected game and the wager to the local server 210. If the player selects a game that is at least partially operated by the WAP server 220 or that includes one or more progressive prizes administered by WAP server 220, local server 210 transmits the wager and game information and/or selection to WAP server 220. The WAP server 220 may increment the progressive prizes based on the wager received from the player and may communicate the updated prize amounts via the network 208 to all other players (via associated gaming devices 214) playing to win the progressive prizes.

The player plays the game on the gaming device 214. The following gameplay is described as being administered by the WAP server 120. However, it should be recognized that the gameplay (i.e., the play of the game of chance) may be alternatively or additionally administered by the local server 210 and/or the gaming device 214. For example, if the gaming device 214 is a cellular phone or a tablet computing device, the gameplay may be administered through an application installed on the gaming device 214.

In one embodiment, the player may play a game of bingo by selecting a game or game type, one or more player cards, selecting one or more winning patterns for the player cards, and/or selecting one or more numbers or other player indicia for the player cards using the gaming device 214. The selected player cards, winning patterns, and player indicia are transmitted to WAP server 220. The player cards are included within one or more game tickets issued by WAP server 220, and the game tickets are communicated to the gaming device 214 via the network 208 and the local server 210. The WAP server 220 selects or receives randomly generated house indicia and compares the house indicia to the player indicia and the pattern or patterns selected for the player cards. Alternatively, the functions described herein (e.g., comparing the house indicia to the player indicia and the pattern or patterns selected for the player card) may be performed in the gaming device 214. It should be recognized that the house indicia may be randomly generated using a randomization device, such as hardware, firmware, and/or software-based random number generator (RNG), a ball blower or console, a ball cage, and/or any other suitable device or machine that enables numbers or other house indicia to be randomly generated. In an alternative embodiment, the WAP server 220 (or another device) may designate a server, computer, or another device to provide randomly selected house indicia during the game and may receive the house indicia from the designated device.

WAP server 120 determines whether the player wins a prize based on the comparison of the house indicia to the player indicia. For example, WAP server 120 determines whether the player indicia within the pattern or patterns selected for each card match the house indicia that were randomly determined (sometimes also referred to as the house indicia that were "called"). If the player indicia within a pattern match the called house indicia, the player may win a prize based on a pay table associated with the game. The prize may be one of the progressive prizes or the prize may be a fixed prize identified in the pay table. WAP server 120 determines the appropriate payout to be paid to the player based on the pay table and transmits data representative of the payout to local server 110.

Local server 110 receives the payout data and credits the player account accordingly. In addition, local server 110 may transmit the gameplay data and/or payout data to player reward server 112 to enable player reward server 112 to update the player history and other gameplay data for the player. When the player is done playing, the player may "cash out" some or all of the credits in the player account or may deposit the credits into the player account using POS terminal or kiosk 126, for example. The player account may be stored on gaming device 114, local server 110, or player reward server 112, for example.

In one embodiment, the player may enter the wager and/or may initiate play of the game on a first gaming device 214 and may complete the gameplay on a second gaming device 214. Alternatively, the player plays the game on the first gaming device 214 and receives the results of the gameplay (e.g., whether the player won and how much the winnings are) on the second gaming device 214. For example, the player may begin playing the game on a kiosk or electronic gaming machine, and may complete the game or view the results of the game on a cell phone. In such an embodiment, the WAP server 220 and/or local server 210 may transmit the player's gameplay data from the first gaming device 214 to the second gaming device 214.

Figure 2:
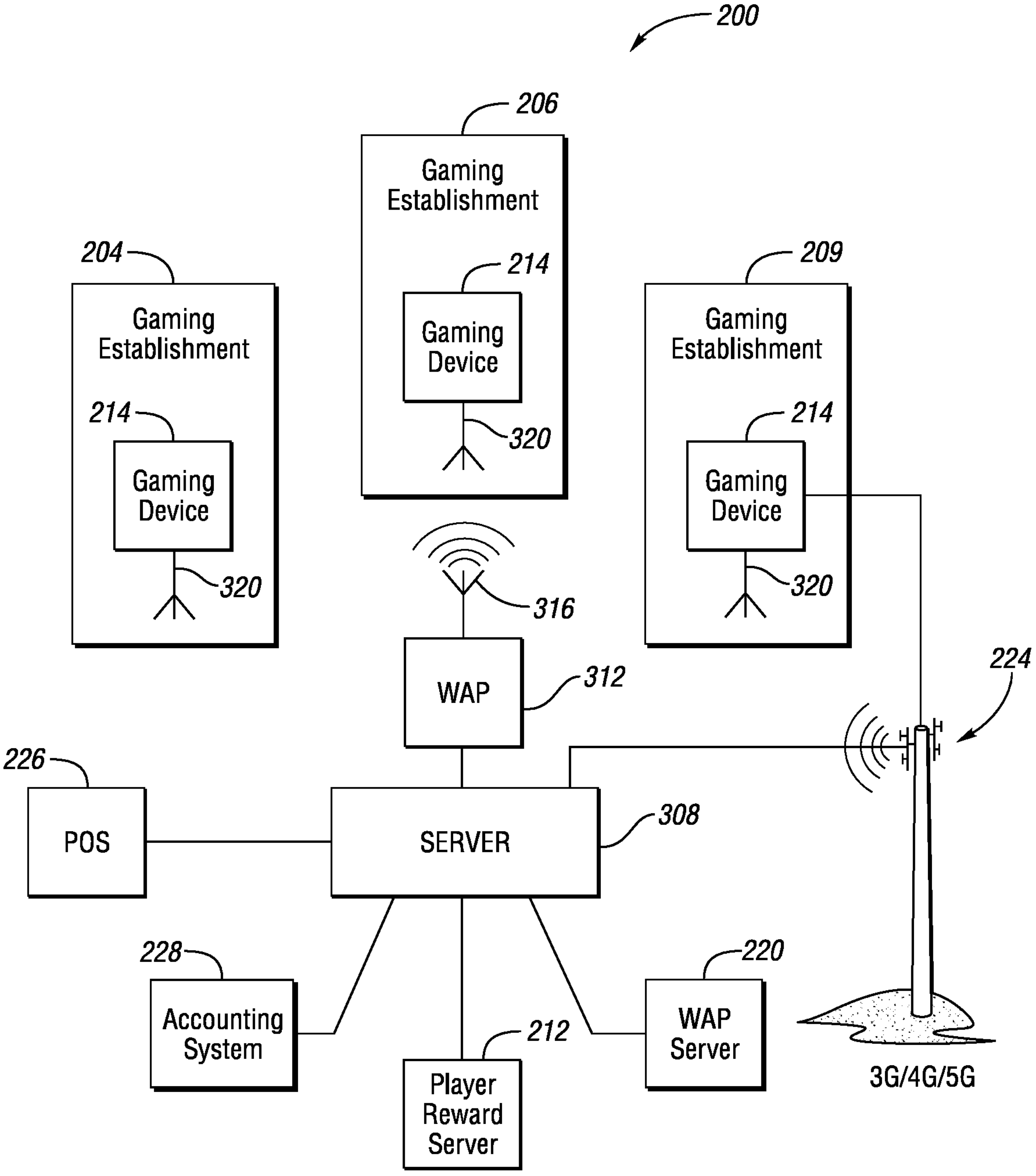
FIG. 2 illustrates a block diagram of a wireless network system of the type that may be used to facilitate the embodiments of the present invention.

FIG. 2 is a block diagram of another system 200 that may be used to play one or more games of chance, such as a slot, bingo, keno, or any game of chance. Unless otherwise specified, the system 200 is similar to system 200 (shown in FIG. 1) and similar components are labeled in FIG. 2 with the same reference numerals used in FIG. 1. It should be understood that more or less components may be included within the various embodiments described herein.

In the embodiment shown in FIG. 2, the system 200 includes a plurality of gaming devices 214 that are positioned in a plurality of gaming establishments 202. Gaming devices 214 may connect to a server 308 through a wireless access point 312. The wireless access points 308 includes an antenna 316 configured to wirelessly transmit to and receive signals from antennas 320 associated with the gaming devices 214. Wireless communications systems and methods are understood by one of ordinary skill in the art and as such are not described in detail here. For example, the gaming devices 214 may be playing one or more stand alone or Internet-based games that connect to the WAP server 220 through a server 308. In some embodiments, one or more gaming devices 214 may connect to the WAP server 220 and/or to the player reward server 212 through a wireless data network as described above. Accordingly, the gaming devices 214 interact with WAP server 220 to play the game, and WAP server 220 performs the game administration and other tasks handled by local server 210 as described above in FIG. 1. In a similar manner, a POS terminal 226 may connect to a gaming device 214 and/or WAP server 220 via network 208. In other respects, system 200 performs in a similar manner as described above.

During operation, the player utilizes or selects a gaming device 214 and initiates a gaming session to play one or more games on the gaming device 214. The player inserts a player reward card or enters a player reward number or other identification information into the gaming device 214. The gaming device 214 transmits the identification information to player reward server 212 to establish the player's identity and to associate the gameplay with the player account. The player reward server 212 authenticates the player and the gaming device 214 and may authorize the player to play the game on the gaming device 214. In one embodiment, the gaming device 214 also transmits the identification information to the WAP server 220 to enable the WAP server 220 to associate the player with the game to be played. As previously described, player identification or authentication may be optional.

In another embodiment, the WAP server 220 authenticates the player using the player identification information in addition to, or instead of, the authentication performed by the player reward server 212. In some embodiments, the player reward server 212 is omitted and the functions of player reward server 212 are incorporated within WAP server 220.

The player selects a game to play and enters a wager using gaming device 214. If the player selects a game that is operated by the WAP server 220 or that includes one or more progressive prizes administered by the WAP server 220, the gaming device 214 transmits the wager and game selection to the WAP server 220. The WAP server 220 may increment the progressive prizes based on the wager received from the player and may communicate the updated prize amounts over the wireless channel via the server 308 to all other players (via associated gaming devices 214) playing to win the progressive prizes.

Although shown as a wireless network, it is contemplated that the same functionality may be implemented in a wired system, or a combination of both.

The player plays the game on gaming device 214. The following gameplay is described as being administered by the WAP server 220. However, it should be recognized that the gameplay may be alternatively or additionally administered by the gaming device 214. For example, if the gaming device 214 is a cellular phone or a tablet computing device, the gameplay may be administered through an application installed on gaming device 214.

Figure 3:
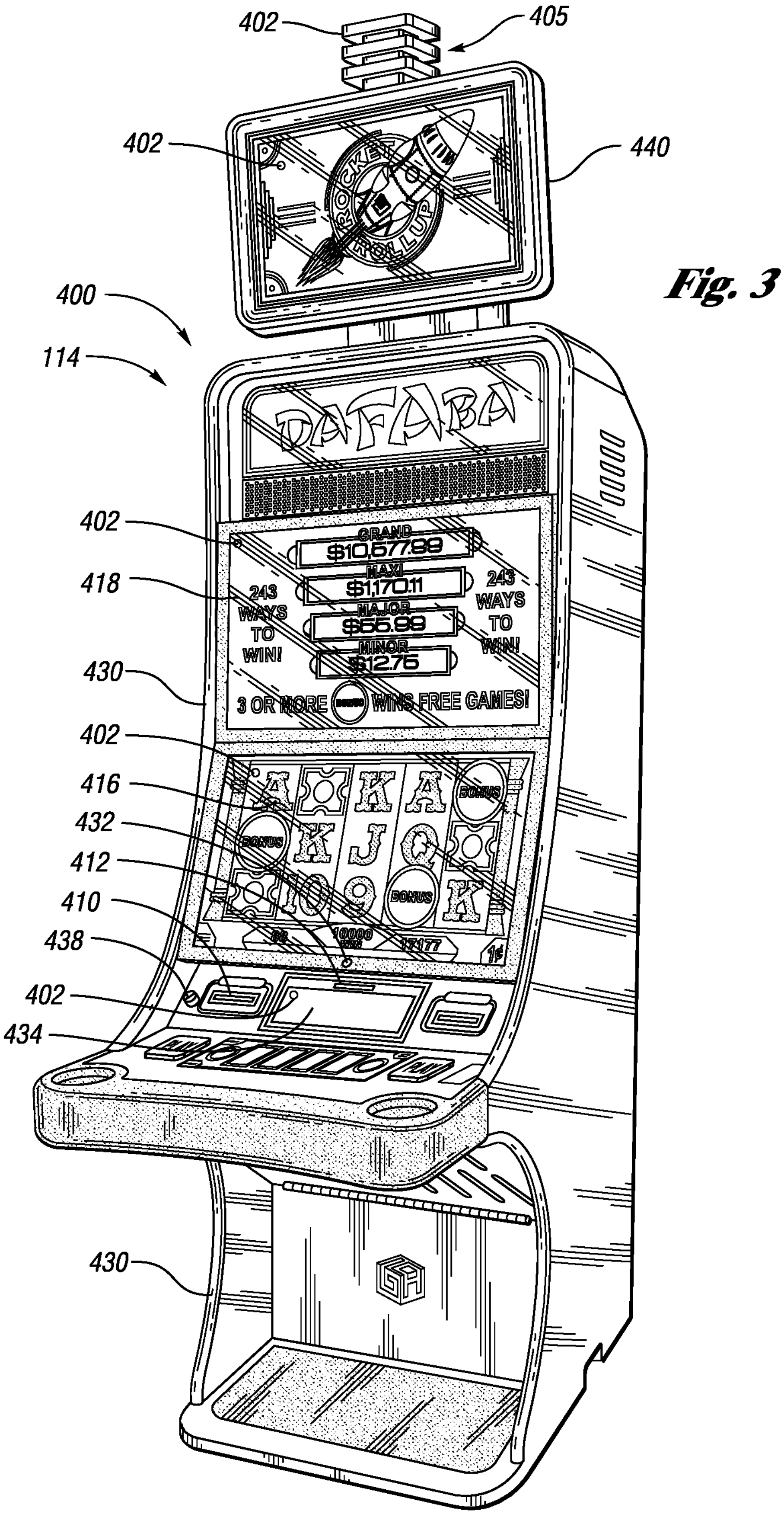
FIG. 3 illustrates an exemplary gaming machine of the type that may be used to facilitate the embodiments of the present invention.

FIG. 3 is an illustration of an exemplary electronic gaming machine (EGM) 400 that may be used with the systems described herein. In one embodiment, EGM 400 is a gaming device 114. EGM 400 may include one or more comp indicators 402, which may be incorporated into, or implemented by, a candle device 405, lighting element 430, displayed on monitor 416 or 418 displayed on the player tracking module 434, displayed as an LED indicator on button panel 436, or another device. One or more cameras 432 are provided with or as part of the EGM 400 to capture images of the player or other aspects of game play.

The comp indicator 402 visually notifies or alerts the player or casino staff when the player is determined to be eligible to receive one or more comps from a gaming establishment, for example. The comp indicator 402 may also display or otherwise notify the player of the progress towards attaining the comp or comps. Such comps may include, for example, one or more free beverages, free meals, free rooms, free credits for one or more games of chance, free prizes, free tickets to a performance, free services (e.g., spa services), and/or a discount or reduced price for one or more of the foregoing goods or services (e.g., with respect to a market price of the goods or services). In one embodiment, comp indicator 402 may include an audio notification or other sensory notification in addition to, or in place of, the visual notification. While comp indicator 402 is described as being used with EGM 400, it should be recognized that comp indicator may be used with any gaming device 114 and/or computing device.

The EGM 400 also includes a cabinet 406 configured to support and secure the elements of the EGM. The EGM 400 includes one or more screens such as an upper screen 418 and a lower screen 416. The screens 416, 418 may be configured to display game content to the player or any other information regarding the game, the casino, rules, pay tables, promotions, advertisements, or any multimedia content. Any type screen may be used, such as a flat screen or curved screen display. Additional lights 430 may be incorporated into the gaming machine to providing lighting for the player or ornamentation for the EGM 400.

A scanner 408 is provided to scan tickets which have bar or box codes, or for scanning money, cards, or any other media. In addition, scanner 408 may include other connectivity means such as blue tooth communications, near field communications or similar. Similar, a card reader 406 is provided to read one or more aspects of cards, such as player tracker or rewards cards, personal identification cards, and/or credit cards. The EGC 400 may also include a printer 410. The printer may print on any type media. Any type content may be printed including but not limited to cash out tickets, coupons, gift certificates, comps, prizes, gaming codes, redemption codes, bar or box codes, receipt, or any other type of information. Also, part of this embodiment is a cash acceptor 404 configured to accept paper money, ticket-in-ticket-out vouchers, or any type physical item associated with the gaming machine 400. A USB port 438 or other type charging or I/O port is provided for phone charging or interfacing the user's phone to the gaming machine. Numerous other buttons and player interface elements are presented with the gaming machine to accept player input. The screens 416, 418 may be configured as touch screens.

Figure 4:
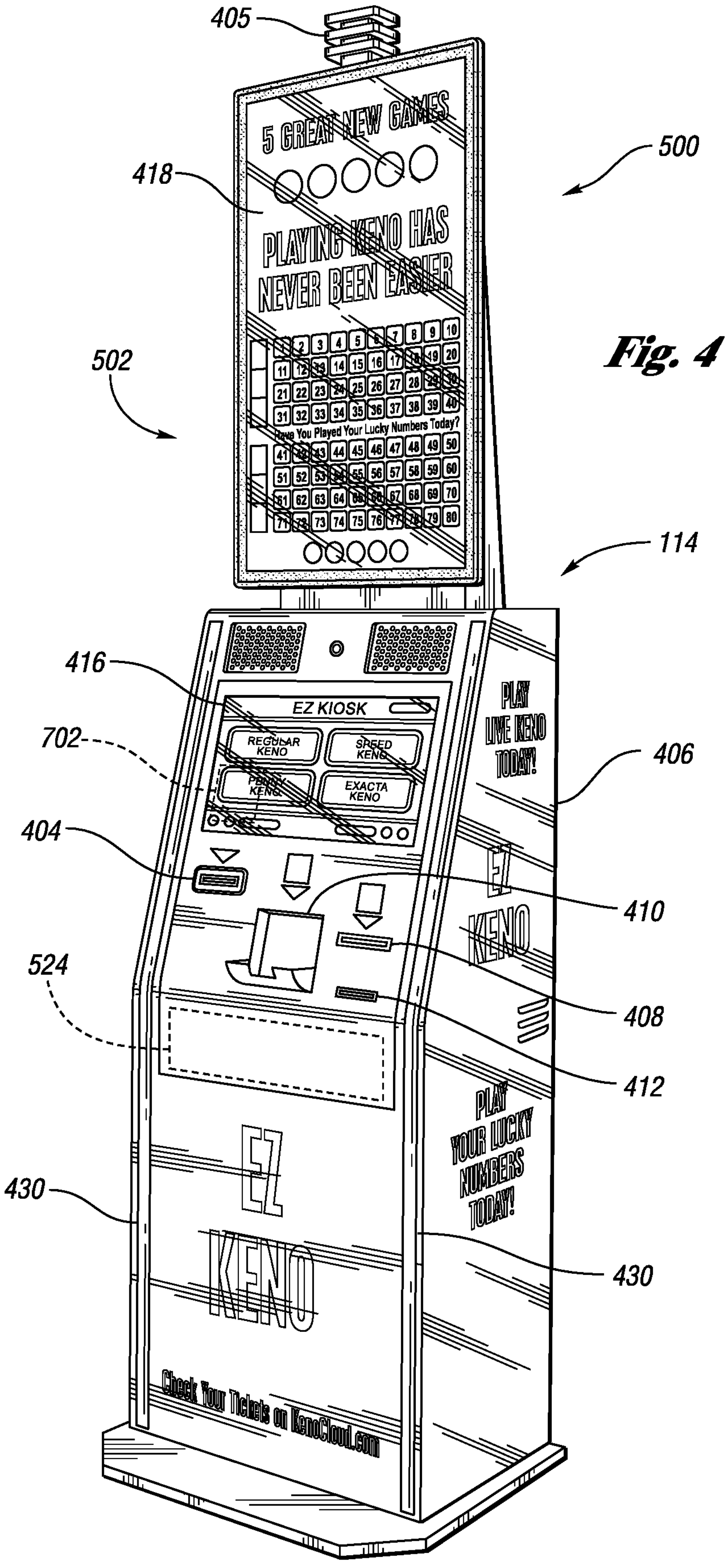
FIG. 4 illustrates an exemplary kiosk of the type that may be used to facilitate the embodiments of the present invention.

FIG. 4 is an illustration of an exemplary kiosk 500 that may be used with the systems described herein. In one embodiment, kiosk 500 is an electronic device provided for user to obtain information, conduct business, enter information, or any other use for which is computing device with communication capability is useful. The kiosk 500 may also be used for gaming for such games as keno, bingo, sports betting, etc. Unless otherwise specified, kiosk 500 shares some components and functionality with an EGM 400 (shown in FIG. 3) and similar components are labeled in FIG. 5 with the same reference numerals as used in FIG. 3.

Kiosk 500 may include one or more informational displays 502, which may be incorporated into, or implemented by, a display 418, such as first display 416 and/or second display 418. Also shown in association with the kiosk 500 is a keyboard 524 which may be fixed or fold down from the front of the kiosk to provide a user input device. The screen may be configured as a touch screen thereby allowing user input.

In use, a user may use the kiosk 500 for any use now known or developed in the future. Such uses include but are not limited to, check in or check out for a hotel, spa, restaurant, gaming area, pool, or any other location or service. The kiosk 500 may also be used to sign up for an event or program, such as but not limited to a player reward program, tournament, or event. The kiosk 500 may also be used to purchase tickets, goods or services. One of ordinary skill in the art will arrive at other uses for a kiosk 500.

Figure 5:
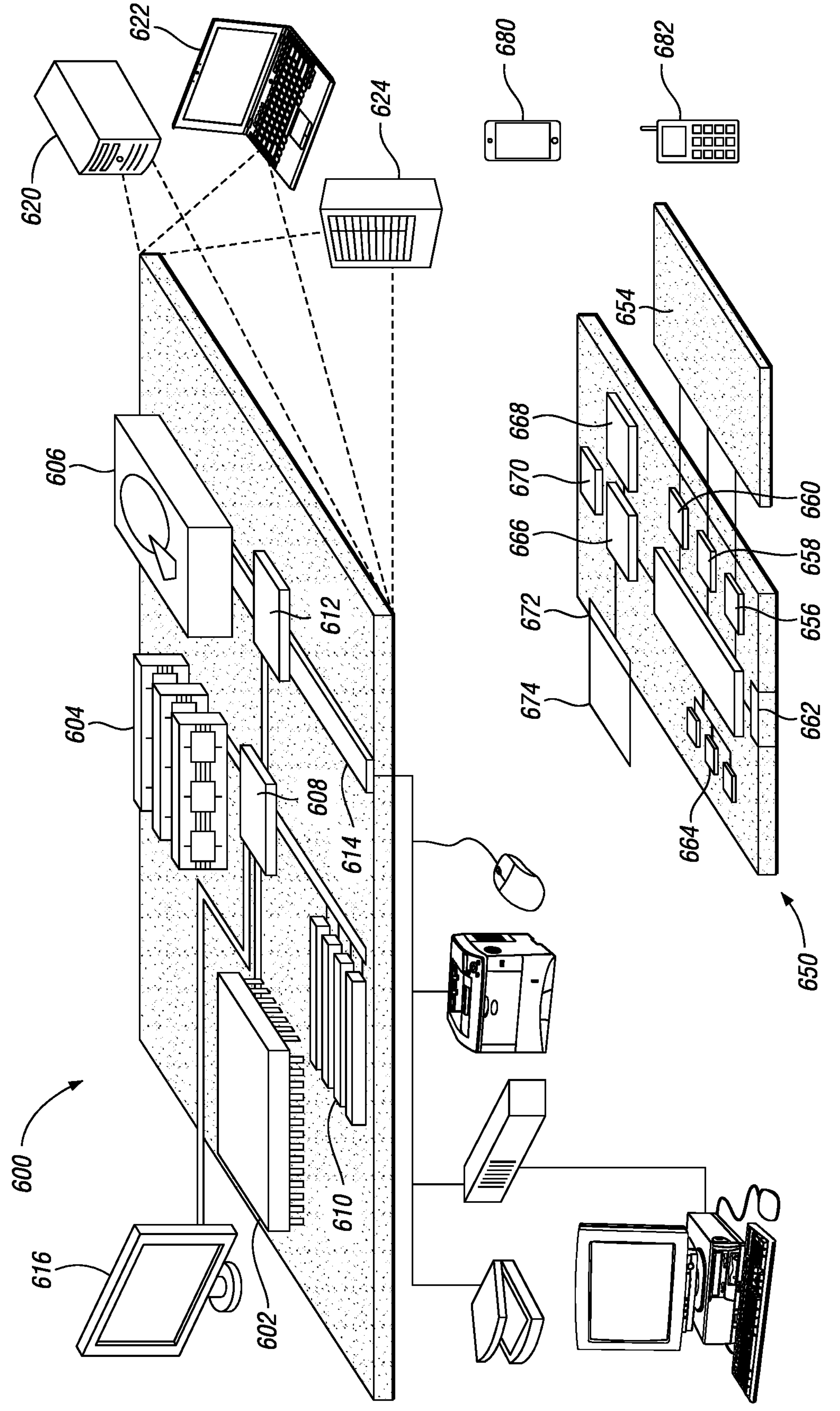
FIG. 5 illustrates a diagram of exemplary components of a computing device of the type that may be used to facilitate the embodiments of the present invention.

FIG. 5 is a schematic of a computing or mobile device, or server, such as one of the devices described above, according to one exemplary embodiment. Computing device 600 is intended to represent various forms of digital computers, such as smartphones, tablets, kiosks, laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 600 includes a processor 602, memory 604, a storage device 606, a high-speed interface or controller 608 connecting to memory 604 and high-speed expansion ports 610, and a low-speed interface or controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above and may include secure information also. Thus, for example, expansion memory 674 may be provide as a security module for device 650 and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Will, or other such transceiver (not shown). In addition, GPS (Global Positioning system) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 660. It may also be implemented as part of a smart phone 682, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices ("PLDs") used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, joy stick, trackball, or similar device) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 600 and/or 650) that includes a back end component (e.g., as a data server, slot accounting system, player tracking system, or similar), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 6:
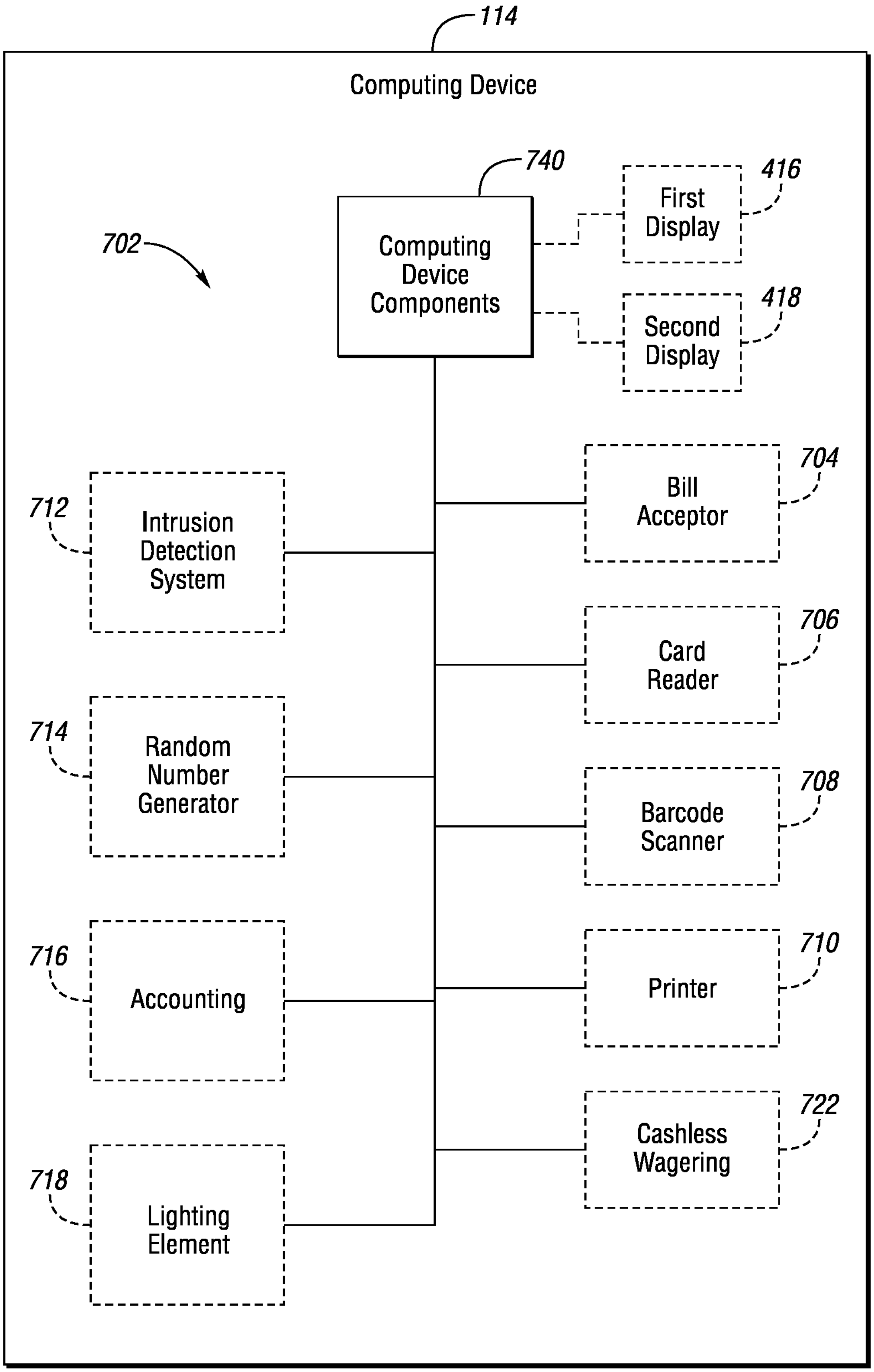
FIG. 6 illustrates a diagram of exemplary gaming device hardware of the type that may be used to facilitate the embodiments of the present invention.

FIG. 6 is a block diagram of a gaming device 114 that may be used with system 100 (shown in FIG. 1) or system 200 (shown in FIG. 2). As described above, the gaming device 114 is a computing device 400 (such as an EGM illustrate in FIG. 3) that includes a plurality of computing device components 702 positioned within a cabinet or other housing. In one embodiment, computing device component manager or processor 740 include first display 416 and second display 418. In addition, gaming device 114 may include a plurality of gaming device components 702 including a bill acceptor or bill validator 704, cashless wagering components 722, a card reader 706, a barcode scanner 708, a printer 710, an intrusion detection system 712, a randomization device 414 (such as an RNG), and an accounting interface 716 that are positioned within, or coupled to, the cabinet or housing of the gaming device. In one embodiment, gaming device 114 may also include at least one lighting element 418 coupled to the cabinet or housing.

Figure 7:
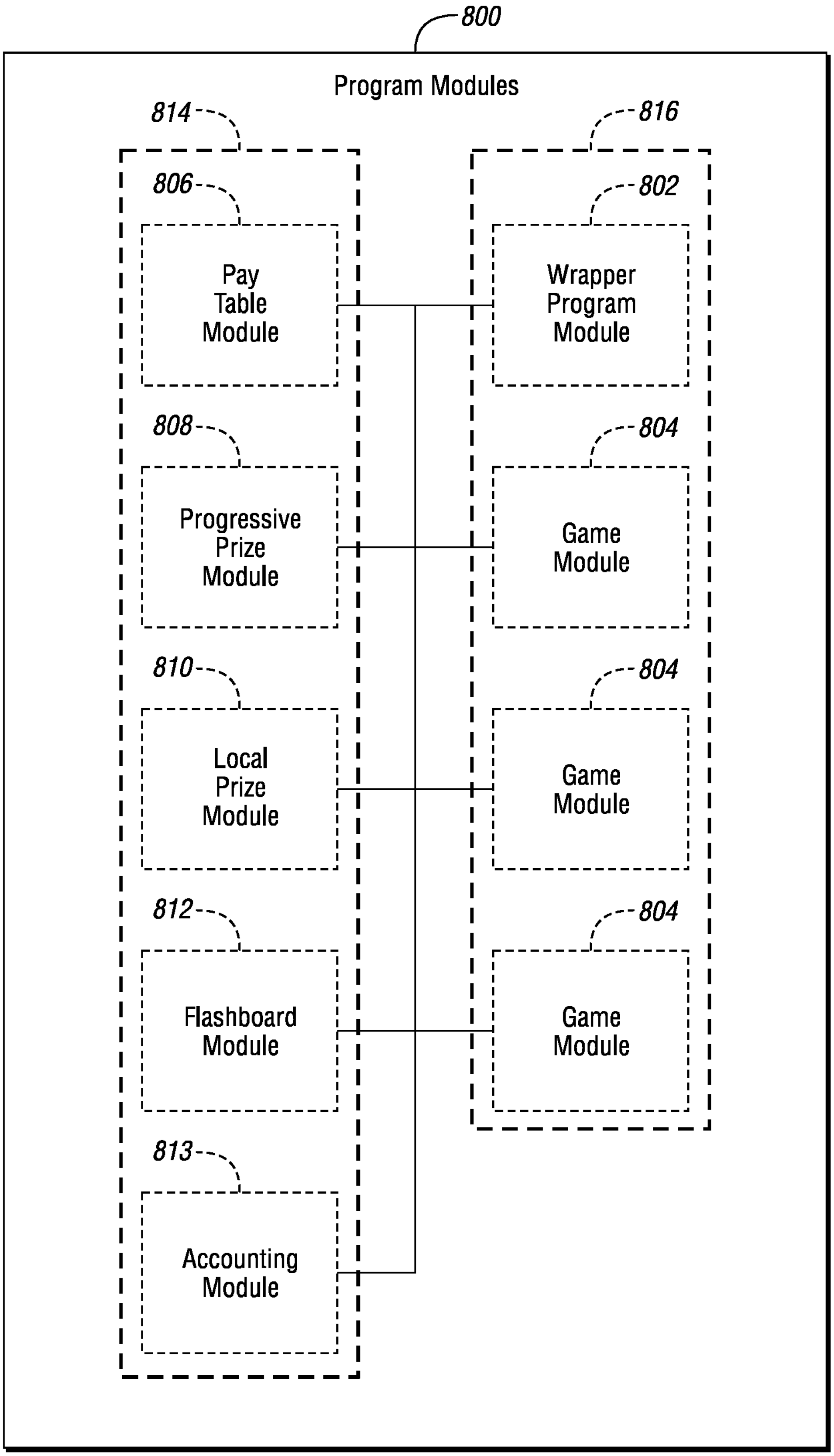
FIG. 7 illustrates a diagram of gaming device program modules of the type that may be used to facilitate the embodiments of the present invention.

It should be recognized that in some embodiments, a gaming device 114 may not include each gaming device component 702 illustrated in FIG. 7. For example, if the gaming device 114 is a cellular phone or a tablet, the gaming device may not include bill acceptor 704, card reader 706, barcode scanner 708, and/or printer 710. Rather, in some embodiments, the functions of each omitted gaming device component may be replaced by equivalent software, hardware, and/or firmware if desired. Optional components may be designated using dashed lines in the figures.

The bill acceptor 704 is a payment input device that enables gaming device 114 to receive and identify paper currency, ticket-in-ticket-out vouchers, or other physical items representing a monetary value. For example, bill acceptor 704 may receive and identify dollar bills or other currency that are inserted into bill acceptor 704. In one embodiment, bill acceptor 704 includes a scanner that scans paper currency inserted therein. The bill acceptor 704 may also include optical character recognition (OCR) capabilities that enable bill acceptor 704 to identify the amount of currency inserted into bill acceptor 704 from a scanned image of the currency. The bill acceptor 704 may transmit data representative of the amount of currency inserted into gaming device 114 to controller or processor 740, for example. The controller or processor 740 may cause the amount of currency to be converted into credits usable with the game and may add the credits to the player's account.

The card reader 706 is a device that "reads," or obtains data encoded in, player reward cards or other cards or media that are inserted into reader. In one embodiment, the card reader 706 is a magnetic or optical card reader that reads barcodes or magnetic strips included within a player reward card. In another embodiment, the card reader 706 wirelessly reads data encoded within the player reward card by accessing a chip, such as a radio frequency identification ("RFID") chip, embedded within the card or other similar authentication means. The card reader 706 reads the data obtained from the cards and transmits the data to the processor 740. In one embodiment, the card reader 706 is used to read player identification information encoded within player reward cards. The controller or processor 740 may transmit the player identification information to player reward server or other external component to identify the player, track past or present player activity, to allow for the transfer of funds or credits, to facilitate authenticating the player, and/or to authorize the player to play a game on gaming device 114. In one embodiment, the player may "log in" to the gaming device 114 by swiping the player reward card or otherwise passing the player reward card through or inserting the player reward card into the card reader 706. In another embodiment, the player may enter a number or other identifier associated with the player reward card into the gaming device 114, through the user interface devices for example, instead of using the card reader 706. In another embodiment, the insertion of the player reward card and player entering the identifier into user interface device may be combined. In yet another embodiment, the player may use a near field communication ("NFC") device to read the player reward card or data representative of the player card. Alternatively, the player reward card may be associated with an application on a cell phone or tablet which wirelessly communicates with the card reader or similar system.

In one embodiment, the barcode scanner 708 is an optical or a magnetic scanner that is optimized to read barcodes on media positioned proximate to the scanner and may also include RFID sensors, blue tooth connectivity, near field communications devices, etc. For example, the barcode scanner 708 may be optimized to read barcodes printed on paper receipts (sometimes referred to as "tickets" or vouchers, not to be confused with game or player tickets that may include player selected patterns, player indicia, and the like) and/or barcodes displayed electronically on a cell phone or tablet computing device. It should be recognized that the barcodes read by the barcode scanner 708 may be linear or one-dimensional barcodes, two-dimensional barcodes, or may even include data represented in a form other than a barcode. For example, the barcode scanner 708 may read images and/or text indicative of data, such as currency or credits, usable with gaming device 114. The barcode scanner 708 extracts the data from the barcode and transmits the data to controller/processor 740. For example, the barcode scanner 708 may scan a paper receipt or voucher that includes an amount of currency or credits usable by the player with a gaming device 114 and may transmit the amount of credits to the controller/processor 740. In such an example, the barcode scanner 708 may act as a payment input device. The controller/processor 740 may cause the amount of currency or credits to be displayed to the player on first display 716 (or on any display) to inform the player how many credits or currency is available to be used in playing a game.

The printer 710 may be used to print paper receipts (also known as tickets as described above), ticket-in-ticket-out vouchers, or other physical items representing a monetary value that indicate an amount of currency or credits available to the player. In many locations, the tickets or receipts may alternatively be referred to as vouchers. The printer 710 may act as a payment output device that enables a player to cash out or withdraw money or credits from the gaming device 114 by printing a voucher representative of the money or credits. In one embodiment, the printer 710 is a thermal printer that is fed by a roll of paper or any suitable paper stock. In a further embodiment, the roll of paper includes one or more watermarks that are visible when the printer 710 has printed the receipt on the paper. Alternatively, the printer 710 may print the watermark on the receipt, or may include another security mechanism to facilitate preventing counterfeit receipts from being made. For example, the printer 710 may include an image or a code on the receipt that identifies the gaming device 114, the printer 710, or another component of the gaming device along with a time that the receipt was printed, serial number, date, location, or other desired information. Other suitable security mechanisms may be used as well. It should be recognized that the barcode scanner 708 and the printer 710 may cooperate such that a security mechanism printed on the receipt may be received and validated by the barcode scanner, in conjunction with controller/processor 740, for example. The barcode scanner 708 may be located remotely from the gaming device 114, such as within a redemption kiosk, a casino cage, or the like.

The intrusion detection system 712 notifies the controller/processor 740 if a case, cabinet, or other housing enclosing components of the gaming device 114 is opened or modified without authorization. In one embodiment, the intrusion detection system 712 includes a pair of contacts that may be physical, magnetic, optical, or similar that transmit an electronic signal to the controller/processor 740 if the housing of the gaming device 114 is opened (e.g., if the opening of the housing separates the contacts). In another embodiment, the intrusion detection system 712 may include a light sensor that detects a change in the light within the housing of the gaming device 114. The intrusion detection system 712 may also include a key or another mechanism for disabling the operation of the game or transmission of the signal to the controller/processor 740 in the event that maintenance or other authorized or unauthorized access to the gaming device 114 components is desired or occurs.

In one embodiment, the intrusion detection system 712 includes a software program (a "monitoring program") that monitors one or more applications installed on the gaming device 114. For example, if the gaming device 114 is a cell phone that includes an application for playing the game thereon, the monitoring program may monitor the application to determine whether the application is modified without authorization. In one embodiment, the monitoring program stores a hash value or a digital fingerprint of the application when the application is installed and/or when the application undergoes authorized modification (e.g., if the application is updated or patched). However, if the monitoring program determines that the application has been modified without authorization, the monitoring program may cause a signal or another notification to be transmitted to the controller/processor 740. For example, the monitoring program may periodically calculate a new hash value of the application and/or create a new digital fingerprint of the application. The monitoring program then compares the new hash value and/or digital fingerprint to the stored hash value and/or digital fingerprint. If the hash values or fingerprints are different, the monitoring program may determine that the application has been modified without authorization. It should be understood that the hash value, the monitoring program, and/or the digital fingerprint may be generated by any suitable means and may be encrypted for additional security.

In response to the signal or notification from the intrusion detection system 712 and/or the modification program, the controller/processor 740 may perform one or more actions. For example, the controller/processor 740 may alert an administrator within gaming establishment by transmitting a message via communication device, may cause audio output device to emit an alarm or another audible alert, may cause a display 416, 418 to display an error or a warning, message, and/or may disable the application and/or the gaming device 114 such that the game is unable to be played on the gaming device.

In one embodiment, the randomization device is an electronic random number generator ("RNG") or pseudo random number generator ("PRNG") 714 or a permutation generator that may be implemented by a dedicated hardware device with associated embedded software. Electronic random number generators or pseudo random number generators are used interchangeably herein. Alternatively, the RNG 714 or the permutation generator may be implemented entirely in software executing on gaming device 114. The RNG 714 may be used to randomly determine a game outcome for the game of chance. In one embodiment, the RNG 714 or the permutation generator provides house or game draws of between 1 and n numbers, where n may be a suitable number based on the game type selected to be played by the player. The RNG 714 or the permutation generator may be programmed via hardware, software, or firmware to provide a particular range of numbers (or other indicia) and numbers of draws for a particular application. For example, in one embodiment of bingo according to the present disclosure, the RNG 714 or the permutation generator initially provides 24 randomly generated numbers having values between 1 and 75 for each game. In other embodiment other methods or numeric values may be used. Additional draws or numbers may be provided to play the game to conclusion depending on the particular implementation as described in greater detail herein. In addition, the RNG 714 or the permutation generator may be used to randomly select a plurality of player indicia to be used with one or more player cards. In embodiments in which a processor, such as controller/processor 740, is described as randomly selecting indicia, it should be recognized that controller/processor may interface with randomization device 714 or the permutation generator to select the indicia. In other embodiments, controller/processor 740 may include randomization device 714 or the permutation generator, or may execute instructions to perform the functions of randomization device 714 or the permutation generator.

The accounting interface 716 is used to interface with an accounting system, such as a slot accounting system, at or operated by a gaming establishment. Accounting interface 716 may include or be connected to a network interface, such as the communication device 308 for use in communicating gameplay data, player identification information, and/or other data to the accounting system for accounting and/or auditing purposes.

The lighting element 718 may include, for example, one or more LEDs, slot machine candles, fluorescent tubes, and/or any other element that emits light as controlled or directed by the controller/processor 740. In one embodiment, the lighting element 718 is activated to display light, or one or more lighting patterns, when the controller/processor 740 determines that a winning ticket was scanned via the card reader 706 or when the controller/processor otherwise determines that a ticket is a winning ticket. The lighting elements 718 may also be activated upon receipt of a signal from the intrusion detection system 712 (e.g., upon the determination that the gaming device 114 has been opened and/or modified without authorization) and/or upon any other suitable determination.

In one embodiment in which the gaming device 114 or kiosk may interface with another gaming device operated by or otherwise associated with the player, such as a cell phone, tablet, or another mobile device. For example, the gaming machine or kiosk may be configured to transmit a result of one or more games of chance to the player's mobile device to notify the player whether one or more player cards or game tickets are winning cards or tickets.

FIG. 7 is a block diagram of a plurality of program modules 800 that may be used with the systems shown and described herein to administer one or more games of chance. In one embodiment, one or more program modules 800 are installed and/or stored within local server, WAP server, and/or gaming devices. For example, program modules 800 may be stored in memory device of local server, WAP server, and/or gaming devices.

The program modules 800 are hardware, firmware, or software programs or applications that, when executed by a processor, cause the processor to perform the functions described herein. In one embodiment, the program modules 800 include a wrapper program module 802, a plurality of game modules 804, a pay table module 806, a progressive prize module 808, a local prize module 810, a slot module 812, and/or an accounting module 813. A first plurality 814 of the program modules 800 may be installed within each local server and/or WAP server and a second plurality 816 of the program modules 800 may be installed within each gaming device. It should be recognized that in embodiments in which the game of chance is administered by gaming device (e.g., when a cell phone or a tablet computing device is used as gaming device), some or all of the first plurality 814 of program modules 800 may be incorporated within gaming device and executed by a processor of a gaming device. Alternatively, some or all of the second plurality 816 of the program modules 800 may be incorporated within a local server and/or WAP server. Together, the wrapper program module 802, the game modules 804, and the other program modules 800 that present and/or administer one or more games may be referred to herein as a game application, or an application.

In one embodiment, the wrapper program module 802 is used at least in part to provide a graphical user interface ("GUI") on a first display of the gaming device. The wrapper program module 802 operates to provide an entry point or a game entry interface for a player to access the gaming device, and to enable the player to select a game of chance to be played on the gaming device. For example, the games of chance may be categorized into a plurality of game sizes and a plurality of game variations. The wrapper program module 802 may present the game sizes and the game variations to the player, using a display, and may enable the player to select a game to play by selecting a game size and game variation through user interface device.

In one embodiment, the wrapper program module 802 may present a list of games or game variations to the player for selection on a display. If the player selects a size and variation, wrapper program module 802 calls or branches to a game module 804 that provides the selected game and variation.

In one embodiment, the game modules 804 each provide a game associated with the selected game size and/or game variation to the player using gaming device, local server, and/or WAP server. Accordingly, in one embodiment, each game is provided by a separate game module 804. Alternatively, each game module 804 may provide more than one game to the player.

The pay table module 806 provides a pay table associated with each game such that one or more pay tables may be associated with each game module 804. In one embodiment, the pay table module 806 provides a pay table associated with a game when the game module 804 requests the pay table and/or when a predetermined event occurs during the game. The pay tables associated with a game may be changed as desired by a game operator by any suitable means. The predetermined event may include, for example, the player selecting a "See Pays" or another icon displayed on the display that represents a request to view the pay table for the game. The predetermined event may also include reaching a point in the game in which the house indicia are matched to the player indicia within a selected pattern to determine whether the player wins a prize.

The progressive prize module 808 may be used to administer aspects of one or more progressive prizes, such as one or more progressive prizes offered to players playing across network. For example, the progressive prize module 808 may receive information regarding an amount wagered by each player playing a game that has a chance to win the progressive prize. The progressive prize module 808 may allocate a first portion of each wager to a first progressive prize to increase the size of the progressive prize. The progressive prize module 808 may allocate a second portion of each wager to a second progressive prize, and may continue in a similar manner for any additional progressive prizes, if desired or applicable. Accordingly, a plurality of progressive prizes may be provided for each game and may be at least partially funded by each or selected wagers.

The local prize module 810 may be used to administer aspects of one or more local prizes, such as one or more prizes that may be won by players playing against each other within a gaming establishment. In addition, the local prize module 810 may administer aspects of one or more fixed prizes, such as prizes that may be won only by individual players playing on respective gaming device. Accordingly, fixed or individual prizes may be awarded to a player based on the gameplay of the player relative to a randomization device of gaming device, rather than based on winning against other players.

In one embodiment, the slot module 812 may be used to control and conduct slot games in the manner and for the purposes detailed below.

The accounting module 813 may be used to interface with an accounting system, such as a slot accounting system or auditing system, at or operated by a gaming establishment. In one embodiment, the accounting module 813 is incorporated within, or executed by, accounting interface. Any suitable data, such as gameplay data, player identification information, prizes won by a player, and/or any other suitable data may be collected and transmitted by the accounting module 813.

It should be recognized that two or more program modules 800 may be combined together such that the functionality of each program module 800 is incorporated into the combined module. Likewise, each program module 800 may be split into two or more sub-modules that each perform a portion of the functionality of the program module 800 being split. Accordingly, while the above-described program modules 800 are described individually, each may be combined or split into other sub-modules as desired.

Figure 8:
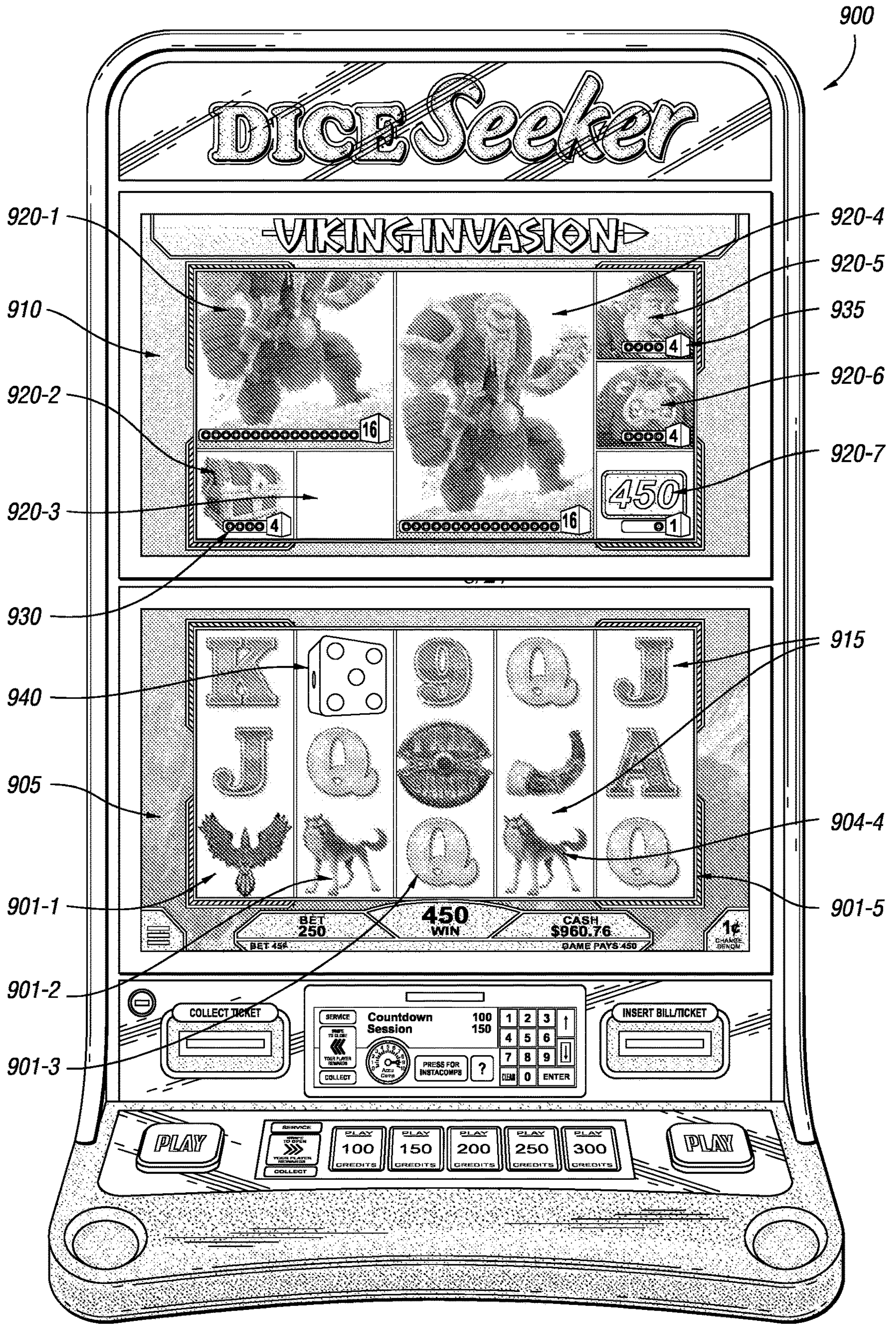
FIG. 8 illustrates a gaming machine depicting exemplary primary and secondary game displays and layouts of the type that may be used to facilitate the embodiments of the present invention.

FIG. 8 illustrates a gaming machine 900 depicting an exemplary game according to the embodiments of the present invention. The game facilitated by the gaming machine 900 is depicted with a Viking Invasion theme manufactured by Gaming Arts, LLC. Those skilled in the art will recognize that the game played on the gaming machine 900 may take on any desirable theme and form. The gaming machine 900 includes a primary video-based slot game 905 on a primary game display and a secondary video-based game 910 on a secondary game display. While a slot-based primary game is shown, any type of primary game may be utilized including video poker, keno, bingo, etc. The primary game display and secondary game display may be separate, individual units or a single unit segmented into two display sections. The primary slot game 905 includes conventionally a 3×5 grid or matrix populated with game symbols 915. The arrangement of the game symbols 915 on the primary game display after a spin of the reels, determines the payout for the primary slot game 905. In this respect, the primary slot game 905 is conventional in nature. It will become apparent from the detailed description below that prizes may be awarded based on primary game outcomes only, secondary outcomes only as triggered by primary game outcomes and both. In one embodiment, the pattern of gaming symbols on the primary game may trigger a primary game prize while one or more dice forming part of the same winning pattern of gaming symbols or unrelated to the winning pattern or gaming symbols may trigger a secondary game attack and potential prize on the same primary game play.

In line with the embodiment that multiple prizes may be awarded for primary game outcomes as well as secondary outcomes on the same play, a primary game outcome may result in a win of credits, dollars, free plays and/or bonus games in conjunction with one or more dice generating lightning strikes on the secondary game display. Any combination of primary game awards and secondary game awards is possible on the same game play.

The secondary game 910 comprises a series of prize blocks 920-1 through 920-7 arranged in a grid that generally mimics the 3×5 primary game reel grid. The prize blocks 920, however, may take on various dimensions as shown. Prize blocks 920-2, 920-3, 920-5, 920-6 and 920-7 are each 1×1; prize block 920-1 is 2×2 and prize block 920-4 is 3×2. As set forth below, and as known to one skilled in the art, the prize blocks may take on any suitable dimensions that the subject secondary game display accommodates. Each prize block 920-1 through 920-7 has an associated prize value and health value. Typically, the larger the prize block 920, the larger the associated prize value, although this need not be true. In one embodiment, the prize values of each prize block are concealed until such time as the health value of the prize block 920 is exhausted. Prize block 920-7 shows a prize value of 450 units or credits being displayed after its associated heath value has been exhausted. A "prize" as used herein may be any type of benefit received by the player including a monetary prize (e.g., 500 credits), free plays (e.g., 10 free plays), prize multipliers, advancement to a bonus game integrating monetary prizes, and/or free plays, merchandise, comps, etc.

The health value of each prize block 920-1 through 920-7 is represented by a series of illuminated dots 930 and a numeric value 935. In other embodiments, the health values may be represented by dynamic column graphs, dynamic pie charts, hour glasses, numbers, etc., with or without a corresponding displayed numeric value.

As shown in FIG. 8, the prize blocks 920 are represented by unique Viking-based characters and related articles. Those skilled in the art will recognize that the prize blocks may be represented using any depictions including character types, symbols, numerals, etc. The prize blocks may also be blank or represented by a space as with prize block 920-3. In one embodiment, a blank or space has no associated prize value. The prize values and heath values are a function of the math model corresponding to the game such that the payouts are in line with those desired by players and the house.

In a first embodiment of the present invention, pre-established primary game outcomes serve to reduce the health values of the prize blocks 920. In one embodiment, specific game symbols or arrangements thereof appearing on a primary game display during play of the primary game serve to reduce the health value of the prize blocks 920. In one exemplary version, the specific game symbols are conventional six-sided dice 940. In this version, each die pip corresponds to one unit of health value for a corresponding prize block 920.

In one embodiment, the correspondence between the primary game outcomes and secondary game prize blocks 920 is positional. In such an embodiment, each primary game reel 901-1 through 901-5 has a corresponding prize block 920 based on relative position. Referring to FIG. 8, primary game reel 901-1 corresponds to prize block 920-2 (i.e., the prize block immediately above the reel—in the same extended column between the primary game display and secondary game display); primary game reel 901-2 corresponds to prize block 920-3; primary game reel 901-3 corresponds to prize block 920-4; primary game reel 901-4 corresponds to prize block 920-4; and primary game reel 901-5 corresponds to prize block 920-7. Accordingly, if a die 940 lands on reel 901-2, the health value of prize block 920-3 is diminished while a die 940 appearing on reels 901-3 and 901-4 diminishes the health value of prize block 920-4 and so on.

Figure 9A:
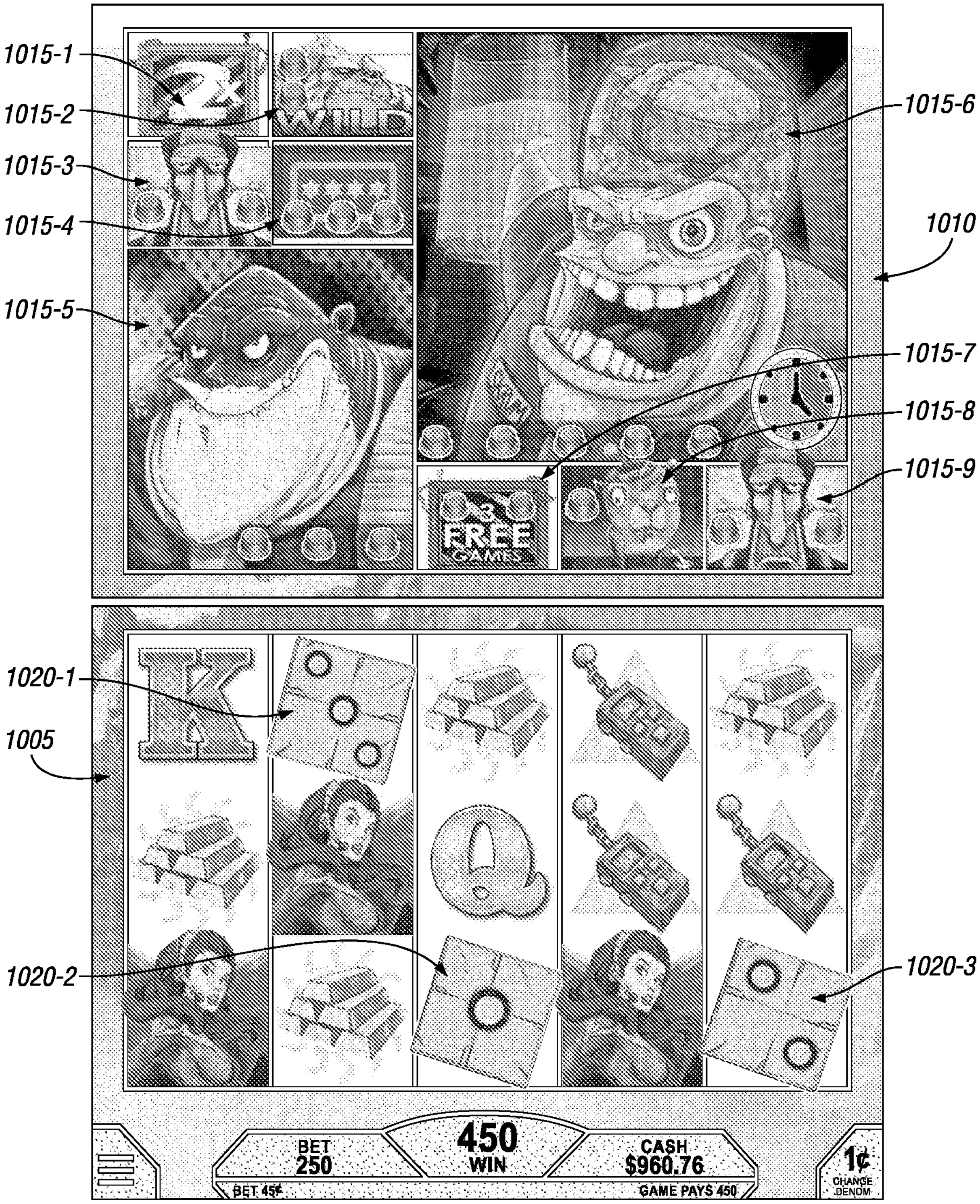
FIGS. 9A-9G illustrate play on a gaming machine of an exemplary game according to the embodiments of the present invention.

FIGS. 9A through 9G show operation of an exemplary game according to the embodiments of the present invention. In this embodiment, the game takes on a sci-fi theme. FIG. 9A shows, as with FIG. 8, the game comprises a video-based primary game 1005 and a video-based secondary game 1010 depicted on a primary game display and secondary game display, respectively. In this instance, the secondary game comprises a 5×5 matrix of nine prize blocks 1015-1 through 1015-9 mapped on the secondary game display.

Figure 9B:
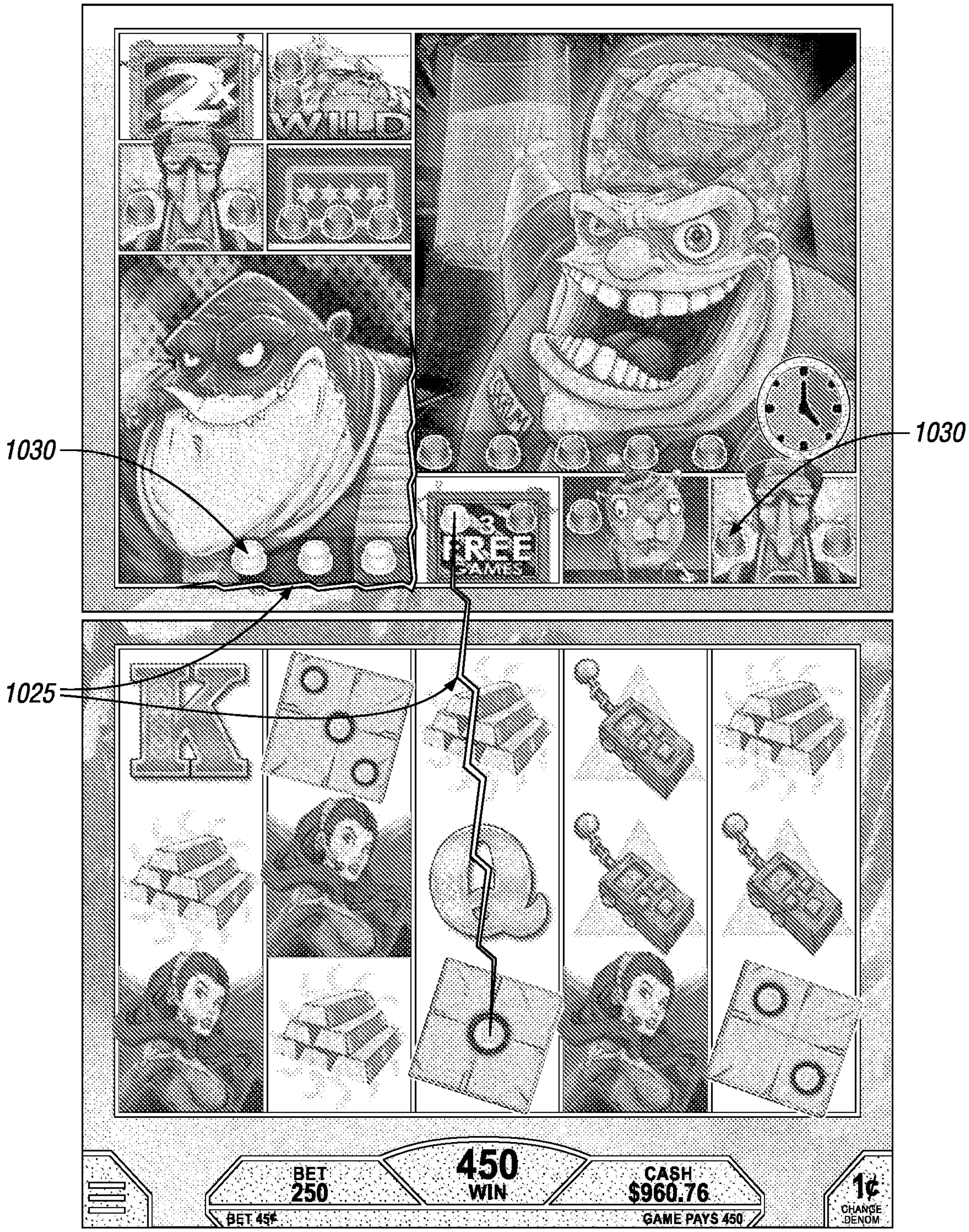
Figure 9C:
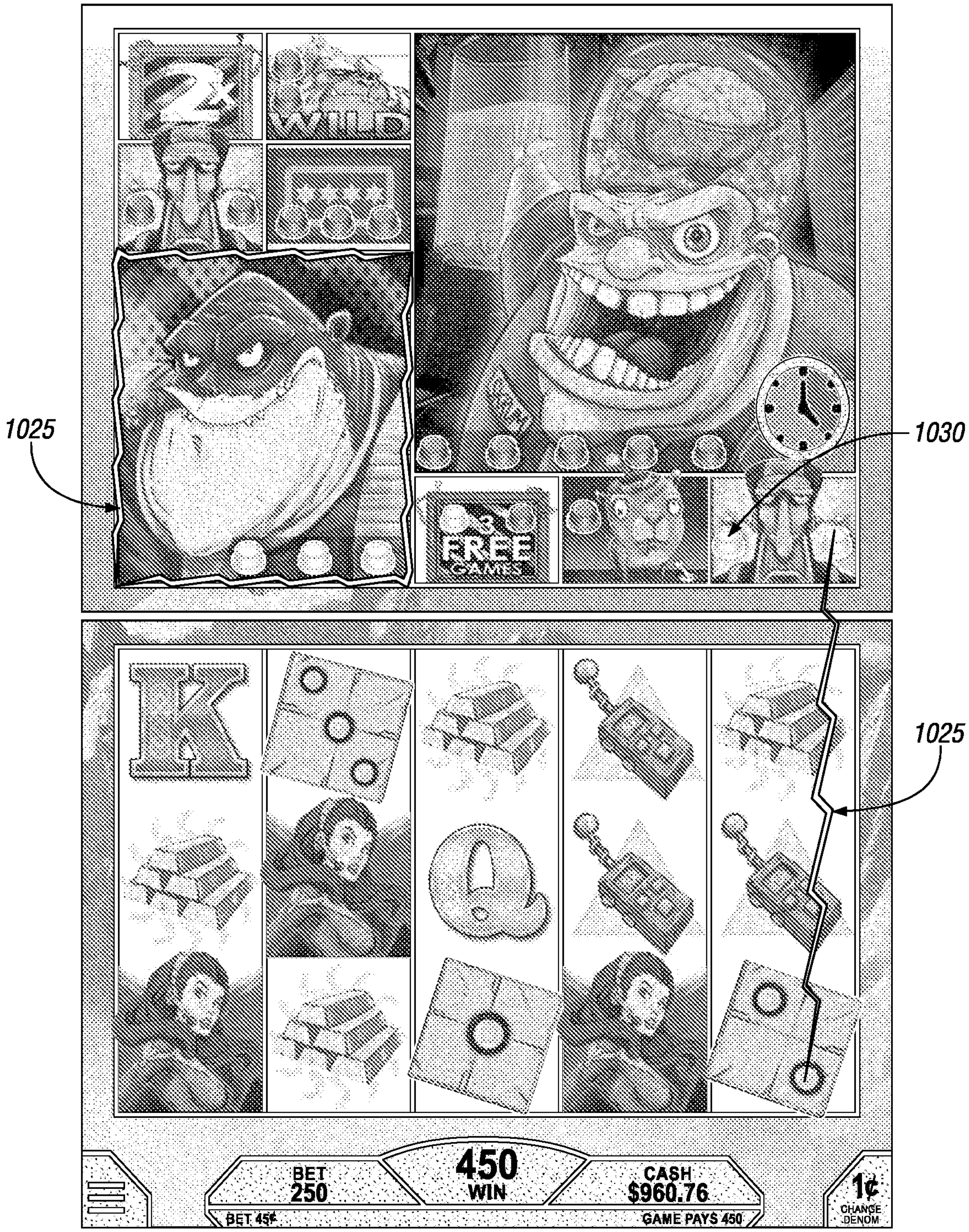
Figure 9D:
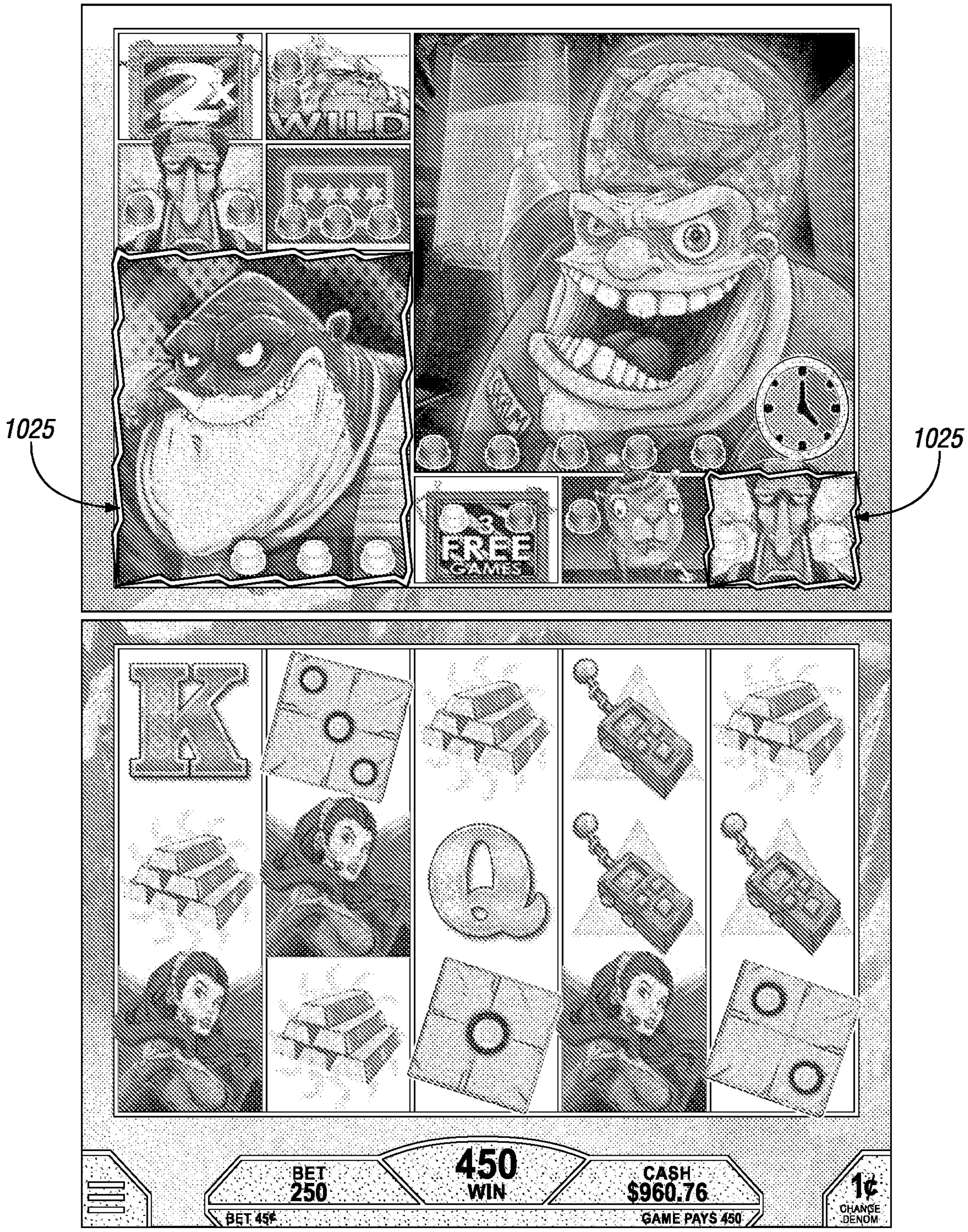

In FIG. 9A, the primary game 1005 shows three dice 1020-1 through 1020-3 appearing on the primary game reels. As detailed above, die 1020-1 corresponds to prize block 1015-5; die 1020-2 corresponds to prize block 1015-7 and die 1020-3 corresponds to prize block 1015-9. In another embodiment, best shown in FIG. 16, neighboring prize blocks may lock together forming larger associated prizes. Now referring to FIG. 9B, the game may incorporate animation or other visual effects to indicate the correspondence between each die and corresponding prize block(s). As shown in FIGS. 9B and 9C, a lightning strike feature 1025 highlights the correspondence by sequentially flashing between the pip of each die 1020-2 and 1020-3 and prize blocks 1015-7 and 1015-9, respectively. The lightning strike is also a visualization of an "attack" on the health value of the prize blocks as each pip on the die 1020-2 and 1020-3 triggers a lightning strike. The lightning strike feature may further surround a prize block to indicate that the health value of the subject prize block has been exhausted. FIG. 9B shows the lightning strike beginning to surround prize block 1015-5 indicating the lightning strike feature between the pips of die 1020-1 and prize block 1015-5 has already occurred and the health value of prize block 1015-5 is exhausted. Similarly, FIG. 9D shows the health value of prize block 1015-9 being exhausted. While FIGS. 9B and 9C indicate that the lightning strike feature may be staggered or delayed from the pips of each die in succession, in an alternative embodiment, the lightning strike feature may be triggered from each pip on each die or all pips on all die simultaneously or semi randomly.

In another embodiment, the lightning strikes may alternate between die. In another embodiment, the die from the primary game or a replica thereof may be moved to the corresponding prize block and shown to diminish the health value of the prize block. Those skilled in the art will recognize that other animation-style features may be used in lieu of lightning strikes. For example, in a Viking-themed game, swords may be shown flying from the die to its corresponding prize block to signify an attack whereas in a sports-themed game, sports balls may fly from die to their corresponding prize blocks to signify an attack. Indeed, any dynamic feature, including any suitable visualization means may be used and displayed such as lightning strikes, laser beams, gun shots, spears, tomahawks, knives, etc., signifying a relationship between the die (or other pre-established primary game symbol) and the corresponding prize blocks without departing from the spirit and scope of the embodiments of the present invention.

In one embodiment, the dice on the primary game display are treated as non-paying symbols relative to the primary game (i.e., the dice do not have any pay table values and are not evaluated for symbol pattern wins). When dice do appear on the primary game display, they are randomly provided a pip value of between 1 and 6 (assuming the die is six sided). In one embodiment, the outcome is truly random (i.e., there is exactly a 1 in 6 chance that any pip amount between 1 and 6 will be selected). Alternatively, the outcome can be weighted such that certain pip outcomes are more, or less, likely to occur. It is also understood that dice with more or less than six sides may be used. In another embodiment, the one or more dice appearing on the primary game display may trigger a primary game prize in addition to serving to attack the prize blocks mapped on the secondary game display.

Figure 9E:
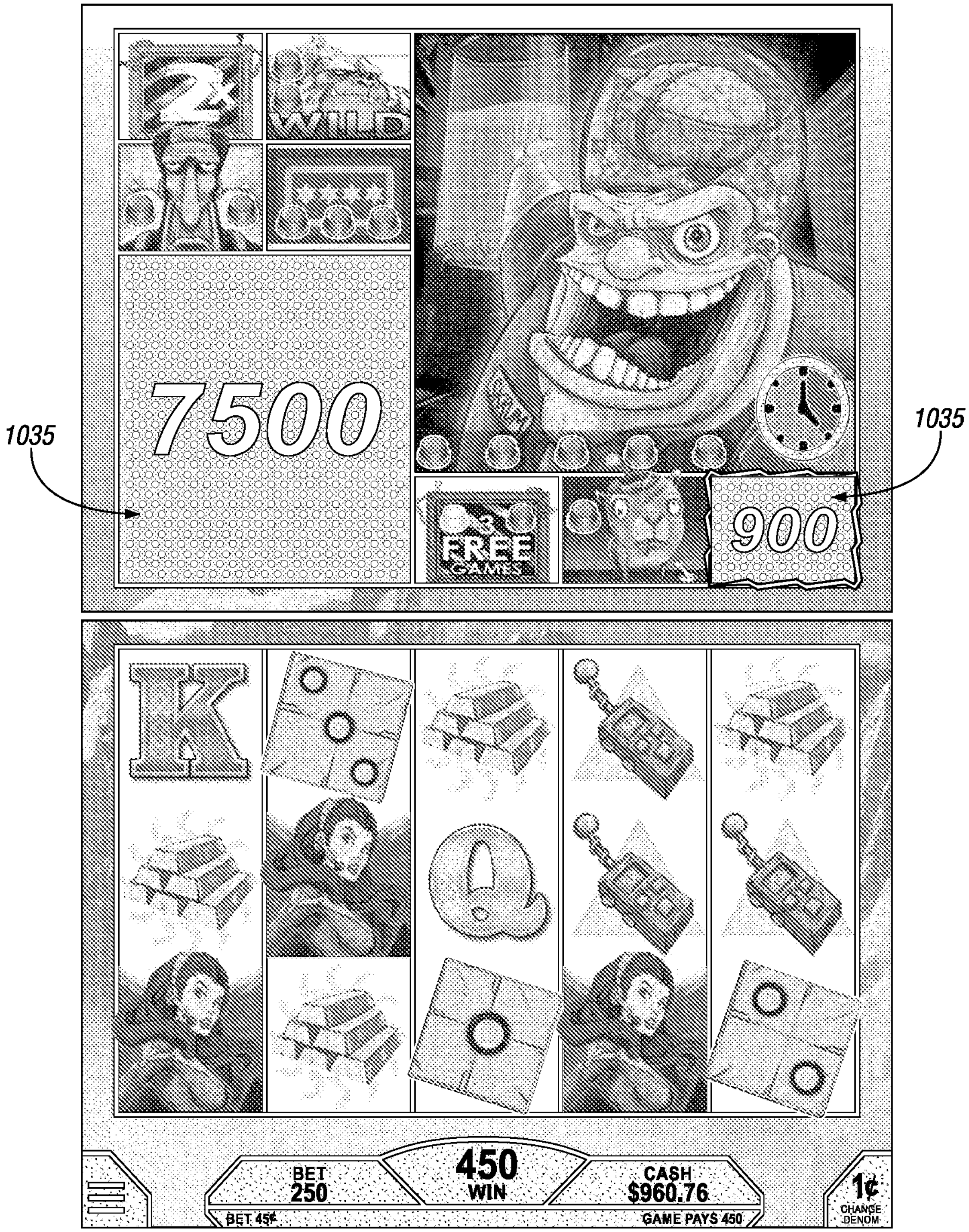

In one embodiment, as shown in FIGS. 9A and 9B, the status of the health value is shown by altering the color of the illuminated dots 1030. In one embodiment, the illuminated dots 1030 are originally red denoting good health and change to green to reflect a diminished state. Extending game play sessions is one advantage of using the visual cues indicative of the health values of the prize blocks. Players will tend to continue playing the game until such time as any near-zero health values are exhausted and the associated prizes awarded rather than walking away. When all illuminated dots 1030 are green, the health value of the corresponding prize block is exhausted. When the health value associated with a prize block is exhausted, the prize block is removed from the secondary game display and initially replaced with a prize value 1035 as shown in FIG. 9E. The prize values for each prize block are pre-determined as detailed in more detail below. In this instance, prize blocks 1015-5 and 1015-9 have prize values 1035 of 7500 units and 900 units, respectively. It is also conceivable that each reduction in the health value of the prize block may trigger a prize. For example, a prize block having a health value of 3 units may deliver a prize with each diminished health value unit with a largest prize being awarded when the health value of the prize block is exhausted.

Figure 9F:
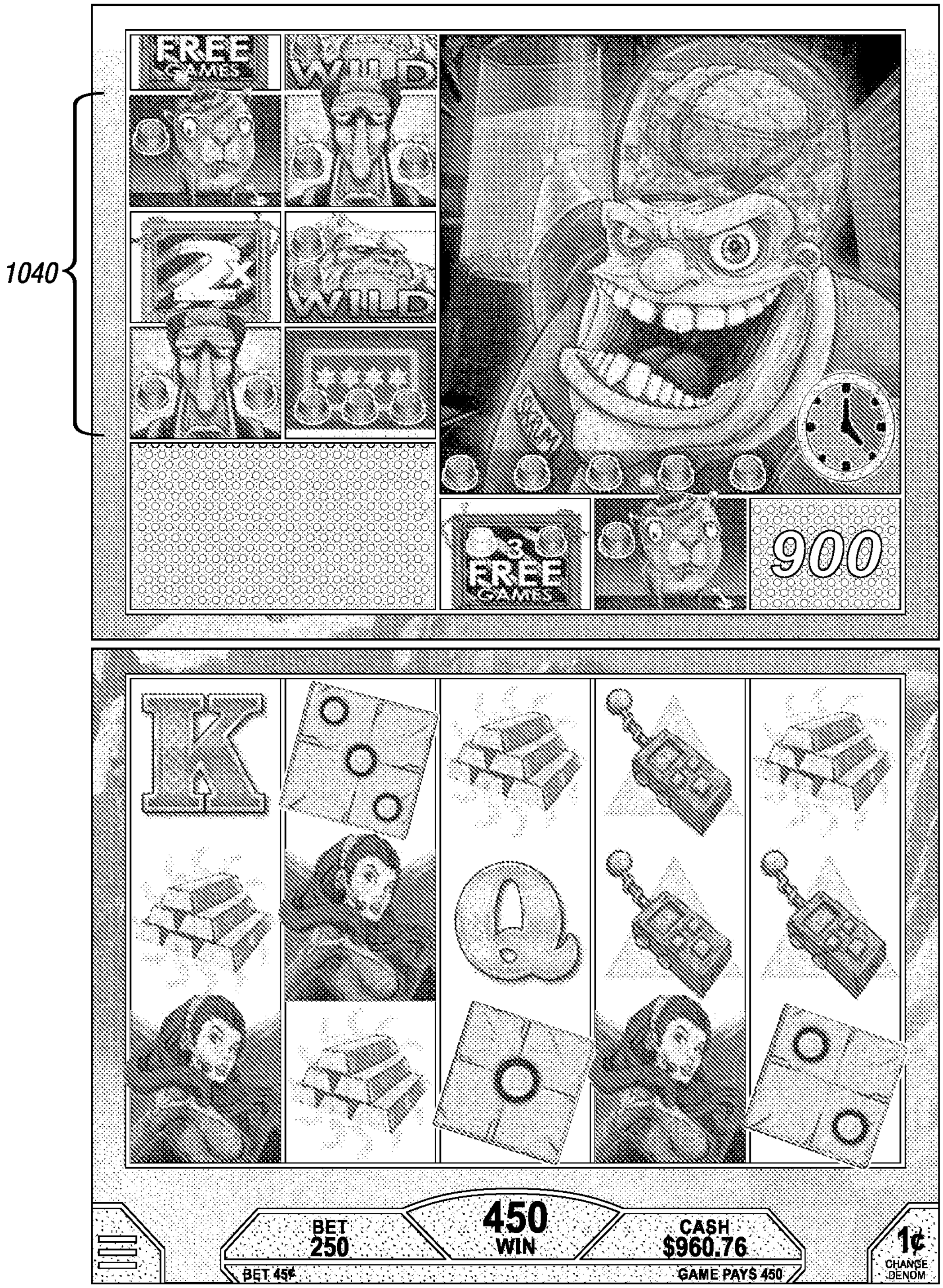
Figure 9G:
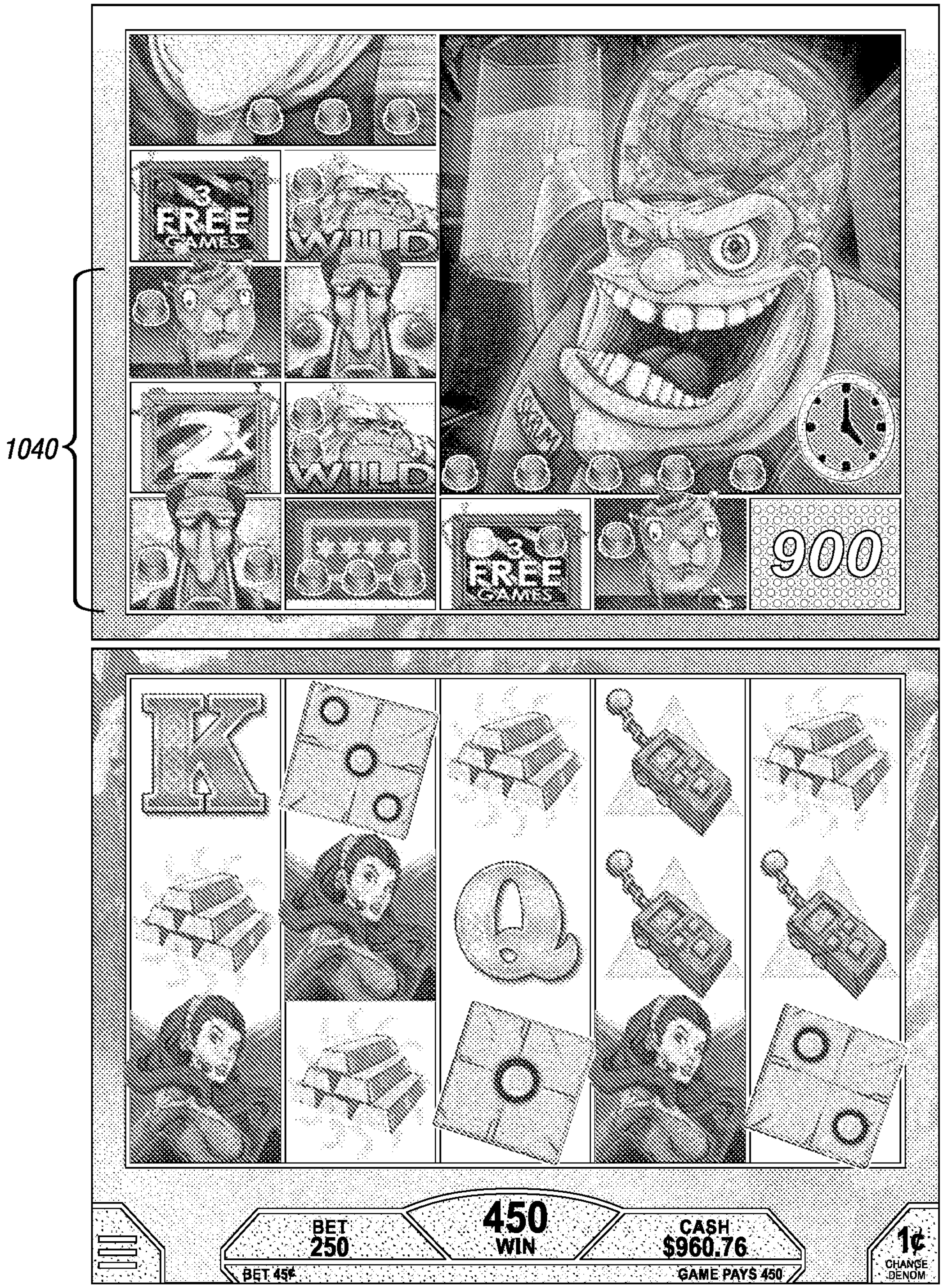

Once a prize is awarded relative to a removed prize block, a plurality of things can occur depending on the game mechanics and/or math model driving the game. For example, the area or void occupied by the removed prize block may remain empty with no corresponding assigned prize value or be filled with one or more new prize blocks with new health values. FIGS. 9F and 9G show new prize blocks (previously above prize block 1015-5) dropping or cascading into the area previously occupied by the prize block 1015-5. In this instance, the 3×2 prize block 1015-5 has been replaced with six 1×1 prize blocks 1040. Additional prize blocks or spaces fill in the upper portion of the secondary game display keeping the secondary game display fully occupied. FIG. 9G shows that the void left by removed prize block 1015-9 is left unfilled.

In one embodiment, if the pips on a die exceed the health value of a corresponding prize block, the extra pips are forfeited. Alternatively, the extra pips may be used to attack any new prize block that replaces the void left by the removed prize block.

Figure 10A:
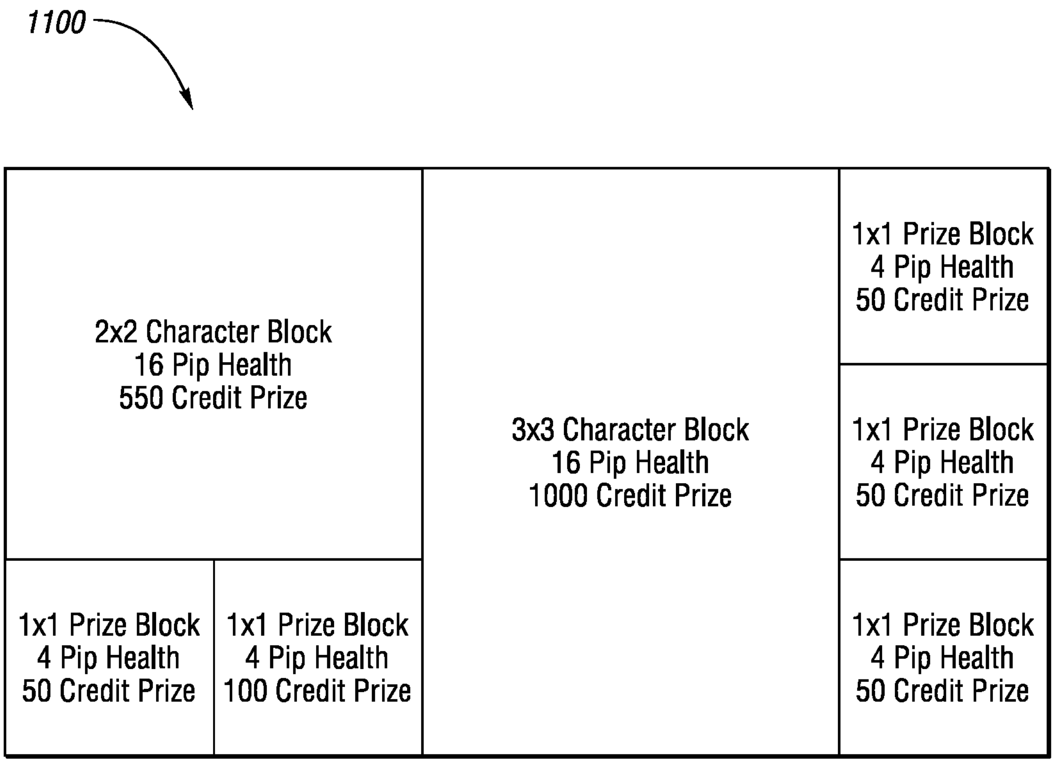
FIGS. 10A-10G illustrate operation of prize blocks of the secondary game display in conjunction with primary game outcomes according to the embodiments of the present invention.
Figure 10B:
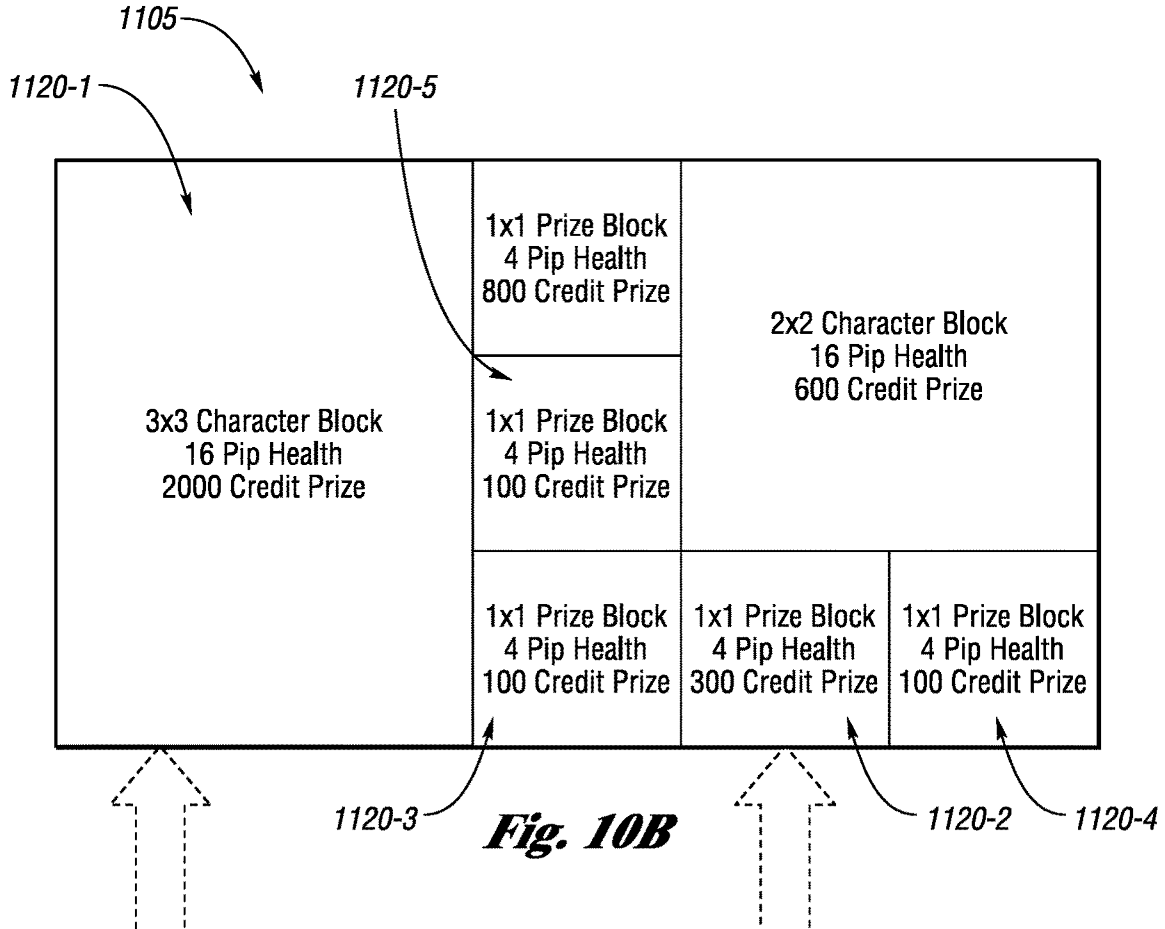

FIGS. 10A-10G show operation of the prize blocks of the secondary game display in conjunction with primary game outcomes according to embodiments of the present invention. FIG. 11A shows an arrangement of prize blocks 1100 for a 50-wager secondary game display comprising a 2×3 prize block with a prize value of 550 credits, a 2×3 prize block with a prize value of 1000 credits, four 1×1 prize blocks with prize values of 50 credits each and a 1×1 prize block with a prize value of 100 credits. Those familiar with the art will recognize that no separate wager may be required to play the secondary games as it is included within the primary wager or in the alternative, may require a separate wager from the primary game. FIG. 10B shows an arrangement of prize blocks 1105 for a 100-wager secondary game display comprising a 2×3 prize block with a prize value of 2000 credits, a 2×3 prize block with a prize value of 600 credits, three 1×1 prize blocks with prize values of 100 credits each and a 1×1 prize block with a prize value of 300 credits. The and 100-wager prize block arrangements are created when the game is initialized, and each is specific to the wager placed during the primary game. Other prize block arrangements may be utilized for other wager amounts or types.

Figure 10C:
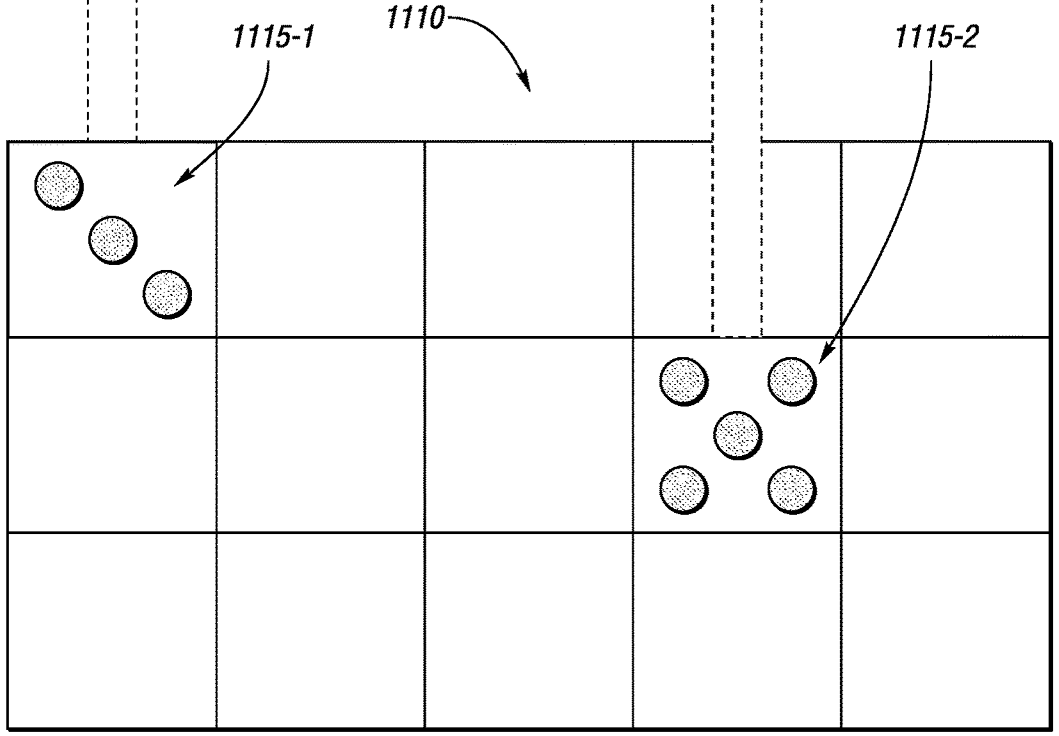
Figure 11A:
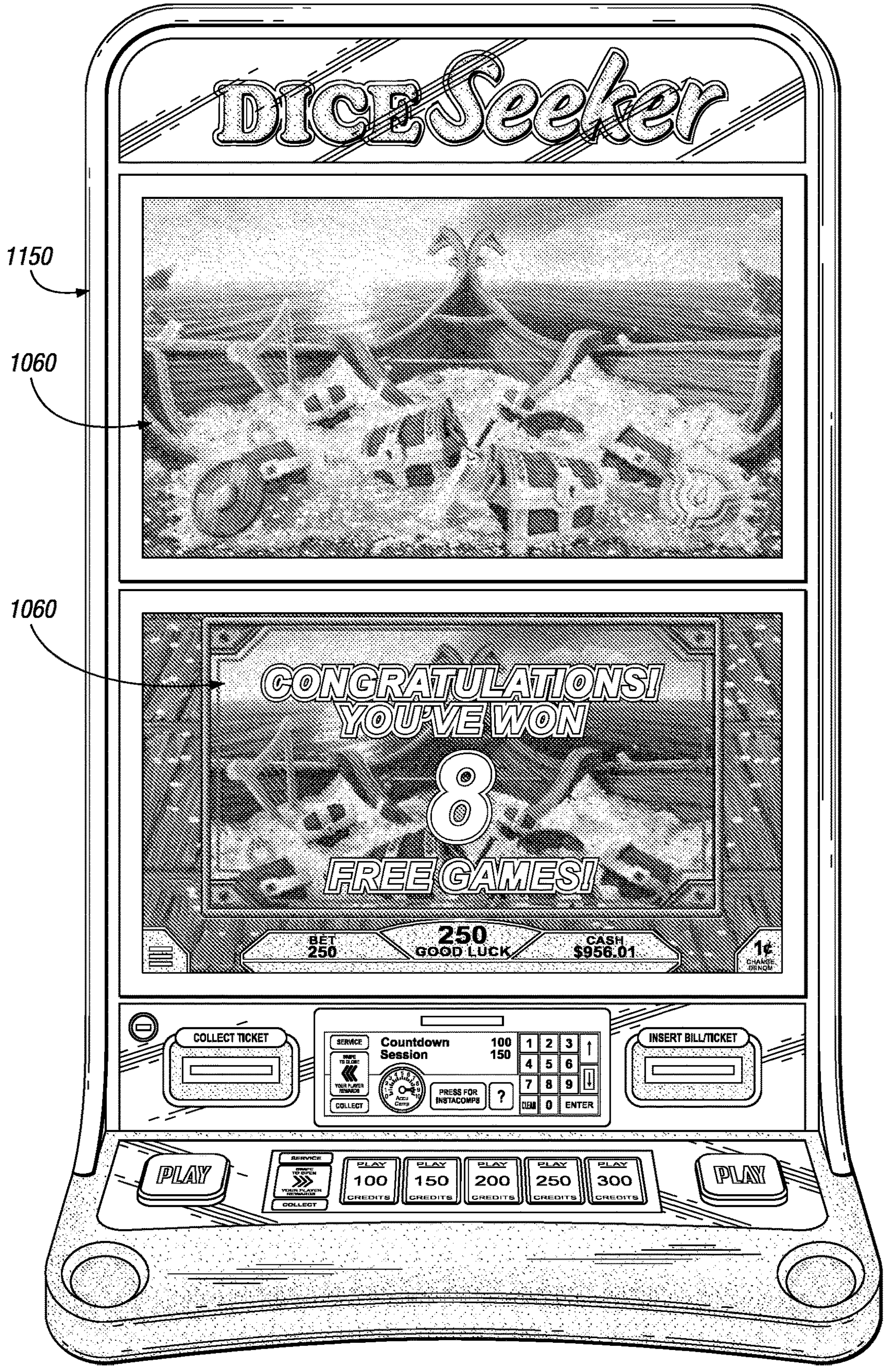
FIGS. 11A-11D illustrate play on a gaming machine of free games awarded during play of an exemplary game according to the embodiments of the present invention.

FIG. 10C shows a primary game outcome 1110 for a 100-wager game comprising a pair of dice 1115-1, 1115-2 appearing on the 3×5 matrix of primary game reels. The pair of dice 1115-1, 1115-2 have landed on row 1, column 1 and row 2, column 4, of the primary game matrix, respectively. Consequently, die 1115-1 decreases the health value of prize block 1120-1 of the arrangement of prize blocks 1105 while die 1115-2 decreases the health value of the of prize block 1120-2 of the arrangement of prize blocks 1105. In one embodiment, the decrease in health value has a linear relationship with the number of pips such that one pip diminishes the health value by one unit. Other math models are conceivable such that the relationship between the pips and health value units need not be linear (e.g., one pip diminishes the health value by two units).

Using FIGS. 10B and 10C as reference, in this linear positional relationship embodiment, a dice symbol appearing in any row of columns 1 and 2 impacts the health value of prize block 1120-1; a dice symbol appearing in any row of column 3 impacts the health value of prize block 1120-3; a dice symbol appearing in any row of column 4 impacts the health value of prize block 1120-2; and a dice symbol appearing in any row of column 5 impacts the health value of prize block 1120-4. As detailed herein, the positional relationship need not be linear. Moreover, while the figures show only the health values of the bottommost prize blocks being impacted, in other embodiments, the health value of any displayed prize block may be impacted by a primary game outcome.

Figure 10D:
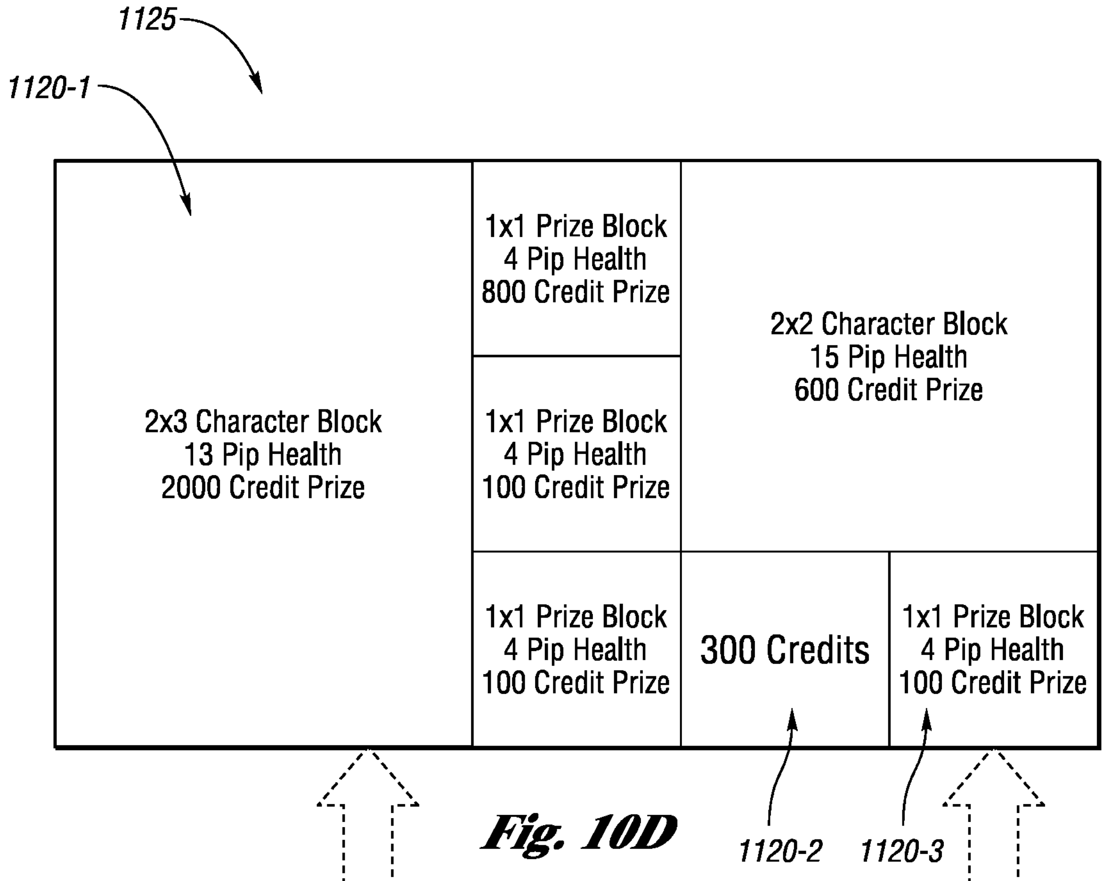

FIG. 10D shows the arrangement of prize blocks 1125 responsive to the primary game outcome 1110 acting on the arrangement of prize blocks 1105. The health value of the prize block 1120-1 has diminished 3 units from 16 units to 13 units based on the 3 pips. The health value of the prize block 1120-2 has diminished 5 units to zero. As shown in FIG. 10D, the prize value of 300 units has been revealed in accordance with the exhaustion of the health value of prize block 1120-2.

Figure 10E:
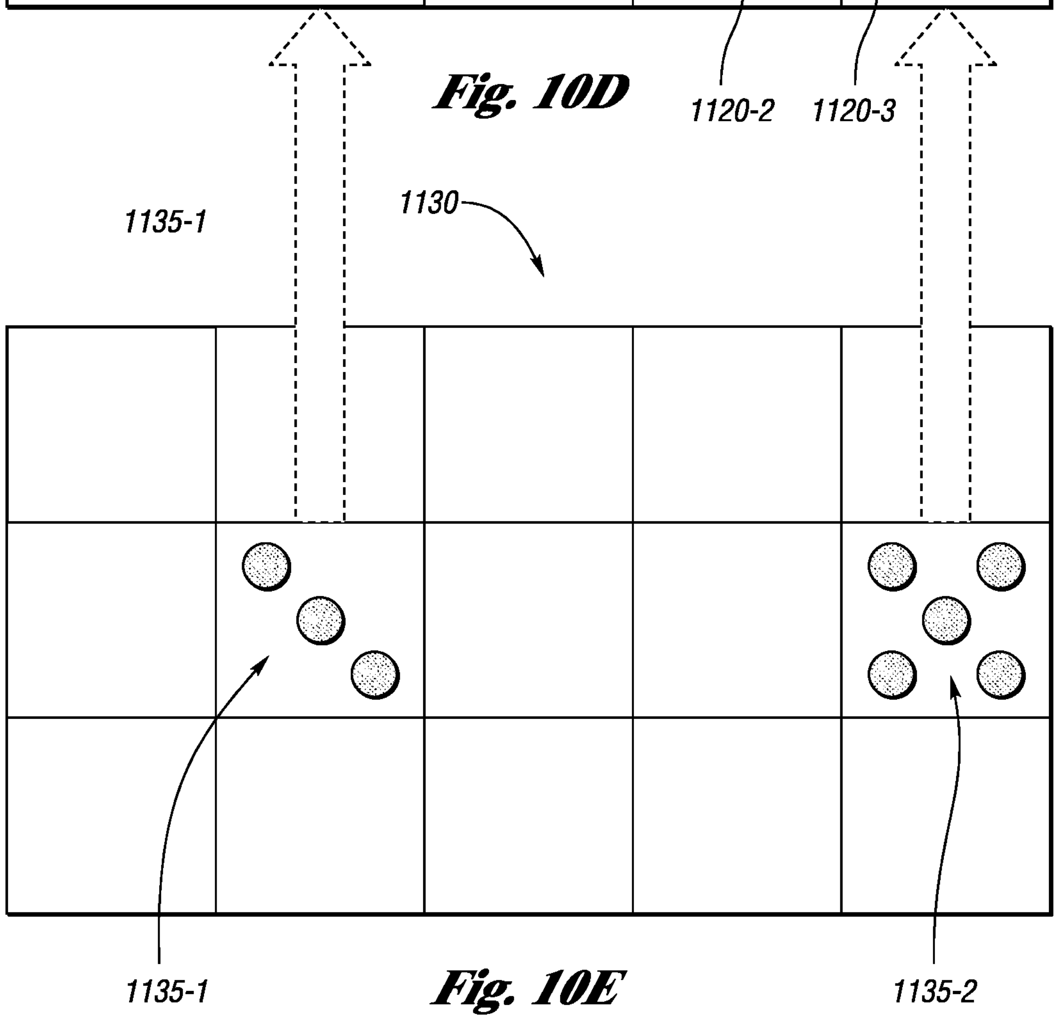

FIG. 10E shows a primary game outcome 1130 for a 100-wager game comprising a pair of dice 1135-1, 1135-2 appearing on the 3×5 matrix of primary game reels. The pair of dice 1135-1, 1135-2 have landed on row 2, column 2 and row 2, column 5, respectively. Consequently, die 1135-1 diminishes the health value of prize block 1120-1 while die 1135-2 diminishes the health value of prize block 1120-3.

Figure 10F:
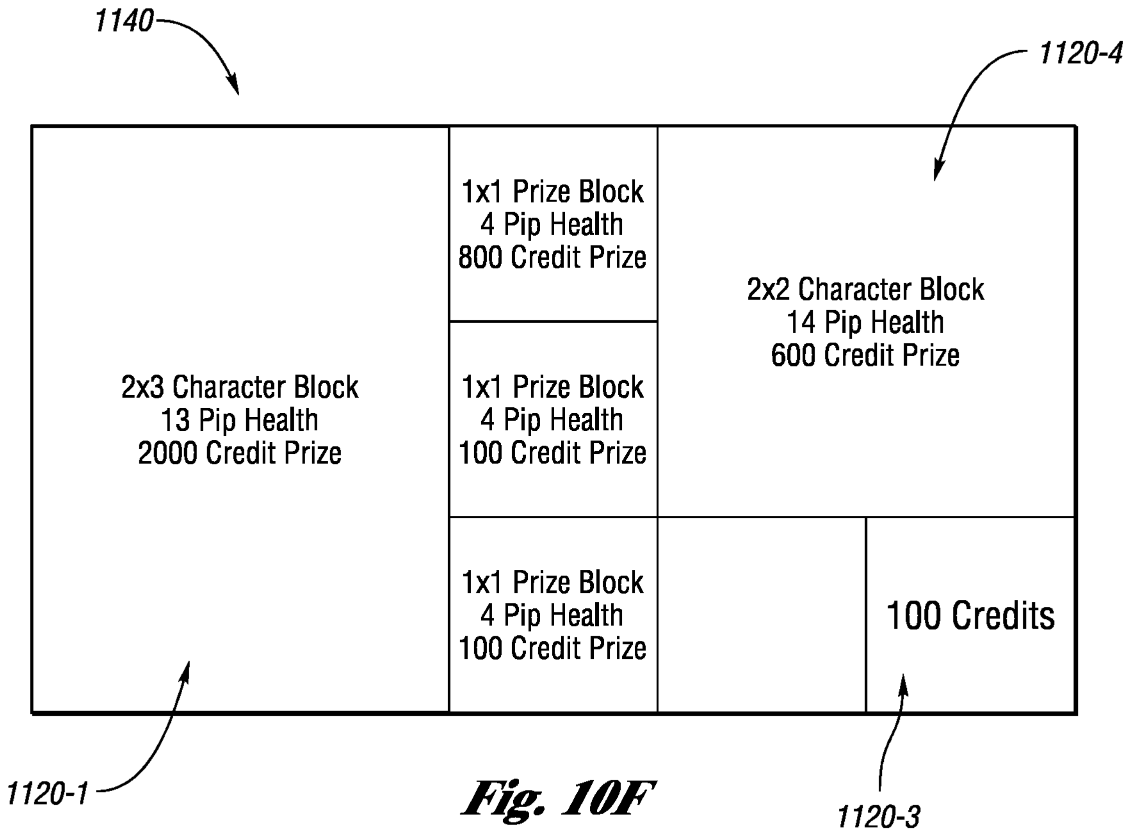
Figure 10G:
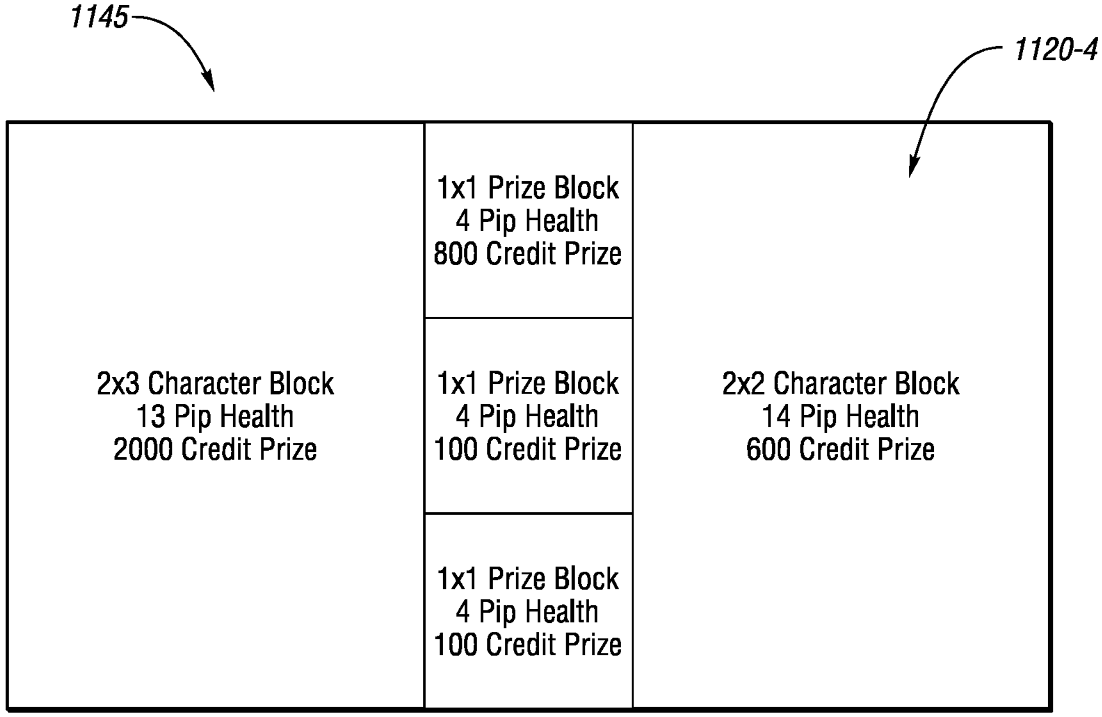

FIG. 10F shows the arrangement of prize blocks 1140 responsive to the primary game outcome 1130 acting on the arrangement of prize blocks 1125. The health value of the prize block 1120-1 has diminished another 3 units from 13 units to 10 units based on the 3 pips. The health value of the prize block 1120-3 has diminished 5 units such that the 4-unit health value is exhausted. In the event the die total exceeds the remaining health value of the associated prize block, the excess units may either be applied to the next prize block above or may be discarded. As shown in FIG. 10G, the prize value of 100 units has been revealed in accordance with the exhaustion of the health value.

FIG. 10G shows the arrangement of prize blocks 1145 once the health values of prize blocks 1120-2 and 1120-3 have been exhausted. Once the prize blocks 1120-2 and 1120-3 are removed, the 2×3 prize block 1120-4 drops down to fill in the 4$^{th}$ and 5$^{th}$ columns of the 3×5 arrangement of prize blocks represented on the secondary game display.

In one embodiment, one or more subject dice may be deemed super dice such that when they land on any primary game reel, they decrease the health value of multiple prize blocks or possibly all of the prize blocks represented on the secondary game display. Such super dice may also be configured to diminish the health value to zero regardless of the current health value.

Figure 11B:
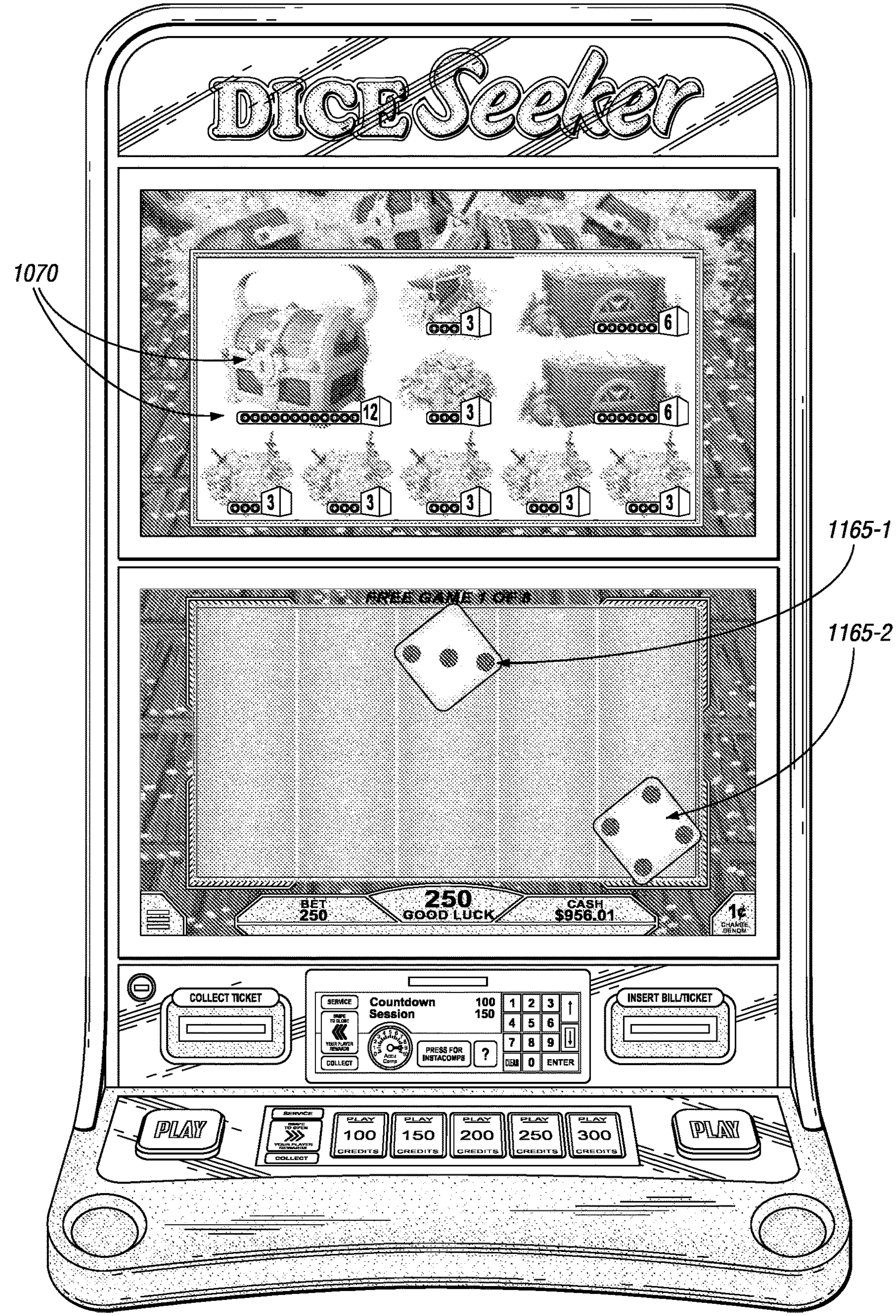
Figure 11C:
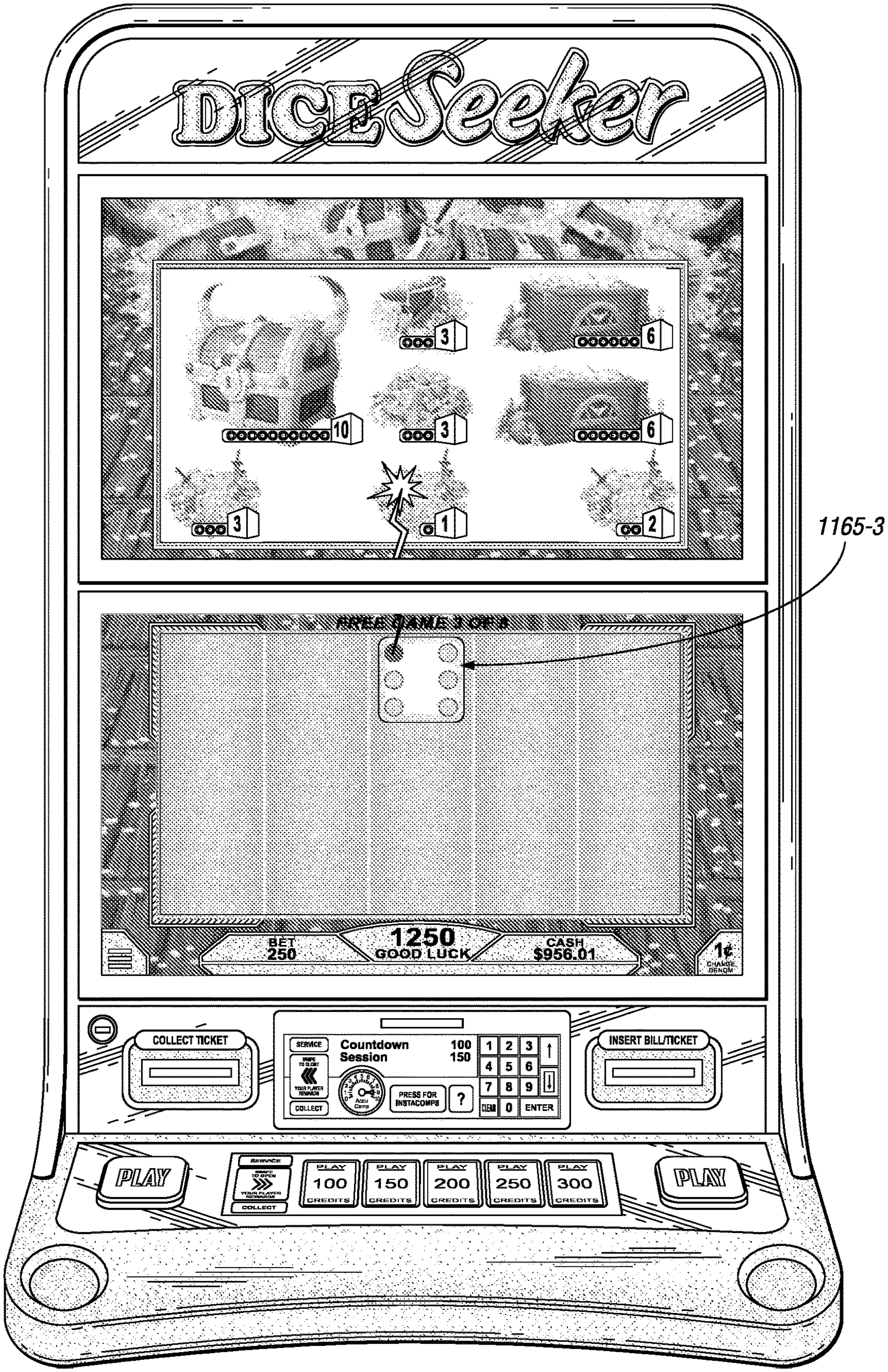
Figure 11D:
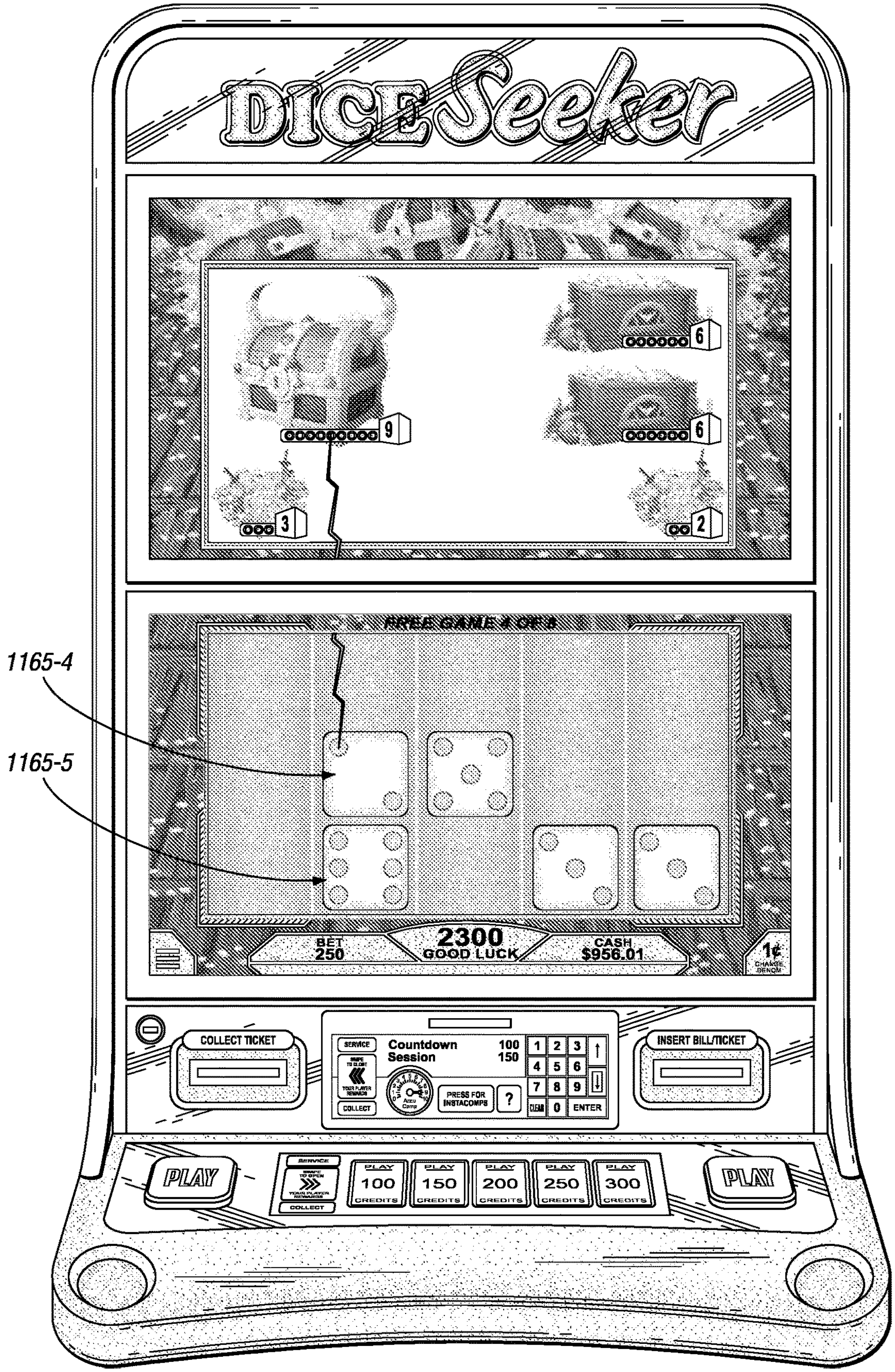

FIGS. 11A-11D show play on a gaming machine of free bonus games awarded during play of an exemplary game according to embodiments of the present invention. FIG. 11A shows a gaming machine 1150 with a primary game display 1155 depicting the award of 8 free games while the secondary game display 1160 depicts the home page of a bonus game. FIG. 11B shows a bonus game utilized to facilitate the free plays. In one embodiment, the bonus game comprises levels or tiers through which players seek to advance with higher levels offering more significant prizes. As shown in FIGS. 11B and 11C, in one embodiment, the bonus game comprises a primary game involving the removal of all game symbols except the dice. In a manner like the primary wagering game, the free games utilize dice 1165-1 through 1165-3 to decrease the health value associated with prizes 1170 depicted on the secondary game display based on position. As shown in FIG. 11D, with the free bonus games, multiple dice 1165-4 and 1165-5 may appear on the same reel. Once a health value associated with a subject bonus prize is exhausted, the corresponding prize is won. Additional free spins/games may be won during the bonus game.

Figure 12A:
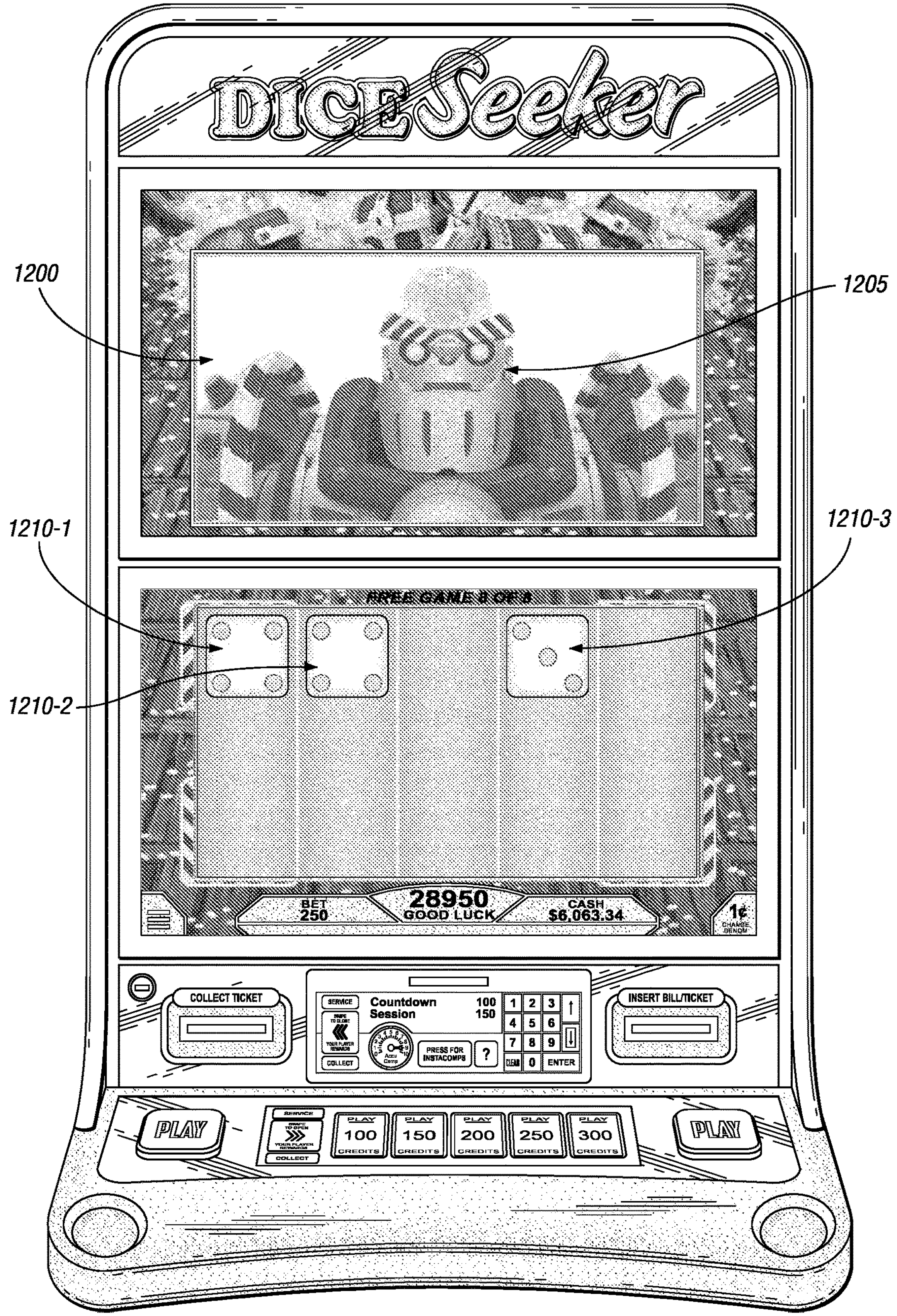
FIGS. 12A-12C illustrate operation of an exemplary bonus game according to the embodiments of the present invention.
Figure 12B:
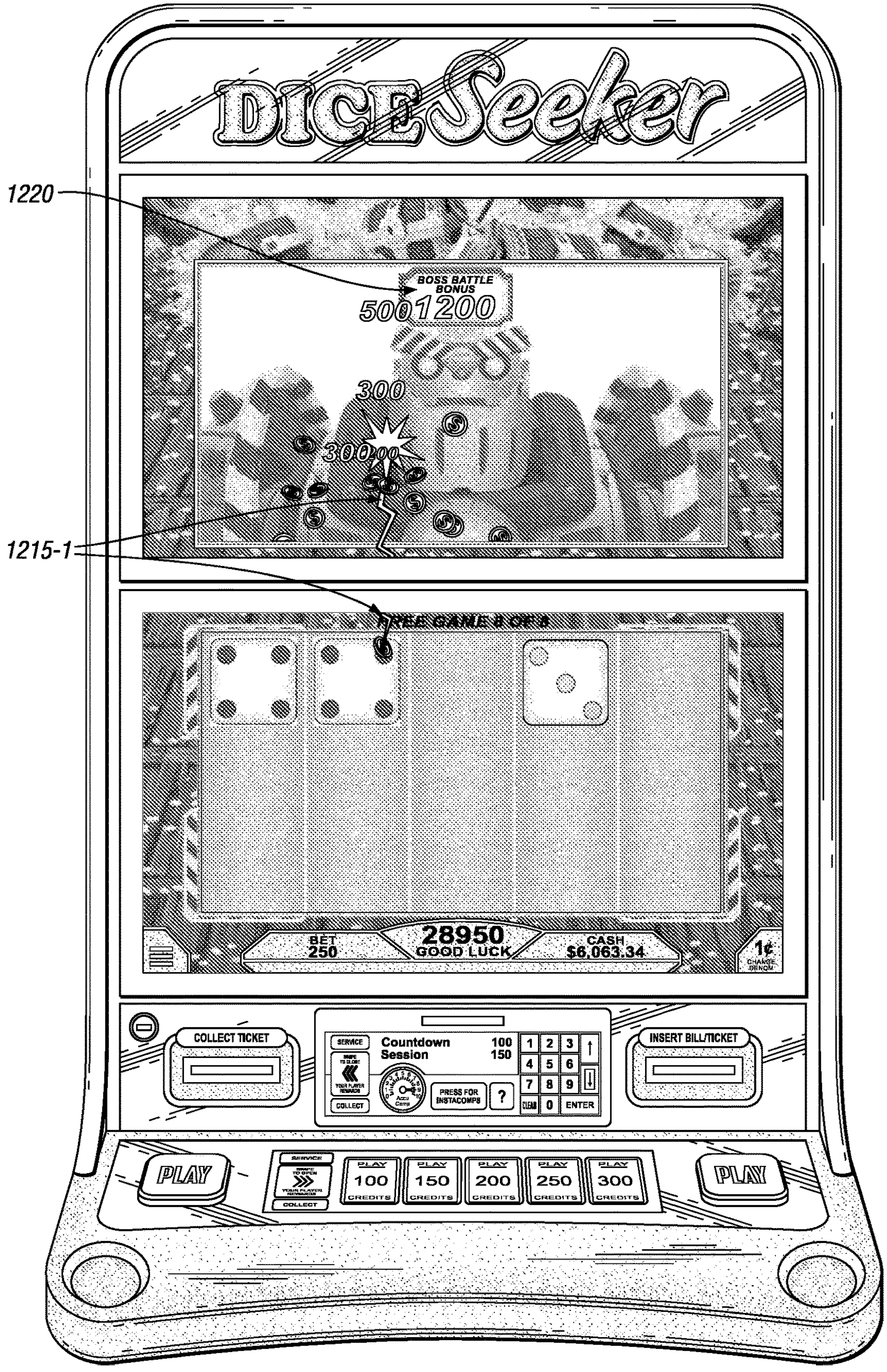
Figure 12C:
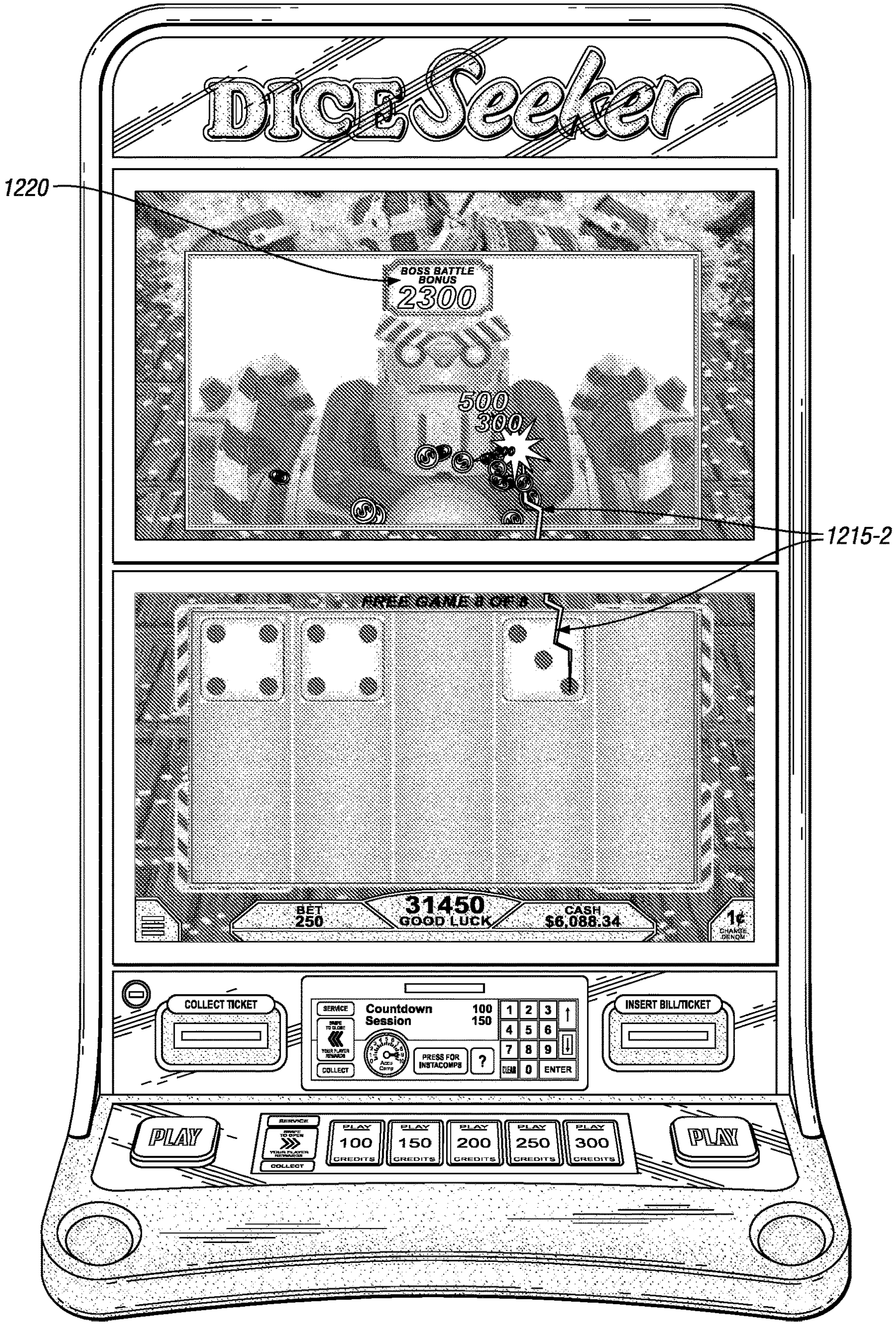

FIGS. 12A-12C show an exemplary final level associated with bonus/free games. In this embodiment, the secondary game display depicts a single prize block 1200 comprising a sci-fi character 1205. As dice 1210-1 through 1210-3 appear on the primary game display, the dice serve to trigger prizes relative to each die pip. In this instance, instead of each lightning strike 1215-1 and 1215-2 diminishing the health value of the prize block 1200, each lightning strike 1215-1 and 1215-2 triggers a prize 1220 which may be revealed and/or recorded within the head of the character 1205.

Figure 13:
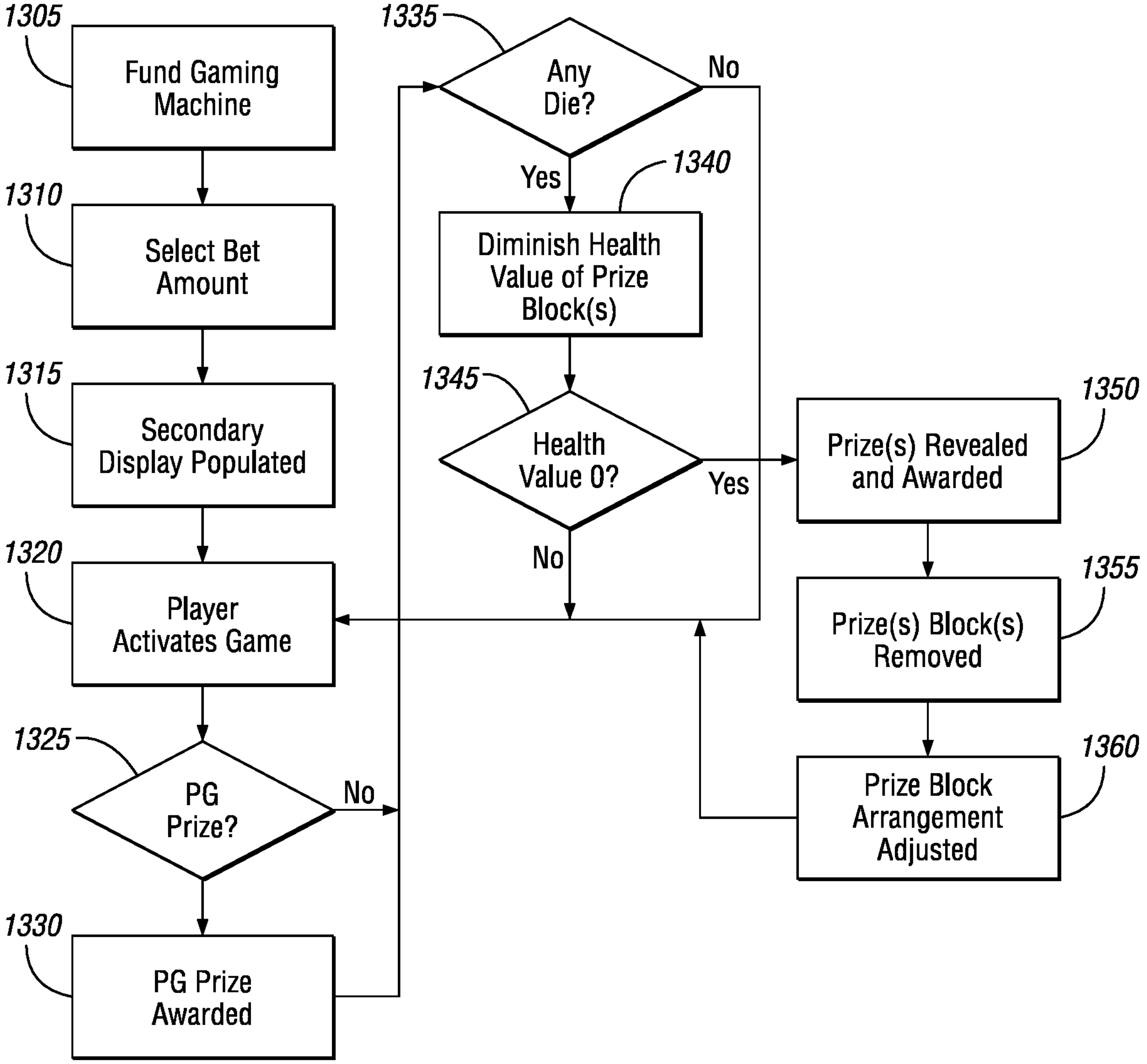
FIG. 13 illustrates a flow chart detailing play of an exemplary game according to the embodiments of the present invention.

FIG. 13 shows a flow chart 1300 detailing the embodiments of the present invention. At step 1305, a player funds the gaming machine. Such funding may be accomplished by inserting currency, tickets, vouchers, coupons, credit card information, electronic funds transfer, etc., into the gaming machine. At step 1310, the player selects a bet amount. Step 1310 may be optional in the case of the wager being a preset and nonadjustable amount. At step 1315, the secondary game display is populated with an arrangement of prize blocks corresponding to the bet threshold or range (e.g., for a bet less than or equal to 50 units, a first arrangement of prize blocks is selected while for a bet greater than 50 units, a second arrangement of prize blocks is selected). At step 1320, the player activates (e.g., causes the primary game reels to spin) the primary game using the gaming machine interface. At step, 1325, it is determined if the primary game (PG) has resulted in a prize. If so, at step 1330, the prize is awarded. At step 1335, it is determined if one or more die (or other pre-established symbols or arrangements thereof) have landed on the primary game display. If so, at step 1340, the health value of prize blocks corresponding to the one or more dice are diminished accordingly. At step 1345, it is determined if any prize blocks have zero health value. If so, at step 1350, the prize value associated with the prize block is revealed and awarded. At step 1355, the prize block having zero health value is removed. At step 1360, the arrangement of prize blocks is adjusted to account for the removal of the prize block having zero health value. The adjustment may comprise leaving the void blank or dropping a new prize block into the vacated area.

Figure 14:
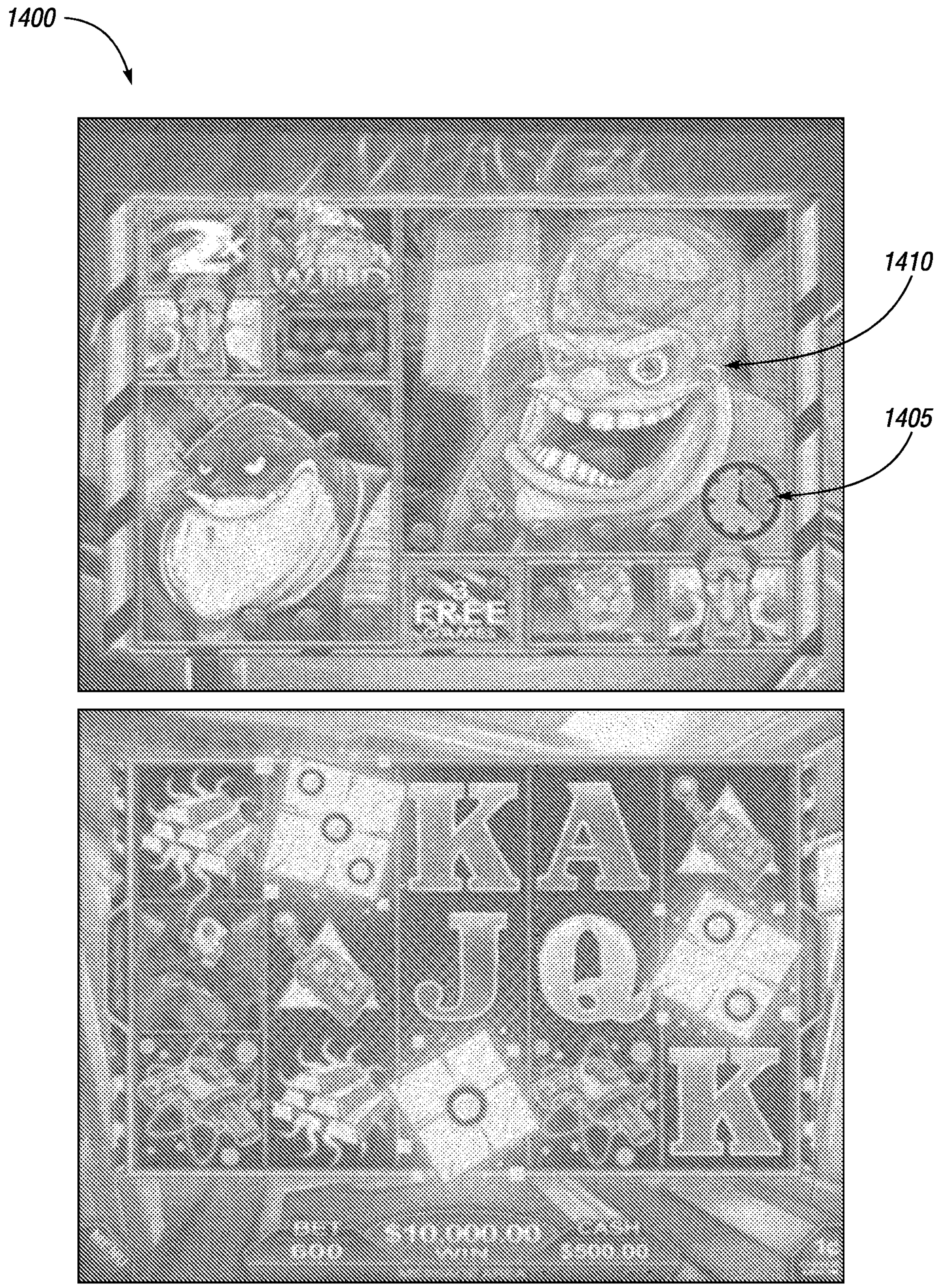
FIG. 14 illustrates a gaming machine screen shot with the addition of a timer according to the embodiments of the present invention.

FIG. 14 shows a gaming machine screen shot 1400 with the addition of a timer 1405 according to the embodiments of the present invention. While the feature is deemed a timer, those skilled in the art will recognize that the timer is not limited to counting down or tracking "time" in units of time (e.g., minutes or hours) but may also count down or track "time" in actions (e.g., number of game plays or spins). The timer 1405, as shown, is positioned in one of the prize blocks 1410. The timer 1405 is configured to count down as the game is played. While the timer is said to count down, it may be configured to count up to a threshold value. In one embodiment, the timer 1405 ticks down (or up) one unit for every spin or play of the game. Those skilled in the art will recognize that the timer 1405 may tick down faster or slower than one unit per game, continuously tick down (or up) as the game is being played, take different forms (e.g., digital, hourglass, etc.) and/or may be present in more than one prize block. Regardless of the form of the timer 1405, once the timer reaches 0, is otherwise exhausted or reaches a non-zero threshold value and the award block has not yet been awarded (e.g., the player has yet to collect the required number of PIPs (i.e., the health value is not yet maximized), the award block is removed from the display without awarding the associated prize. The next time the award block or type of award block appears on the display, the PIPs, depending on the embodiment, may or may not be replenished to their former level or may be set at a predetermined level. In one embodiment, additional time may be added to a timer as a prize based on certain primary game outcomes thereby allowing the player more chances to win an associated prize. Players may also buy additional time if desired. Those skilled in the art will recognize that screens, screenshots or displays of any game or games described herein are only representative of one possible presentation of a game as the same or similar games can be played or presented on a single display in a vertical or portrait mode or horizontal or landscape mode where the screens, screenshots or display occupy differing sections of a single display, a dual display in a stacked arrangement where some game features exist on an upper display while other game features exist on a lower display or even a triple display where the game screens, screenshots or displays may be shared by up to all three stacked monitors.

In one embodiment, when the award block is removed, the associated PIPs may be stored in a pot. The pot provides a mechanism for the game to pay out more than the conventional PIP average as desired.

Figure 15:
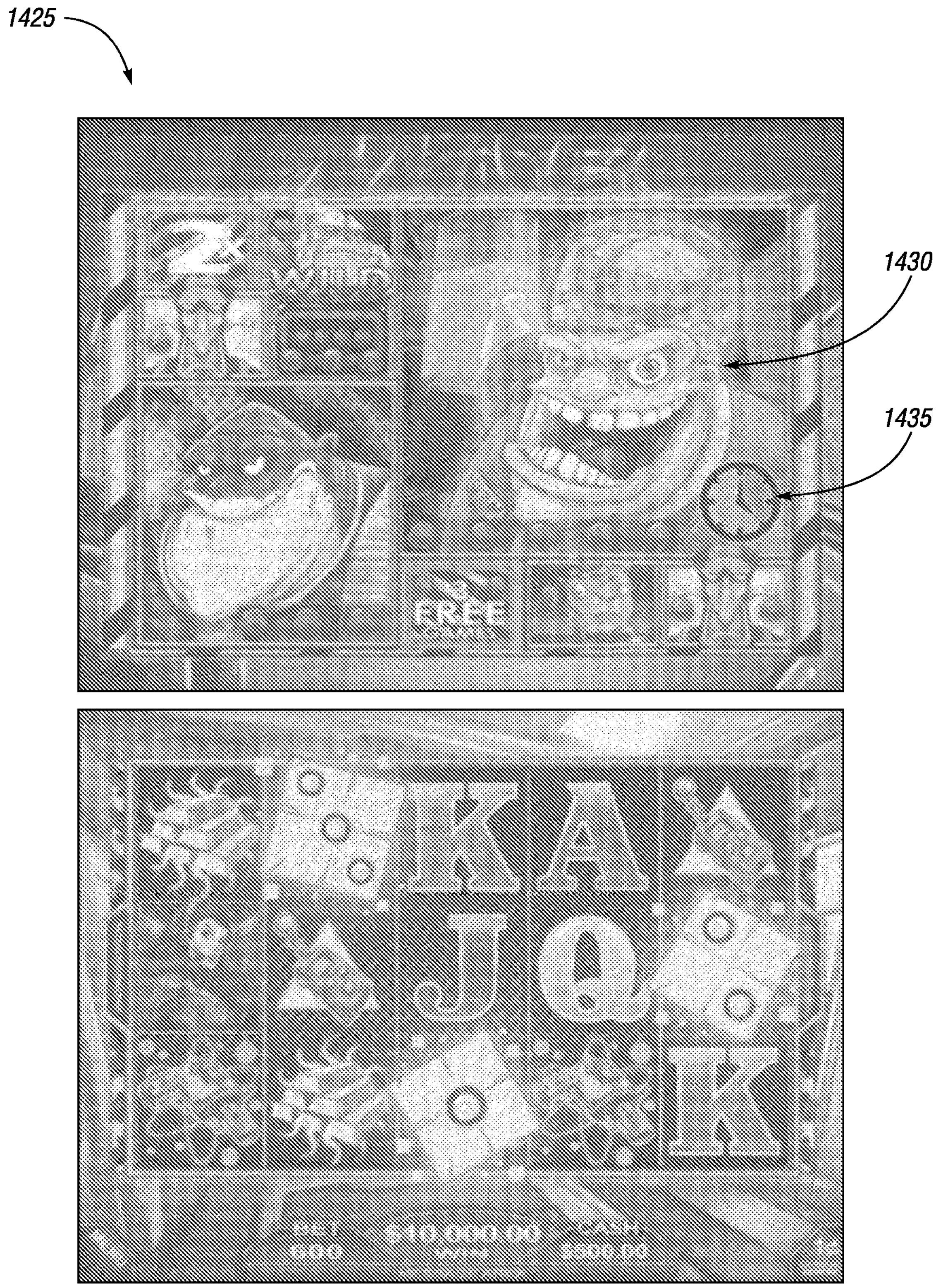
FIG. 15 illustrates a gaming machine screen shot with a mystery prize block according to the embodiments of the present invention.

FIG. 15 shows a gaming machine screen shot 1425 with a mystery prize block 1430 according to the embodiments of the present invention. The mystery prize block 1430 conceals or simply does not display the number of PIPs required to win the associated prize. In this manner, the player does not know how many PIPs are required to win the prize thereby enhancing the anticipation and excitement. Such prize blocks may also tend to keep players playing the gaming machine longer in an effort to reveal the PIPs and award the associated prize. While a timer 1435 is shown in prize block 1435, a timer is optional as detailed above.

Figure 16:
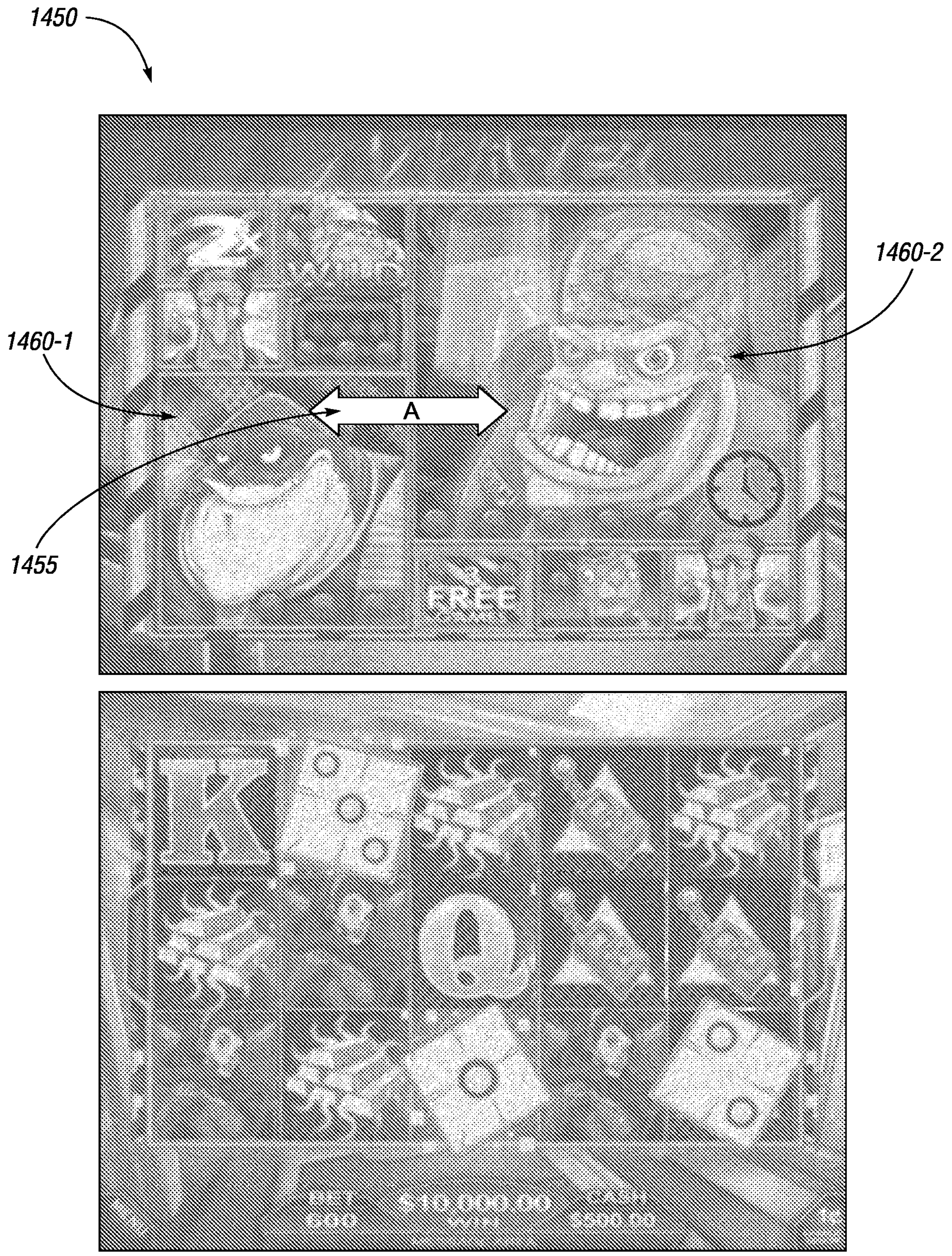
FIG. 16 illustrates a gaming machine screen shot with a prize block locking feature according to the embodiments of the present invention.

FIG. 16 shows a gaming machine screen shot 1450 with a prize block locking feature 1455 according to the embodiments of the present invention. The prize block locking feature 1455 serves to lock two or more neighboring prize blocks 1460-1 and 1460-2. Since prize blocks 1460-1 and 1460-2 have been locked, the total PIP count is 8. Thus, if the player collects all of the 8 PIPs, the total associated prize is awarded as well as a bonus or other enhanced award. In one embodiment, when activated, the prize block locking feature 1455 includes one or more PIPs being collected in one or each of the locked prize blocks. In another embodiment, the locking of the prize blocks results in an immediate player award. In another embodiment, certain patterns (e.g., extending across all 5 columns) of locked prize blocks result in a player award. In one embodiment, only like prize blocks may lock together whereas in other embodiments any prize blocks may lock together. In another embodiment, when blocks lock, the associated aggregated prizes are immediately awarded even without the required PIPs being collected based on primary reel outcomes.

Figure 17A:
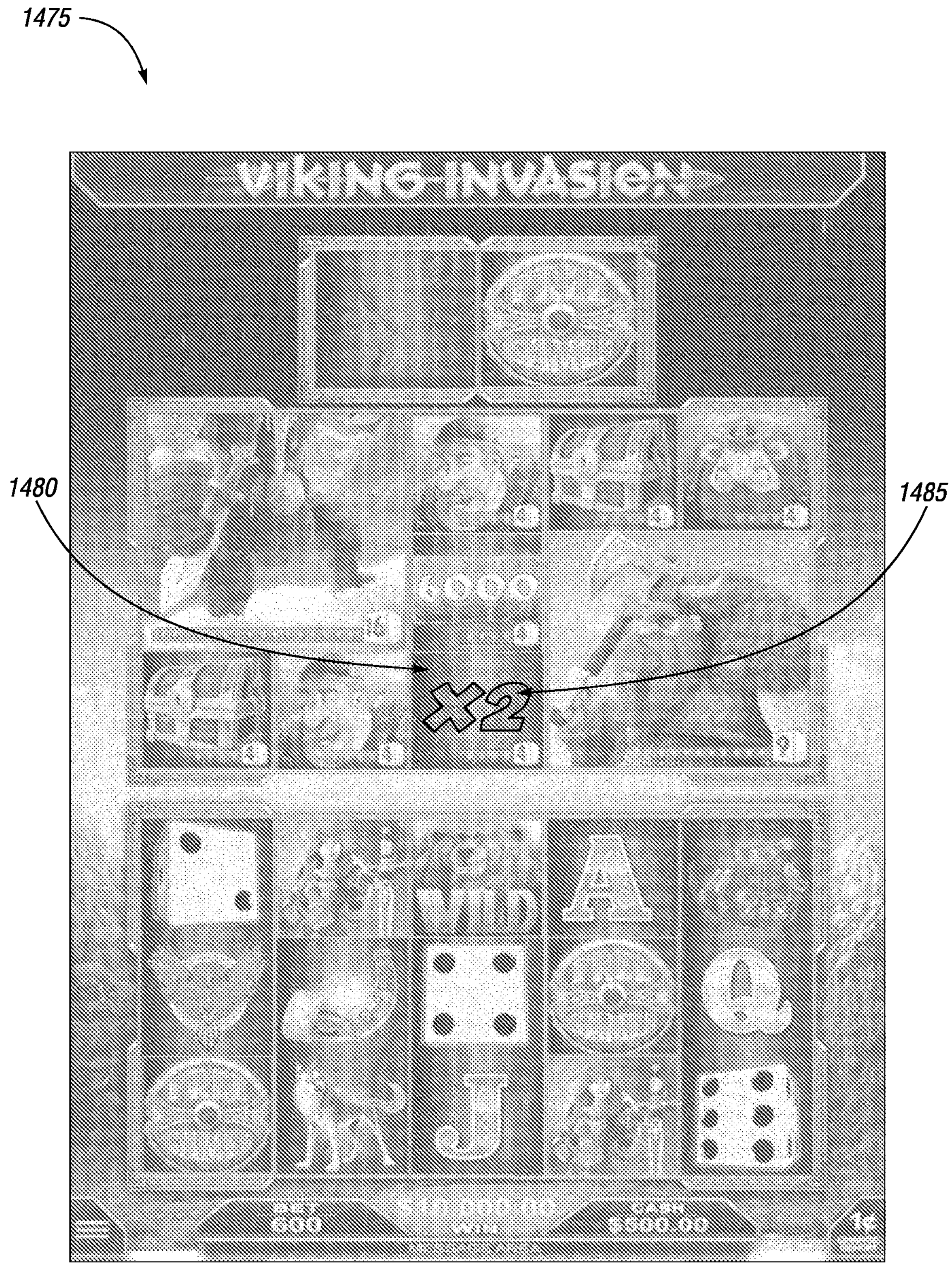
FIGS. 17A and 17B illustrate a gaming machine screen shot with the addition of a multiplier according to the embodiments of the present invention.
Figure 17B:
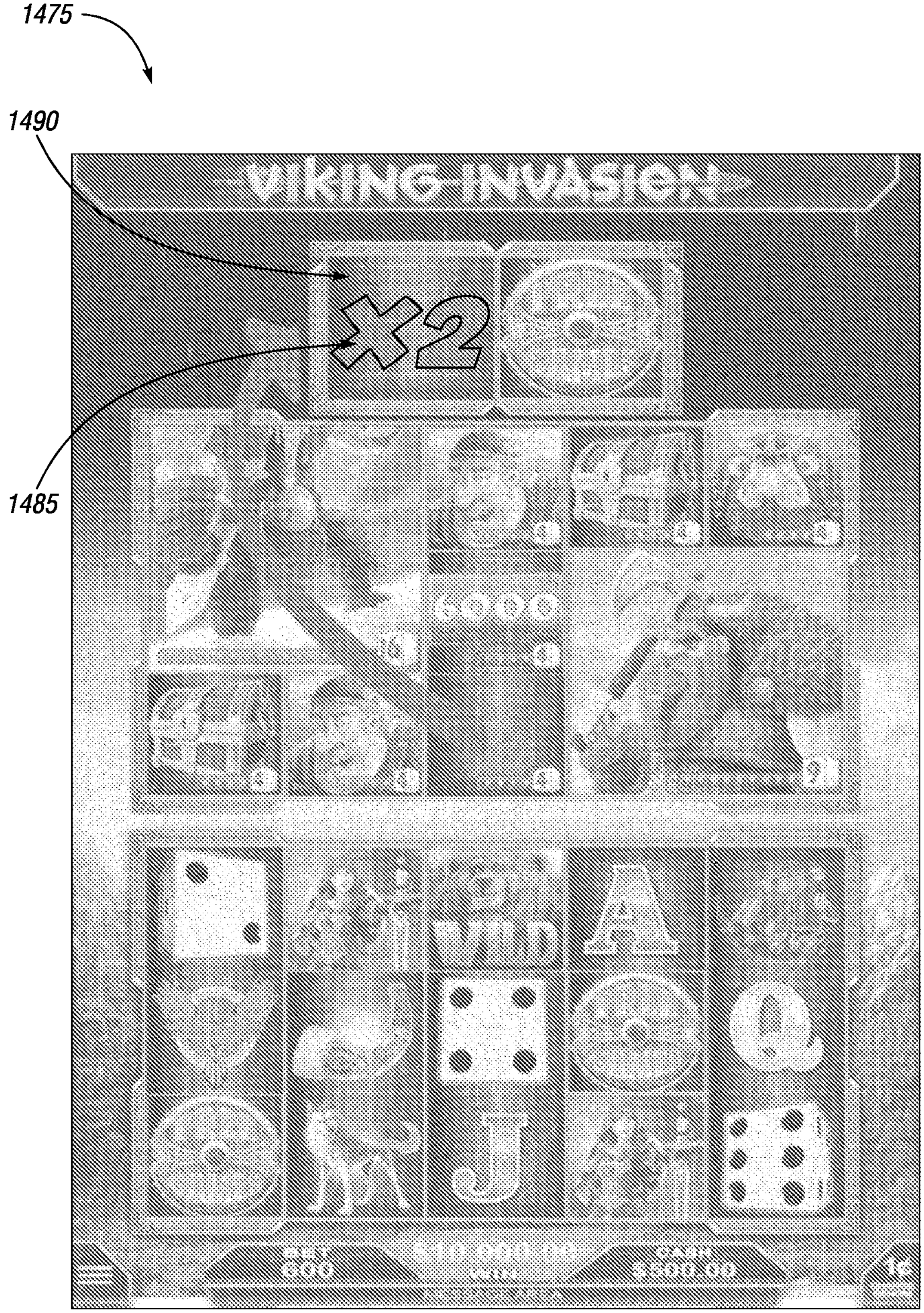

FIGS. 17A and 17B show a gaming machine screen shot 1475 with a multiplier feature according to the embodiments of the present invention. Those skilled in the art will recognize that the multiplier may be more or less than 2×. As shown in FIG. 17A, prize block 1480 displays a 2× multiplier 1485. In one embodiment, once the required PIPs are collected, as shown in FIG. 17A, the 2× multiplier is transposed to a non-prize block portion 1490 of the secondary game. In this embodiment, once the player collects enough PIPs to win a prize associated with a certain prize block, the prize amount is doubled based on the 2× multiplier in the non-prize block portion 1490 of the secondary game.

In another embodiment, characters (or any symbol) associated with the secondary game have associated prize awards. That is, a first character may always have large associated prizes while a different character may have small awards and yet another character may have random award sizes. Such an embodiment adds a level or excitement and player involvement as players will root for the appearance of one or more high award characters in the prize blocks.

Figure 18:
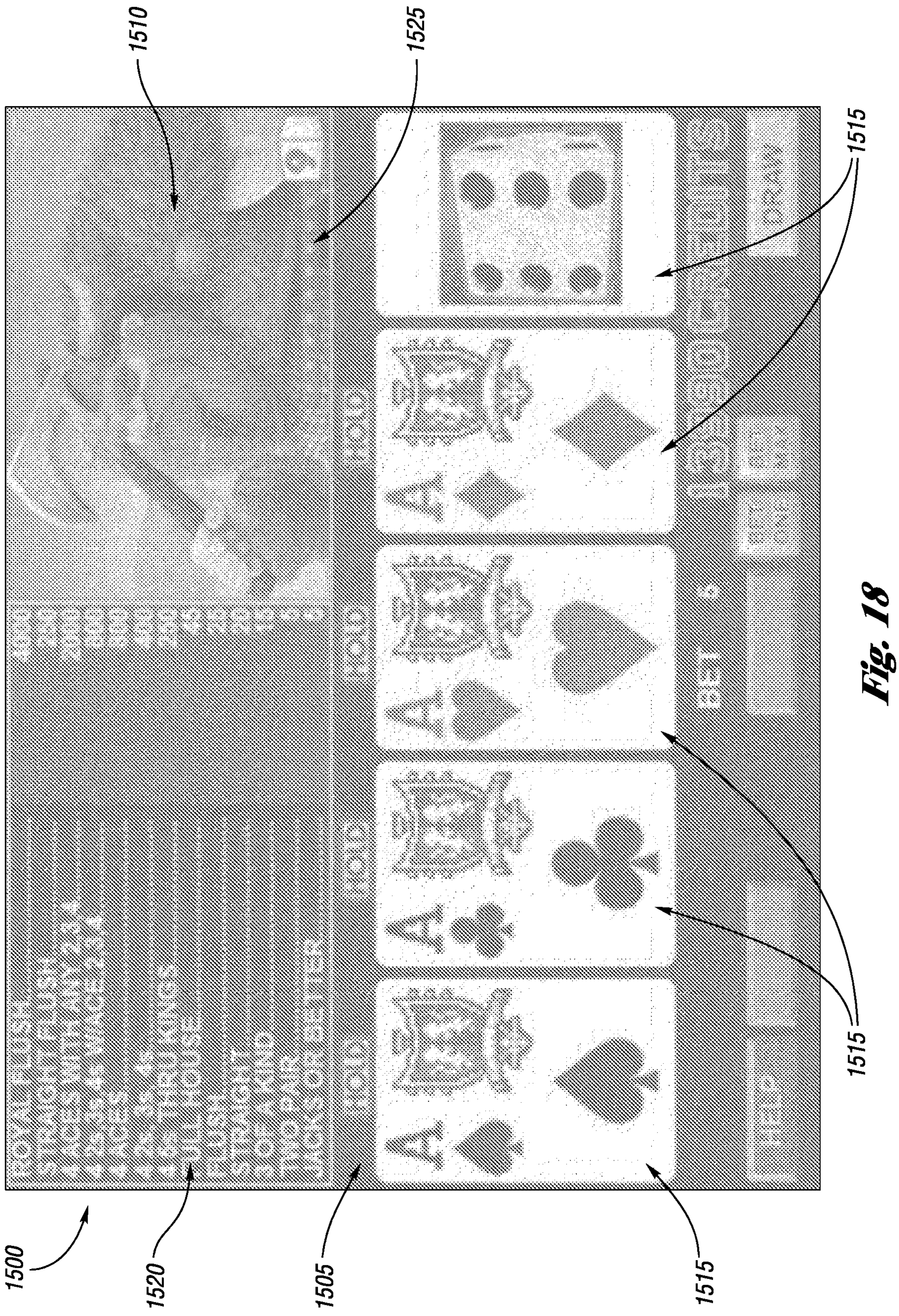
FIG. 18 illustrates a video poker game according to the embodiments of the present invention.

FIG. 18 shows a screen shot 1500 of an embodiment of the present invention with a video poker primary game 1505 instead of a slot game. As shown, the prize block 1510 sits above the video poker cards 1515 adjacent to the pay table 1520. Other arrangements are conceivable. As certain pre-established video poker hands (e.g., four of a kinds) are obtained, PIPs 1525 are collected. As detailed above, once the required number of PIPs are collected, an associated prize is awarded.

One of the benefits of the embodiments of the present invention is the ease of understanding the manner in which prizes are won. The primary game prizes are of the type players are accustom with EGMs whereas the secondary game prizes are easily observable based on the correspondence between the pre-established primary game symbols (e.g., dice) and the prize blocks. Whether lightning strikes or other visual features are used, players will quickly understand how the primary game outcomes impact the secondary game health values of the prize blocks.

While the detailed disclosure above focuses on the position of the dice on the primary game reels relative to the prize blocks, those skilled in the art will recognize that the relationship between the appearance of the dice and the health value of the prize blocks need not be based on position. By way of example, each die may be specifically targeted to one or more prize blocks without concern to relative position. Alternatively, each die may decrease the health value of a prize block in a randomly generated sequence.

While the detailed disclosure above focuses on a series of prize blocks, it is apparent that the embodiments of the present invention may utilize a single prize block with a single health value with all dice appearing on the primary game display serving to diminish the single health value. The single prize block may be combined with a series of prize blocks such that once the single prize block is removed, a series of prize blocks replace it.

While the detailed disclosure above focuses on an immediate award of a prize based on a prize block having zero health value, in other embodiments, the destruction of a prize block may open a new screen on which the player may win prizes based on random or skill-based activities. That is, the prize block may have a corresponding range of prizes which the player may win during play of the activity in the new screen.

While the detailed disclosure above focuses on health values being diminished, in another embodiment the health values may increase until a threshold is reached at which point a prize is awarded. Similarly, regardless of whether the health value diminishes or increases, in one embodiment, the health values may diminish or increase during a same game. That is, certain primary game outcomes may cause the health value to diminish while others cause an increase.

While the detailed disclosure above focuses on primary game outcomes impacting the health values of the bottom-most prize blocks, in other embodiments the primary game outcomes may impact any of the prize blocks present on the secondary game display. In conjunction with this embodiment, while the detailed disclosure above focuses on new prize blocks dropping or cascading into voids left by removed prize blocks, in this embodiment the prize blocks may be static such that when a prize block is removed (not having to be any of the bottommost prize blocks) a new prize block appears, taking its place without any of the other prize blocks moving. By way of example, referring to FIG. 11A, the removal of prize block 1120-5 for exhausted health value would trigger a new prize block of the same size taking its place. The new prize block may have the same or different prize value and/or health value as the prize block it replaces.

While the detailed disclosure above focuses on removed prize blocks being replaced immediately upon being removed, in another embodiment, the arrangement of prize blocks is static. In this embodiment, once all prize blocks are destroyed and removed, a completely new arrangement of prize blocks is mapped on the secondary game display. In this manner, the player must destroy all prize blocks before a new arrangement of prize blocks is presented to the player. In this embodiment, the destruction of all prize blocks may trigger an additional award to the player.

Figure 19A:
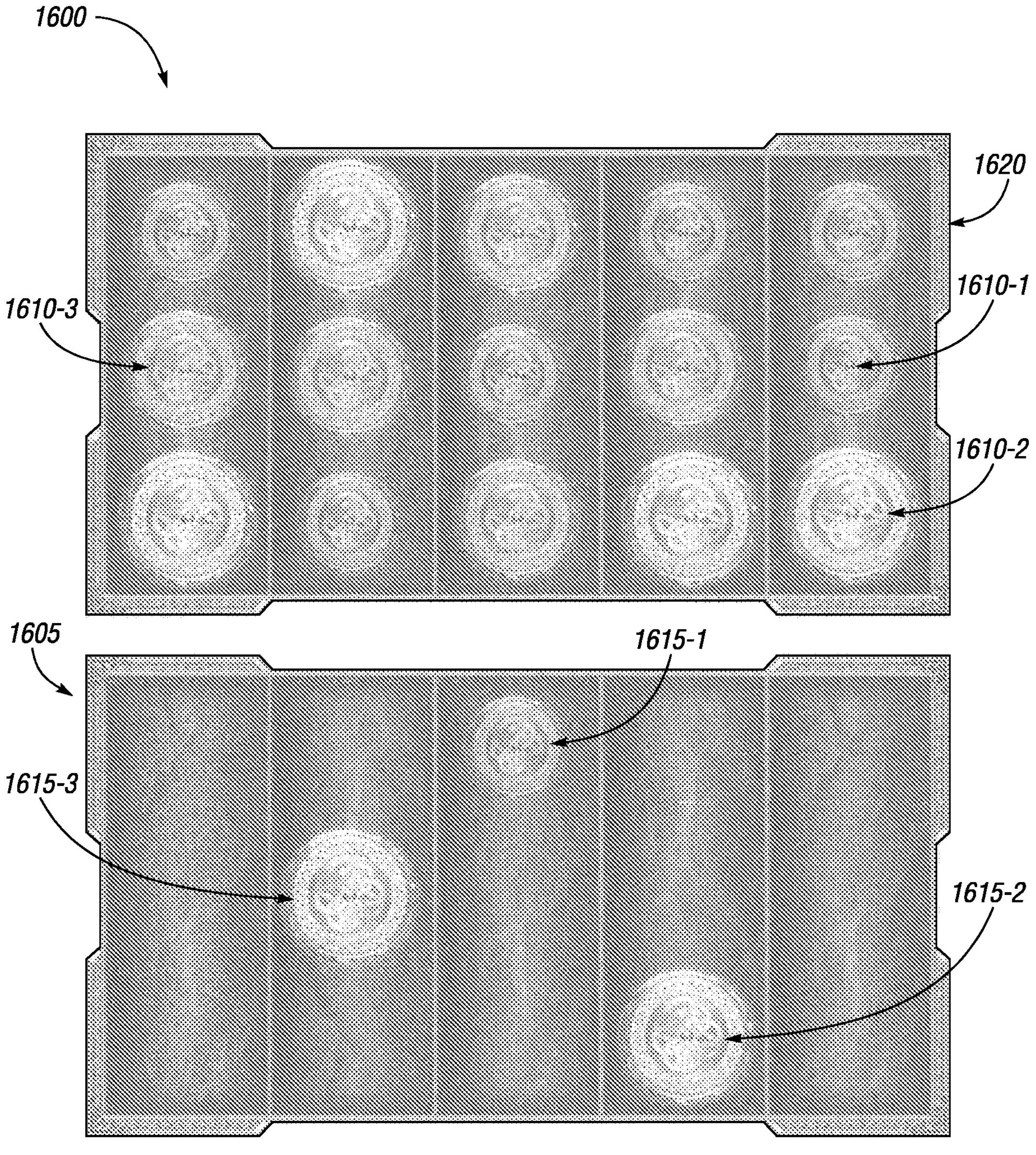
FIGS. 19A through 19G illustrate another embodiment utilizing indicia in the form of coins according to the embodiments of the present invention.
Figure 19B:
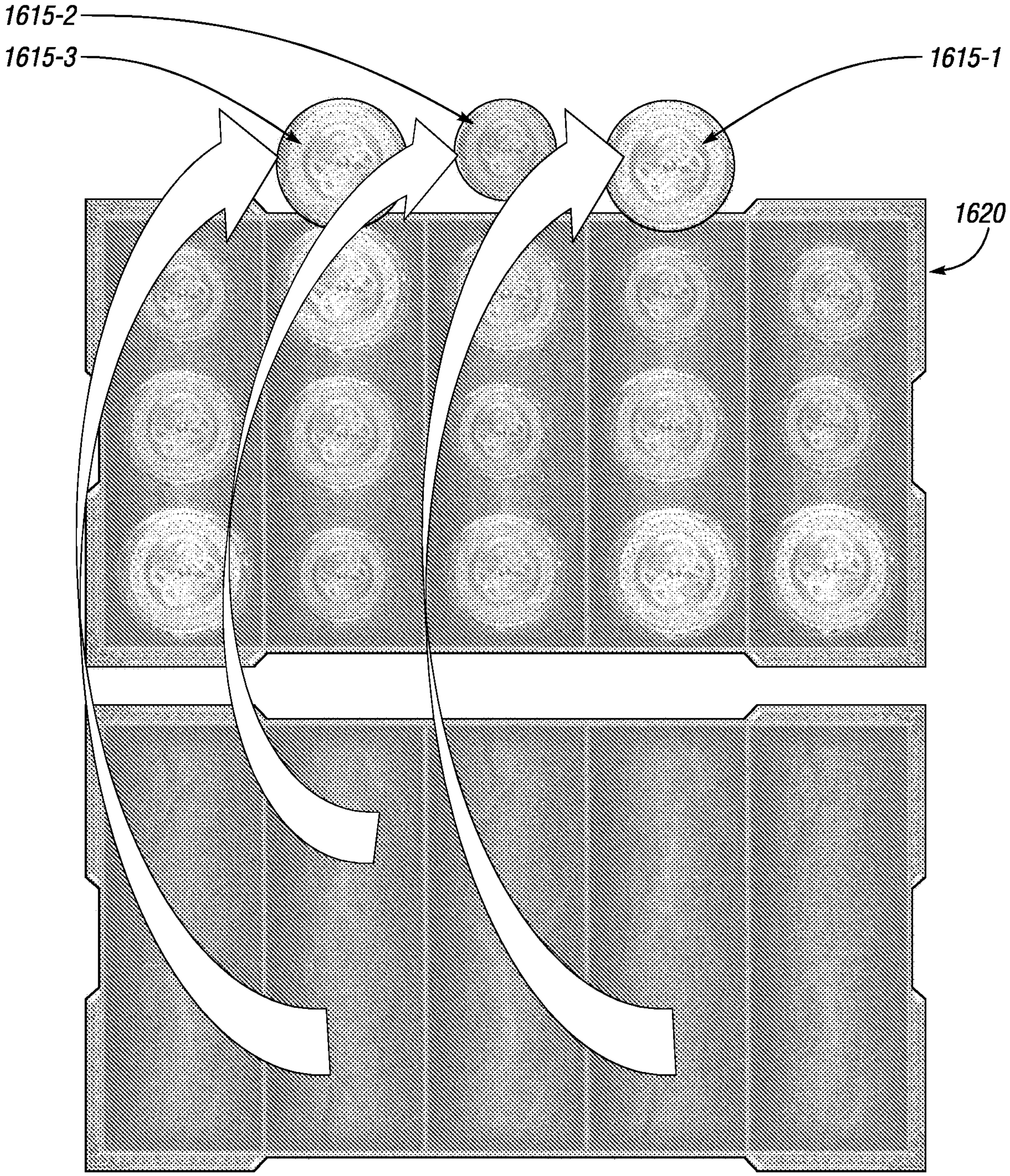
Figure 19C:
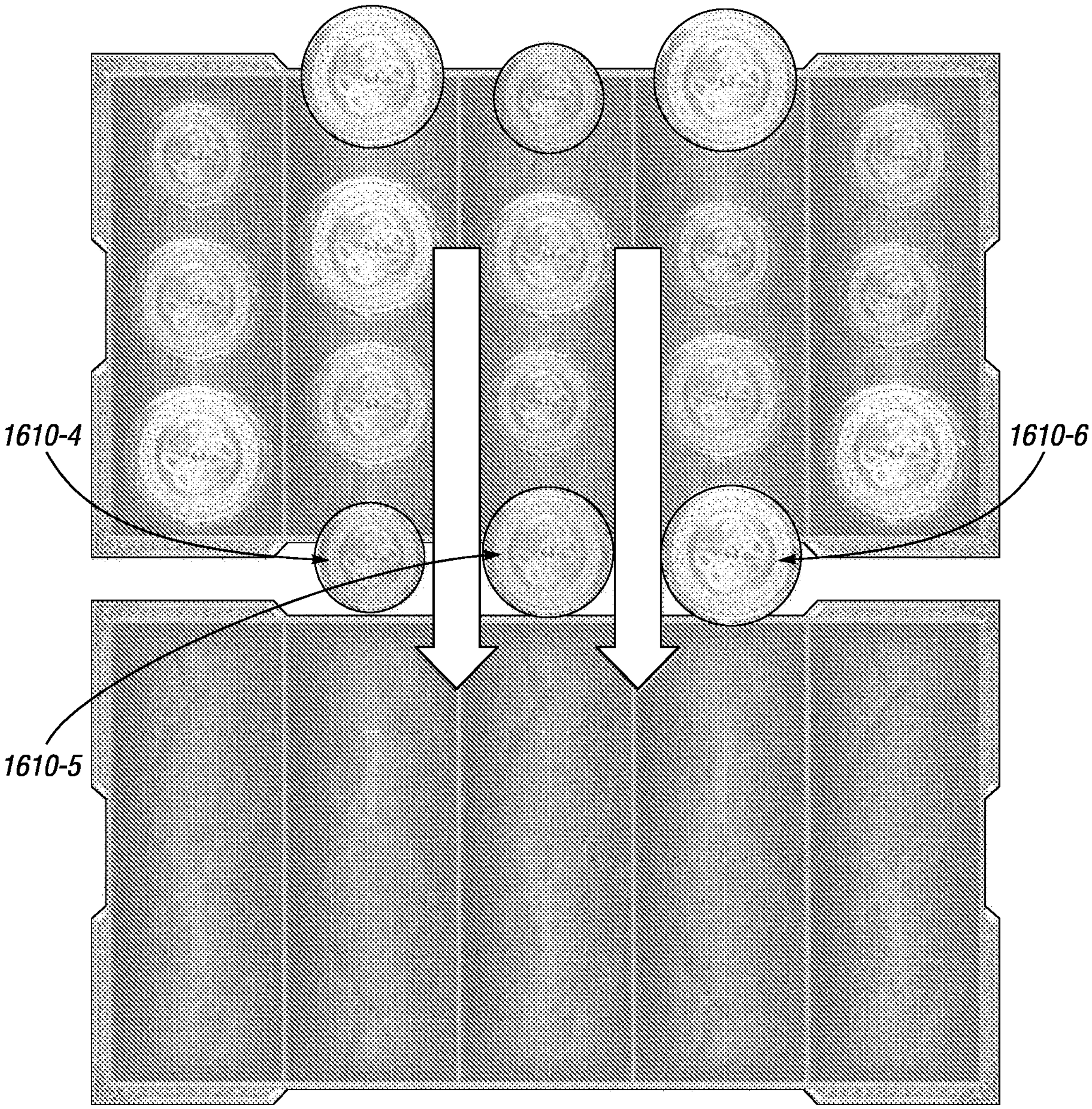

FIGS. 19A through 19C illustrate another embodiment of the present invention utilizing indicia in the form of coins. In broadest terms, as coins are added to a secondary game display, existing coins are forced downward until falling off a virtual platform. Once the coins fall from the platform, associated prizes are awarded.

Figure 19D:
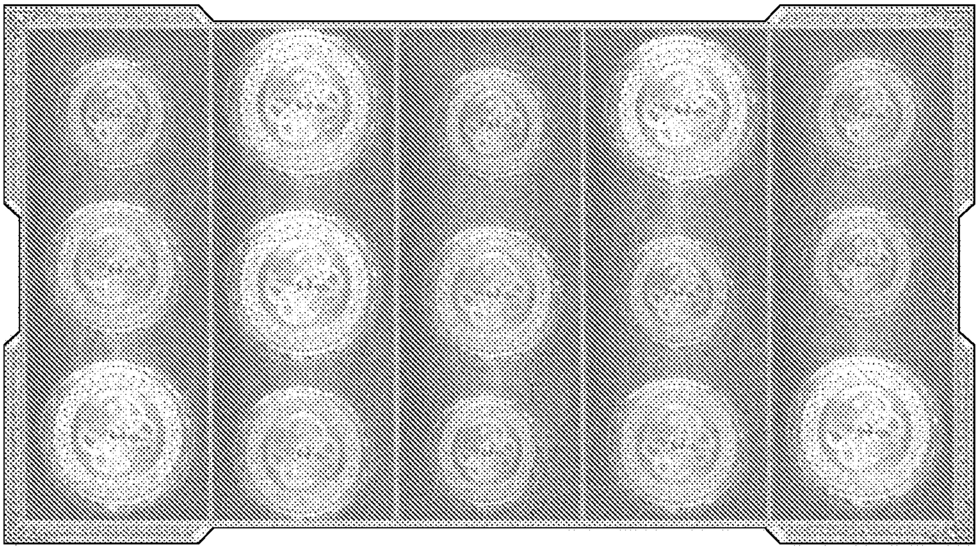
Figure 19D:
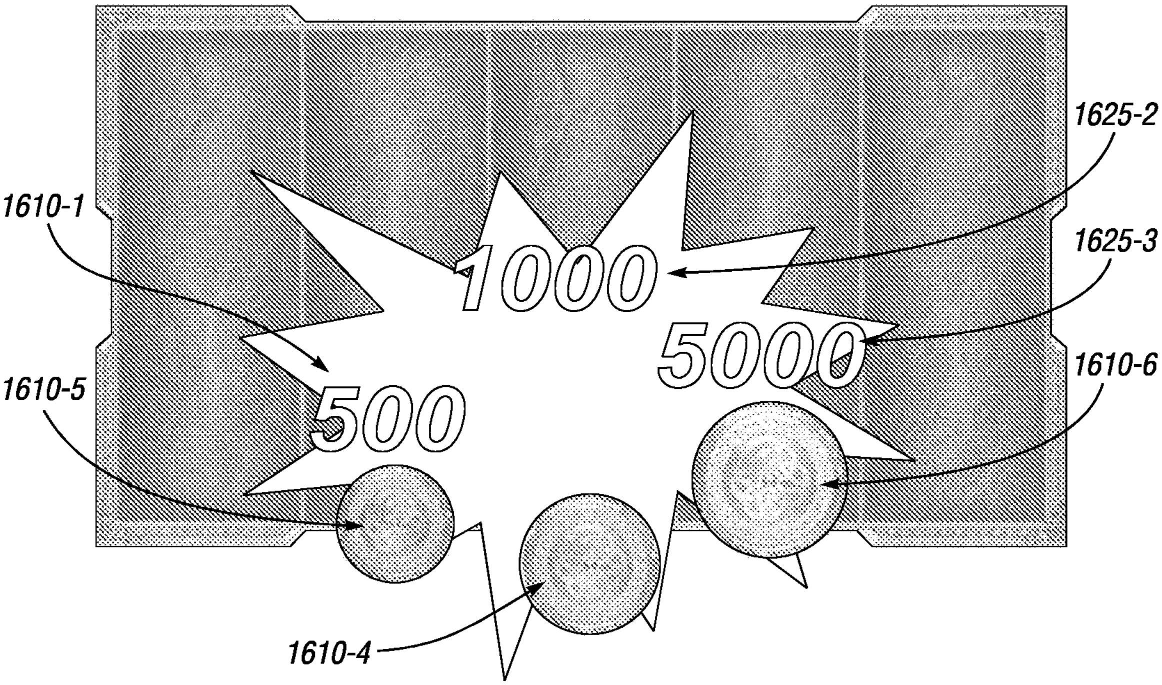

FIG. 19A shows a primary display 1600 and secondary display 1605 with various unique coins 1610-1 through 1610-3 populating the secondary display 1605. As coins 1615-1 through 1615-3 randomly appear on primary game reels, the coins, as shown in FIG. 19B, are transposed to the secondary display 1605 near the top of the platform 1620. In one embodiment, the coins 1615-1 through 1615-3 may be shown moving upward through the primary display 1600 and re-appearing as shown in FIG. 19B. Alternatively, the coins 1615-1 through 1615-3 may simply appear at the top of the platform 1620 as shown in FIG. 19B. In either instance, the addition of the coins 1615-1 through 1615-3 to the platform 1620 of the secondary display 1605 causes all existing coins, including coins 1610-4 through 1610-6, to shift downward. Since coins 1610-4 through 1610-6 were on the lowest level of the platform 1620, coins 1610-4 through 1610-6 are forced off the platform 1620 resulting in awards 1625-1 through 1625-3 associated with each coin 1610-4 through 1610-6 as shown in FIG. 19D. In one embodiment, the coins 1610-4 through 1610-6 may be shown dropping onto the primary display 1600 in conjunction with the awards being depicted.

Figure 19E:
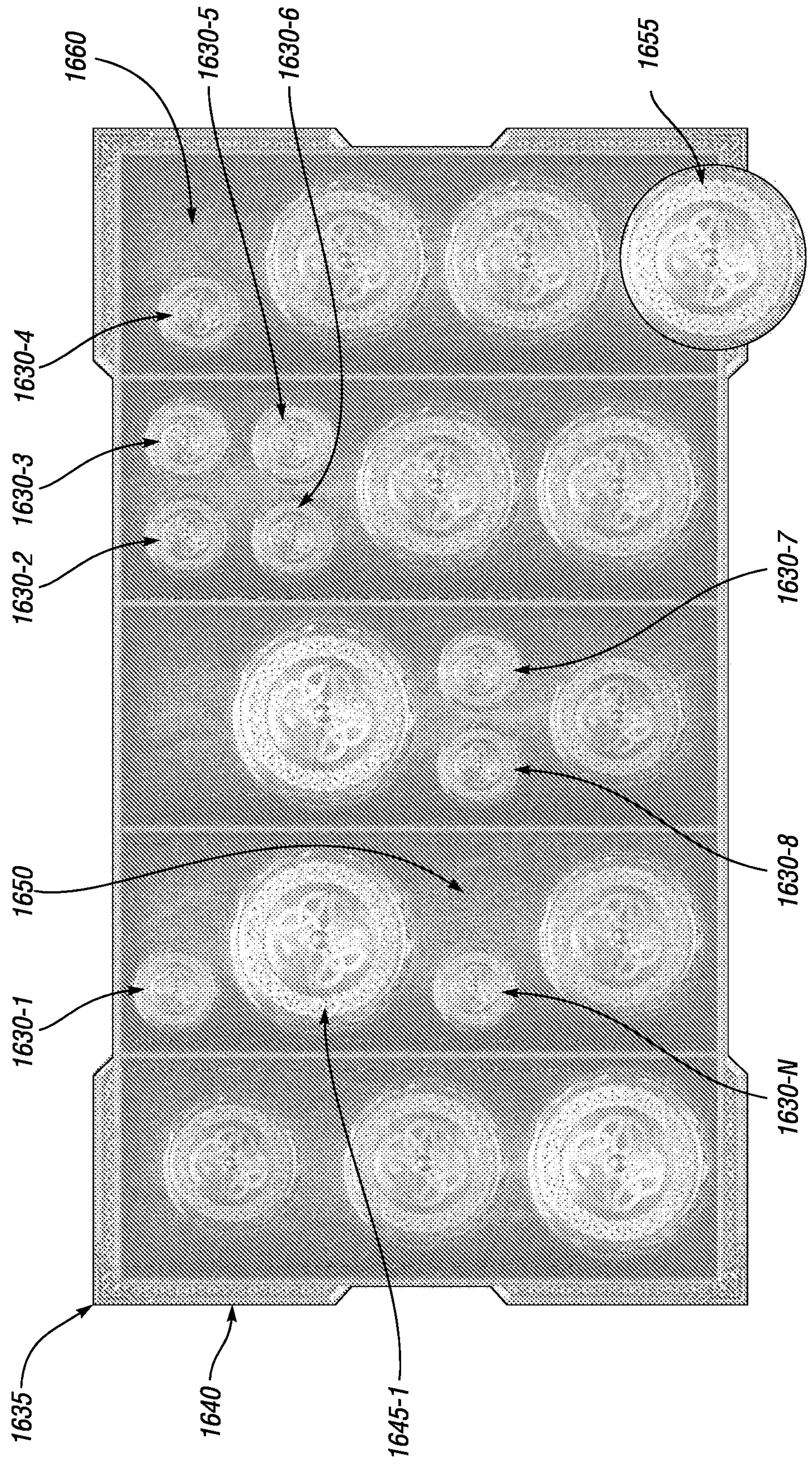
Figure 19F:
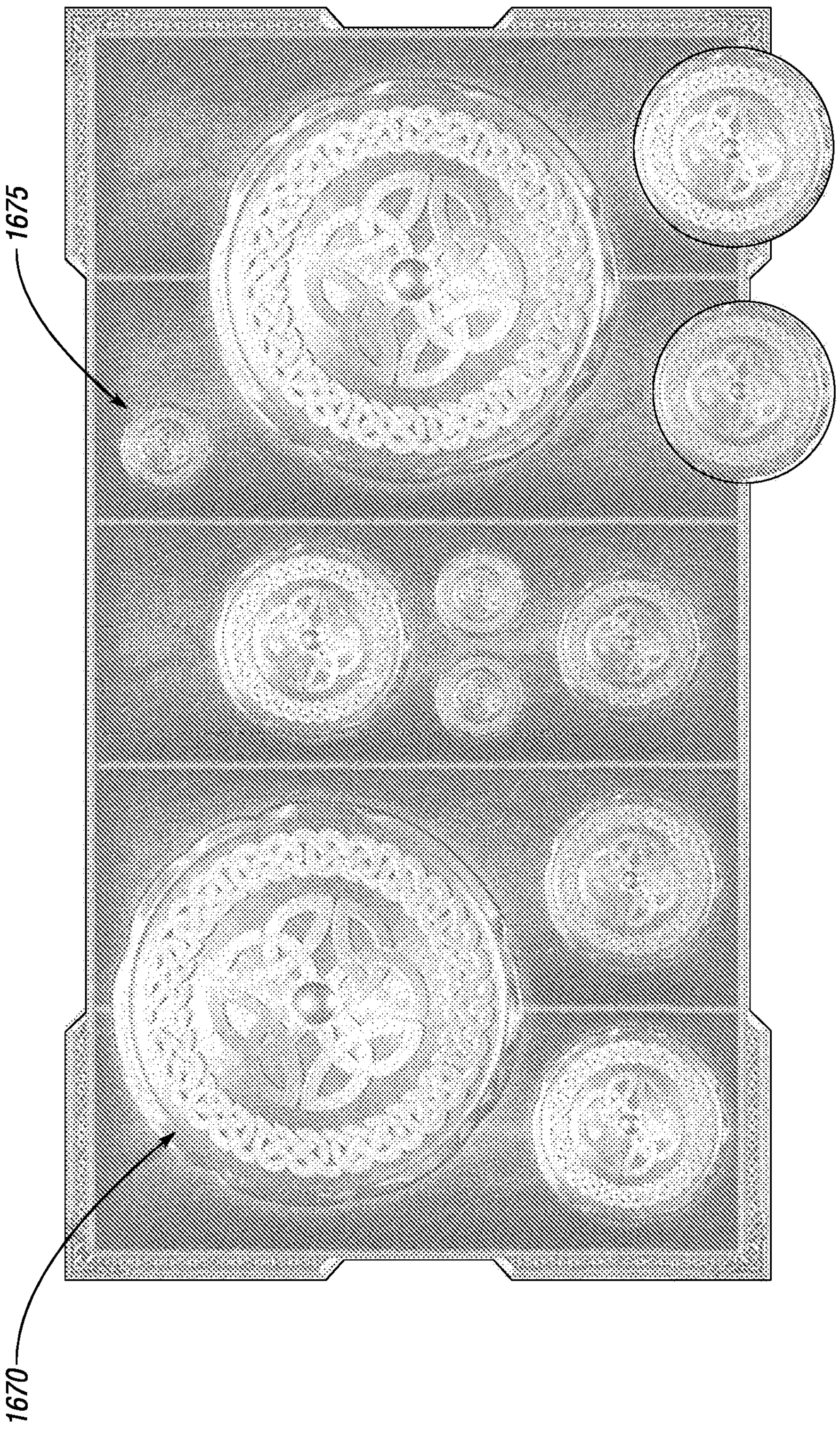
Figure 19G:
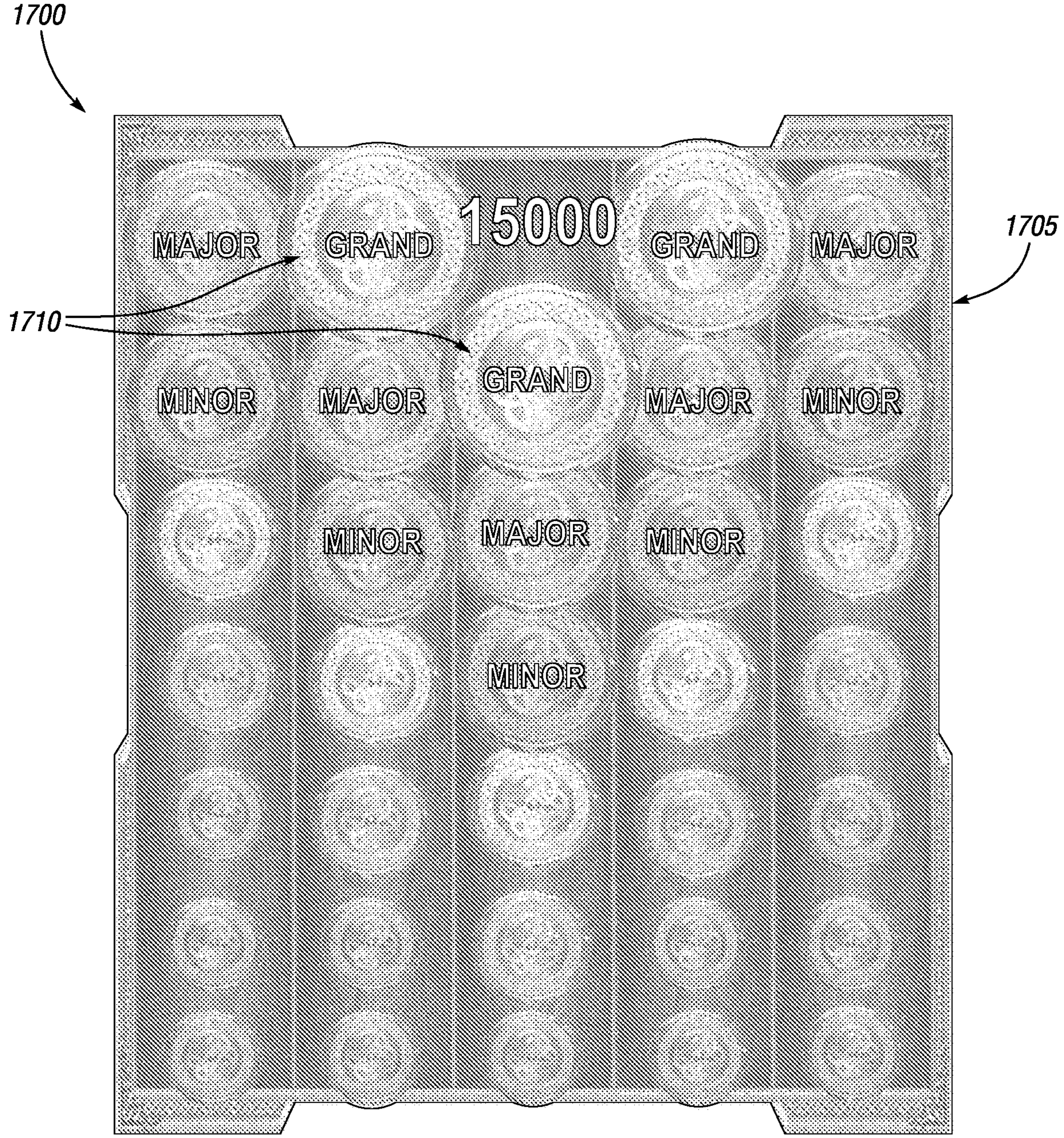

FIGS. 19E through 19G show variations of the coin embodiment of the present invention. In FIG. 19E, smaller coins 1630-1 through 1630-N are depicted whereby multiple coins sit side-by-side in the same column of the platform 1635 of secondary display 1640. Where one coin (e.g., coin 1630-4) resides at the top of platform 1635, a new small coin being transposed to the top of the same column of the secondary display 1640 fills in the open space such that no coins are forced downward. If a large coin (e.g., coin 1645-1) is transposed to the top of the same column of the secondary display 1640 as a small coin (e.g., coin 1630-N) the small coin is forced downward such that an open space 1650 exists.

FIG. 19E also shows that coins (e.g., coin 1655) may hand off the platform 1635 rather than be immediately forced off. This provides an additional layer of excitement and anticipation. Coin 1655 will only be forced off the platform 1635 if a large coin is transposed into the same column since a small coin will fill in space 1660 without forcing any coins downward.

FIG. 19F shows that larger coins covering multiple columns may be incorporated into the game. The large coins may be used to provide larger awards such as progressive awards or jackpots. Smaller coins (e.g., coin 1675) are able to fill in open spaces without forcing any coins downward.

FIG. 19G shows a secondary display 1700, platform 1705 and a high volume of coins 1710 with more valuable coins near the top of the platform 1705. In such an arrangement, the more valuable coins will take time to reach the bottom and thus will typically represent larger awards.

While coins are shown in FIGS. 19A-19G, those skilled in the art will recognize that other indicia, symbols and/or representations may be used. For example, depictions of automobiles, airplanes, zombies, playing cards, etc. may be used instead of coins. Moreover, different indicia may be combined into one game. While the coins are shown in columns on the secondary display, those skilled in the art will recognize that the coins (or other indicia) may be arranged in any random configuration conceivable. For example, the indicia may be randomly arranged on a circular tabletop such that the addition of each new indicia forces existing indicia towards the edge thereof. Once an indicia falls from the tabletop, a prize is awarded. For clarity, each new indicia need not move any existing indicia but may rather occupy an open space (e.g., a space on the tabletop not occupied by any existing indicia).

Figure 20:
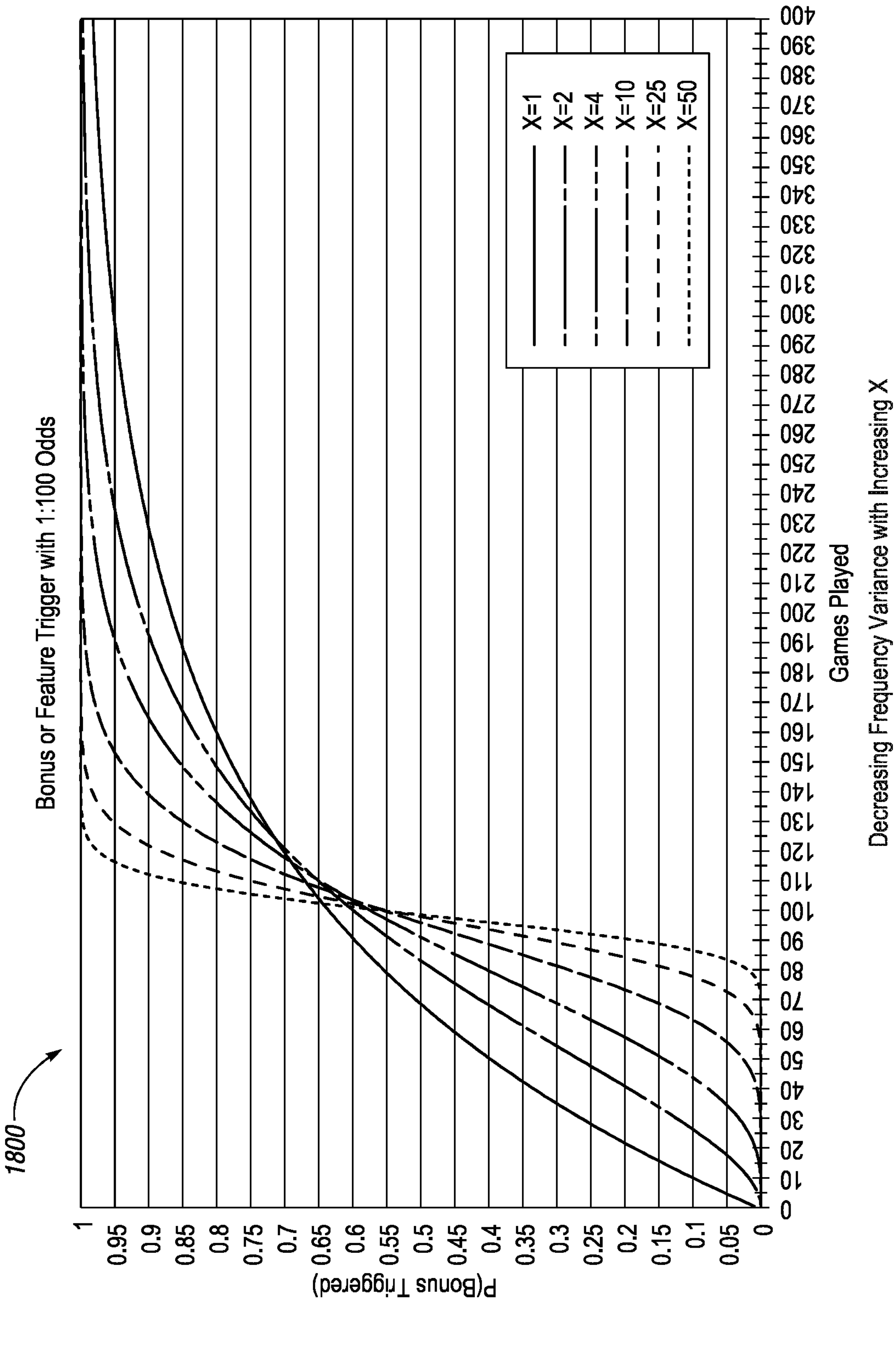
FIG. 20 illustrates a graphical representation of a mathematical payout model according to the embodiments of the present invention.

FIG. 20 illustrates a graphical representation of a mathematical variant of the present invention which divides the traditional single discrete event RNG model into a significant number of smaller discrete RNG sub-events of the present invention which greatly reduces the frequency of "cold streaks".

One threshold consideration of EGM manufacturers, game designers and mathematicians are the effects game math has on a game and its performance over time. Generally, positively performing games, e.g., those that have an average win higher than the house average game win, may remain on the casino floor over time while those underperforming games, e.g., those that have an average win lower than the house average game win, may be removed from the casino floor or need to be converted to a better performing game theme as dictated by a particular casino.

Persistent style slot games are often initially accepted by players only to be rejected later—buy why? For many games, part of the analysis resides on the volatility of a particular game. Often volatility is determined by what percentage of RTP is generated by the base game as opposed to the bonus or feature RTP. Low volatility games may have a base return of 85% and a bonus or feature RTP of 15%. These games, on average, will be quite predictable for players with limited large scale positive or negative swings that may encourage or discourage players but do provide a better chance for reaching the player's anticipated play session time before they have used up their bankroll. However, these games are often considered very dull to players and thus may have a low or unacceptable player acceptance rate.

On the other end of the spectrum are higher volatility games, such as persistent style games according to the embodiments of the present invention, which may have, for example, a base return of 50% and a bonus or feature RTP of 50% or a net base return of 45% and a bonus or feature RTP of 45%, for games where the house RTP is 90%. These games, on average, will be very unpredictable for players with a high level of large scale positive or negative swings that may encourage or discourage players. Due to the nature of the math of high volatility games, players may have a much higher chance of a "hot streak" than low volatility games but conversely, they also have a much higher chance of hitting a "cold streak" or a streak that can have a devastating effect on a player's bankroll. While many players certainly like the "big win" aspects, what they often remember most are games that have encountered a protracted "cold streak" than have effectively broken the player's bankroll for the play session. This effect from high volatility games may take a game from a player's "favorite game" to a player's "most hated game" which may mean the end of play for that game for a particular player. The overall effect of this from a manufacturer's standpoint may be the game will need to be removed from a casino or the need to be converted to a different game theme. The volatility stabilizing math payout models according to the present invention, coupled with the persistent play aspect, greatly reduces the probability of a player encountering these devastating "cold streaks".

Typical math payout models award bonuses based on a probability table such as 150:1 or 0.00666667% based on one discrete event as determined by the random number generator ( ). For these cases, it is commonplace for the player to "miss" these discrete events. In other words, for a play session of 900 games and a probability of awarding a bonus every 150 plays, a player will be awarded, on average, a bonus 6 times during a play session. However, very often and as dictated by the laws of probability, a player will encounter sessions which may often award 7 or more bonuses in the same pool of 900 plays or conversely, award less than 6 bonuses per play session. Even the probability of hitting no bonuses during an entire 900 play session are not remote in the least.

Dividing the traditional single discrete event RNG model into a significant number of smaller discrete RNG sub-events according to the embodiments of the present invention greatly reduces the frequency of such devastating "cold streaks" and makes such games far more predictable but like previously discussed, too much predictability may not be a good thing relative to a player's expectations. By providing a combination of unpredictable standard single discrete RNG events and higher predictability increased number of smaller discrete RNG sub-events according to the embodiments of the present invention, the player may still enjoy the "hot streaks" while significantly reducing the probability of the devastating "cold streaks," which may lead to the conclusion that the game is not their "most hated game." Accordingly, the hybrid game may continue as a favorite game of the player for a much longer period. The ratio of standard single discrete RNG events and higher predictability increased number of smaller discrete RNG sub-events may vary between games and somewhat dependent of a particular game's volatility model.

In practice, dividing the traditional single discrete event RNG model into a significant number of smaller discrete RNG sub-events according to the present invention greatly reduces the frequency of such devastating "cold streaks." This is better understood by analyzing the effects for a typical player. Listed below in table 1 are exemplary starting game parameters and player wagering statistics of a typical player.

TABLE 1

| | |
|---|---|
| Number of plays per hour | 900 |
| Return to player percentage (RTP) | 90.0% |
| Bonus or feature probability | .006667 |
| Average number of bonuses per hour | 6 |
| Volatility base return/bonus return | 50%/50% |
| Volatility net base return percentage | 45.0% |
| Volatility net bonus return percentage | 45.0% |
| Average Wager | $1.00 |
| Player starting bankroll | $300 |
| Player anticipated play session time | 4 hours |

Under hypothetical conditions and simplified mathematical analysis for illustration purposes, where the bonus or feature is awarded exactly every 150 plays on a 90% RTP game, the player may expect to lose 10% of each wager made or spin of the game or $0.10 per spin or play. Accordingly, a player with a $300 bankroll would expect to go through their entire bankroll in just less than 4 hours or 3,000 total number of plays. Totals very close to the player's anticipated play session time of 4 hours.

Under these hypothetical conditions and simplified mathematical analysis for illustration purposes only, adjusting for the probability of a bonus or feature occurrence, if a player were to miss the first 3 trigger points of 150, 300, and 450, the player would have exhausted their initial bankroll of $300 in about 37 minutes. Far from their anticipated play session time. Such an occurrence could be considered an example of moving that particular game from a "favorite game" to the "most hated game" category, potentially leading to that player never or seldom playing that game again. Under the conditions above, this "cold streak" occurrence will happen every 8 playing sessions.

However, when the increased number of smaller discrete RNG sub-events are implemented by dividing it into 4 smaller discrete sub-events, the probability of the player hitting the "cold streak" described above is greatly reduced from 8:1 to 32:1.

Referring to the graph 1800 of FIG. 20, a more precise examination may be shown. The examination relates to a bonus trigger within a game wherein the bonus trigger occurs with odds. FIG. 20 shows the probability of having achieved the bonus after n games for various X values. The X=1 (see legend) case represents the typical case of triggering with 1 successful event with a probability of success of 1 in 100. For X=1, a 95% probability of having triggered the bonus at least once is not achieved until after 29 games. For X=50, however, we achieve a 95% probability of having triggered the bonus after only 117 games. This represents a dramatically lower amount of variance in the frequency of triggering the bonus, virtually eliminating the possibility of a significant "cold streak" in between trigger events. Conversely, the X=1 case achieves a 5% probability of having triggered the bonus after only 6 games, while for X=50 the probability of having achieved the bonus is 0% until the $50^{th}$ game and does not reach 5% until 84 games. So, while X=50 does virtually eliminate the "cold streaks," it also limits the possibility of any "hot streaks." Smaller values of X represent a more balanced approach. X=4, for example, achieves a 5% probability of the bonus after 3<games and a 95% probability of the bonus after 192 games.

For a random event with a probability p of occurring, the number of expected occurrences of the event over n trials is:

$$\mu=np$$

7 and the variance in the number of expected occurrences is:

$$v=np(1-p)$$

For an event with odds of 1:100 over 100 trials, one event occurrence with a standard deviation of ~0.995 over the 100 trials is expected. The large standard deviation relative to the expectation value can lead to excessively long "cold streaks" for the event, as well as occasional "hot streaks" where the event may occur multiple times more than expected over a short interval. Alternatively, the same number of expected event occurrences can be achieved over an interval n whilst also reducing the variance on the number of occurrences over the interval by modeling an event with probability p as being the accumulation of X successful sub-events, each with probability $$p_{sub}=Xp$$

The variance, $$v_{sub}=np(X-pX^2),$$

gains a dependence on X and approaches 0 as $$X \rightarrow \frac{1}{p}.$$

A drawback of this approach is that a minimum of X trials must occur before it is possible for the event to occur.

Using the embodiments of the present invention detailed herein, bonus triggers and low probability awards can be designed to be awarded at much more regular intervals whilst still maintaining an entirely random selection process and as previously discussed, when this system is used in conjunction with the standard single event trigger in a balanced manner, player expectations can more easily be met.

Figure 21A:
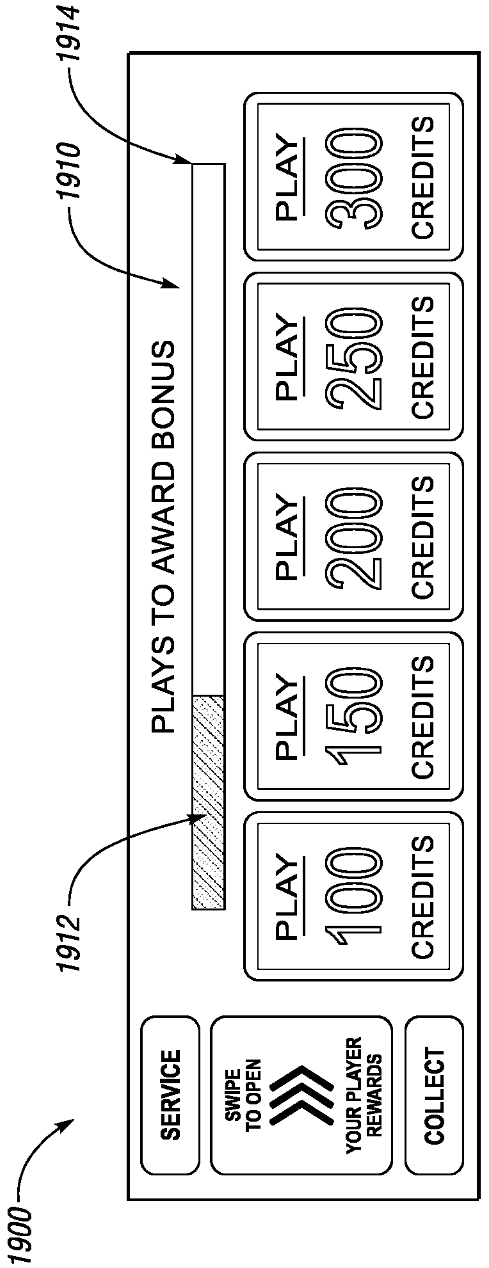
FIGS. 21A through 21D illustrate screen shots of an exemplary button deck having a countdown based on the unique bonus trigger model according to one embodiment of the present invention.
Figure 21B:
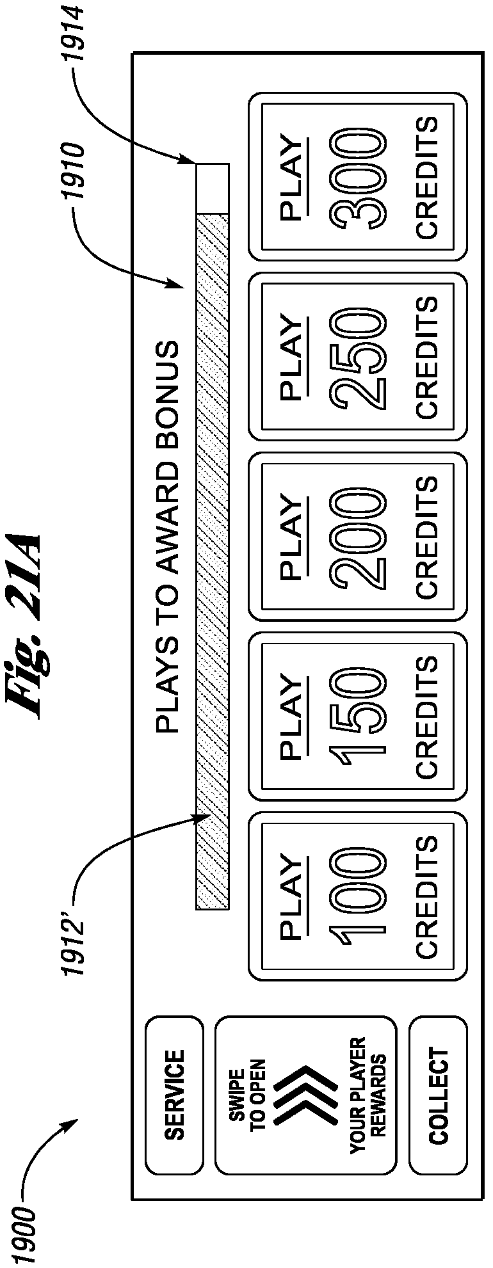
Figure 21C:
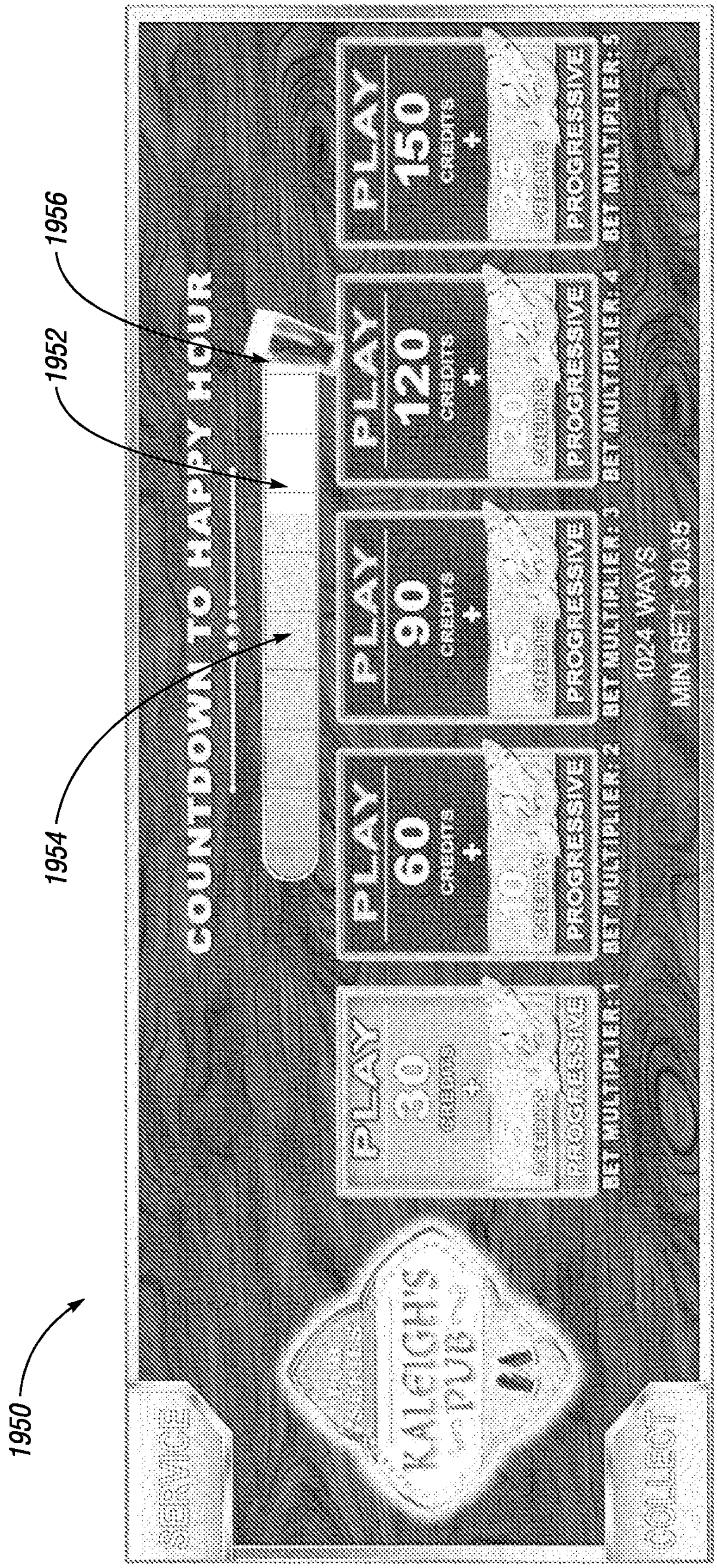
Figure 21D:
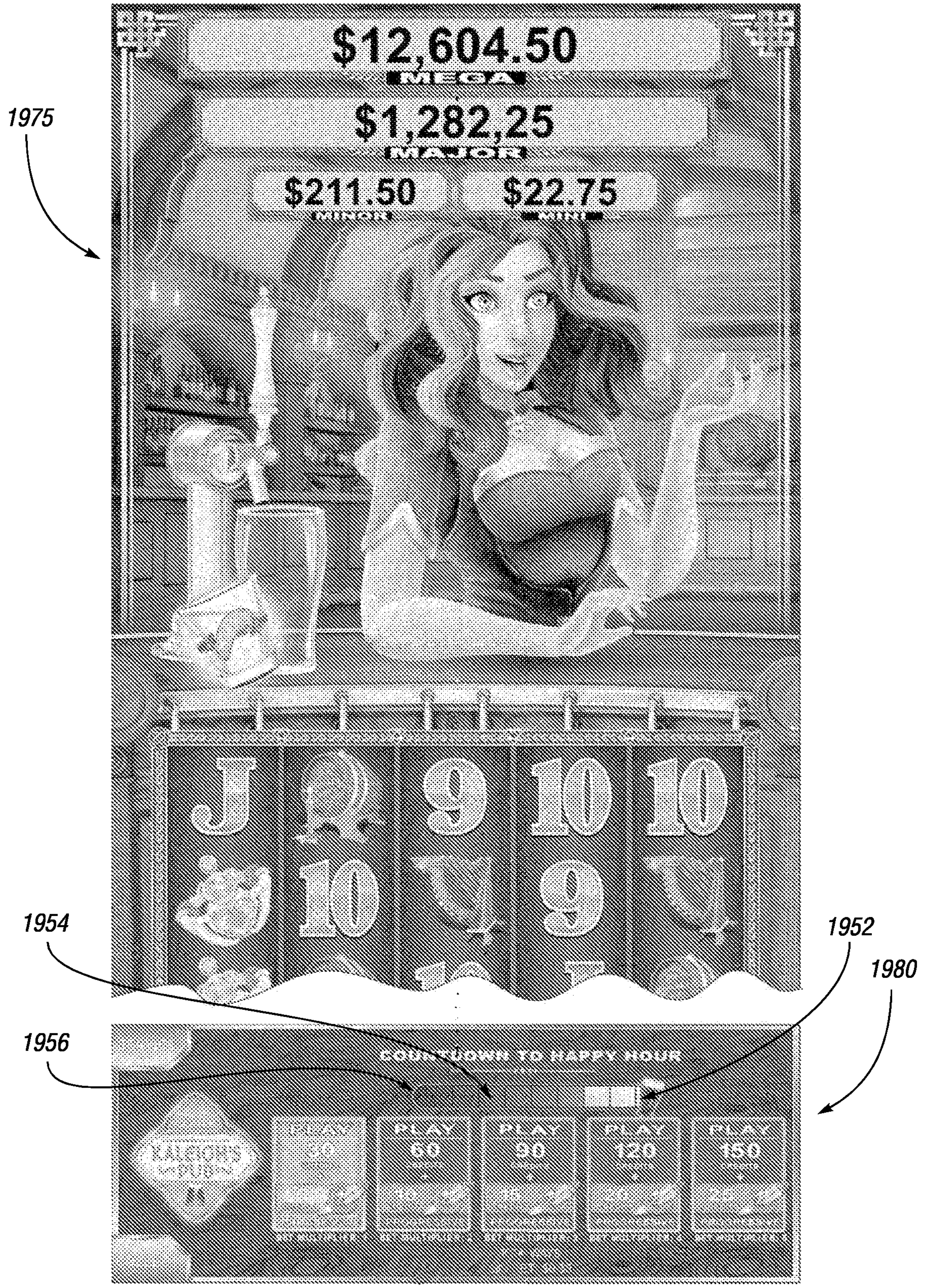

FIGS. 21A through 21C illustrate representative metering systems located on a touch screen LED button deck 1900 utilizing the embodiments of the present invention. When the higher predictability increased number of smaller discrete RNG sub-events is implemented, a meter 1910 of some type, as well known in the art, such as circular meters, bar graphs, pie style meters, etc., may be employed which may provide the player an indication of how many smaller discrete RNG sub-events have occurred 1912 and therefore, how many additional smaller discrete RNG sub-events need to occur to trigger the bonus or feature. For example, if the number smaller discrete RNG sub-events to trigger a bonus or feature is 10, the meter shows, either exactly or illustratively only, the meter progressing to the trigger point 1914. FIG. 21A shows the meter 1910 about 25% of the way 1912 to a bonus award while in FIG. 21B the meter 1910 has progressed to about 95% of the way 1912' to a bonus award. Accordingly, a player is alerted that a bonus or feature is closer to being awarded. If the number smaller discrete RNG sub-events to trigger a bonus or feature is 10 and 1 event has already occurred, the probability of hitting that bonus or feature is 135:1 for the last 9 sub-events for a game with math designed to award a bonus or feature every 150 plays. In such cases, the player visibly understands that the game is far from awarding a bonus or feature in which case they may leave or bypass the particular game. Accordingly, it may be preferable to start a meter, without any indicia or precise accuracy, at a non-zero point so not to alarm a player that a feature or bonus occurrence may be harder to reach. Conversely, if the number of smaller discrete RNG sub-events to trigger a bonus or feature is 10 and 9 sub-events have already occurred, the probability of hitting that feature or bonus is 15:1 for the last event. In such cases, the player visibly understands that the game is close to awarding a bonus or feature. FIGS. 21C and 21D show an exemplary button deck 1950 using a pub theme 1975. In this instance the meter 1952 is identified as countdown to Happy Hour about 75% of the way 1954 to a bonus award or feature shown as a glass of beer 1956. Those skilled in the art will recognize that the terms "bonus" and "feature" may be used interchangeably.

One advantage of providing sub-event wins (i.e., ticket accumulation) on losing primary game outcomes is that it causes players to feel like they have won something rather than simply lost the wager. That is, while not winning a monetary award related to the primary game outcome, the player has collected one or more tickets thus improving chances of reaching the threshold number of tickets associated with a prize award. Players are thereby encouraged and therefore tend to play longer. When players win one more tickets along with a monetary award related to the primary game outcome, players are once again encouraged and therefore tend to play longer.

FIGS. 22A through 22L show screen shots of the operation of one embodiment of the bonus game responsive to a primary game outcome triggering the bonus game. In this embodiment, players collect tickets whereby an accumulated threshold number of tickets causes a prize to be awarded.

Figure 22A:
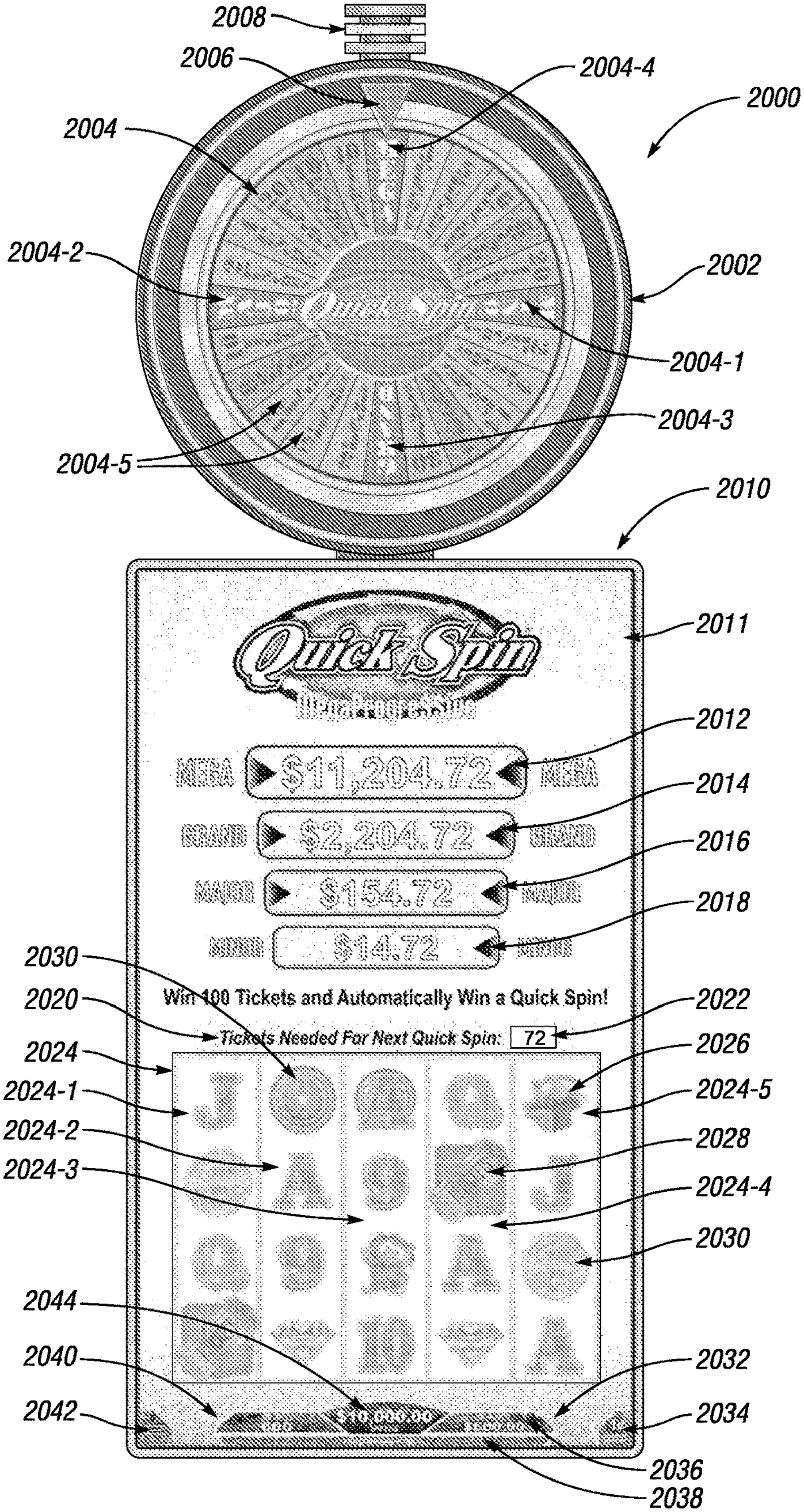
FIGS. 22A through 22K illustrate screen shots of an exemplary game utilizing the unique bonus trigger model according to one embodiment of the present invention.

FIG. 22A illustrates an electronic gaming machine with a game dividing the traditional single discrete event RNG model into a significant number of smaller discrete RNG sub-events to reduce the frequency of "cold streaks" and make such games far more predictable. While smaller discrete RNG sub-events may effectively be a binary outcome, either awarded sub-events or non-awarded sub-events, they may also award random or pre-assigned outcomes to increase randomness while continuing to reduce "cold streaks."

Electronic gaming machine 2000 includes a cabinet portion 2010 and a wheel topper 2002 which is mounted above the cabinet portion 2010. Further, the wheel topper 2002 may include a "candle" 2008 which when lit alerts the casino staff of various events that pertain to that particular electronic gaming machine such as the top LED ring being energized, signaling a machine malfunction, the center LED ring being energized to signal the electronic gaming machine needs service or the bottom LED indicating that a hand-pay is required as the player has won an amount either above the casino limit or an amount above the Internal Revenue Service limit, requiring the casino to provide a Form W2-G to the player prior to paying the player. While three LED rings are illustrated, they may take various similar forms to accomplish the same functions and may further be color-coded to assist the casino staff of what service may be required.

As shown, the wheel topper 2002 includes an inner portion that digitally or mechanically represents differing slices of the wheel 2004 and indicia 2004-1, 2004-2, 2004-3 and 2004-4, which represent a minor award, a major award, a grand award or a mega award, respectively, indicating what the player has won when the slice aligns with the illuminated indicator 2006. Wheel 2004 also includes a number of other awards a player may receive. Those skilled in the art will recognize that any type wheel configuration or indicia may be utilized and the wheel topper may be configured to provide many other game play options for the game play such as appearing to be a bubble gum machine, a large flipping coin, independent prize icons, an hour glass, etc.

Electronic gaming machine 2000 may be controlled by mechanical buttons, electromechanical buttons, electronic buttons, LED touch screens or similar as well known in the art (not shown). Such controls may include but not limited to play buttons, denomination buttons, sound adjust buttons, help buttons, speed buttons, etc.

Electronic gaming machine cabinet 2010 includes a portrait-oriented display 2011. Although a single portrait display is illustrated, other display configurations are possible such as dual landscape-oriented displays, triple landscape-oriented displays, single landscape-oriented displays, etc. and may include flat screens, curved screens, j-curve screens, wave shaped screens, etc.

The persistent game illustrated includes dividing the traditional single discrete event RNG model into a significant number of smaller discrete RNG sub-events to reduce the frequency of "cold streaks" making such games more predictable. The embodiments of the present invention also award random or pre-assigned outcomes to at least one or more sub-events to increase randomness while continuing to reduce "cold streaks." In the case of the embodiments of the present invention, the random outcomes to the sub-events are achieved by awarding tickets to the player based on predetermined criteria. The number of tickets awarded may be determined by the random number generator and may provide ranges of awards such as 1 to 10 tickets, 1 to 25 tickets, 10 to 50 tickets, etc. Once a predetermined number of tickets have been awarded to a player, the player is awarded a bonus game which in this case is a wheel-based game where the player initiates a wheel spin to determine the award once the digital wheel comes to a stop. Those skilled in the art will recognize that wheel spins are only one of many bonus types that may be awarded to a player. Other bonus types may include free games, multipliers, a different secondary bonus game, etc. or any combination thereof.

The wheel spin bonus according to the embodiments of the present invention provide a plurality of different player awards as illustrated by wheel 2004. If the wheel lands with the wheel slice 2004-1 in the 12 o'clock position, the player is awarded the minor progressive amount 2018, if the wheel lands with the wheel slice 2004-2 in the 12 o'clock position, the player is awarded the major progressive amount 2016, if the wheel lands with the wheel slice 2004-3 in the 12 o'clock position, the player is awarded the grand progressive amount 2014, and if the wheel lands with the wheel slice 2004-4 in the 12 o'clock position, the player is awarded the mega progressive amount 2012. Generally, the progressive amounts are incremented to a higher amount based on coin-in or other similar criteria. Alternatively, other awards may be made such as a number of "punches" to be used in the final stages of the bonus game as illustrated by wheel slices 2004-5.

Located on the display 2011 is a digital representation of a plurality of video reels 2024. As illustrated, video reels 2024 may include a number of individual video reels 2024-1, 2024-2, 2024-3, 2024-4 and 2024-5. The video reels may also include a number of symbols that when arranged in a predetermined pattern or sequence, provide the player with an award. For example, video reels 2024 may include a character symbol 2026, a free spin symbol 2030, a free ticket symbol 2028 or a free game symbol 2030. Many other symbols, such as "royal symbols" (9, 10, jack, queen, king or ace) may also exist along with other symbols such as jewels, dollar bills, coins with monetary or credit values, etc.

The display 2011 may also include a game status information area 2032 which provides information such as bet amount 2040, win amount 2044, if any, credit of monetary balance 2036 and messaging area 2038. In addition, other function buttons may be included such as an information and function button 2042 that may switch to alternative screens such as help area screens, sound adjust, speed adjust, etc., and/or a denomination change button 2034 which allows the player to change the standard denomination of bet, i.e., 10, 50, 250, 500, $1, $2 or $5.

The display 2011 may also include a counter information area 2020 that provides the player information on how close they are to being awarded a bonus spin, as shown in window 2022. The bonus or "Quick" spin is conducted via wheel 2002. As illustrated, a bonus, or in this case a "Quick" spin, is awarded when the player has accumulated a total of 100 tickets or more. If a player is awarded a number of tickets in excess to that required, the game may be programmed to delete the number of tickets in excess of 100 or may roll over the excess ticket to another game. Although this embodiment provides the player with an exact number of tickets remaining to accumulate for a bonus spin to be awarded, those skilled in the art will recognize that the player need not be provided with exacting information but instead could be provided with a graphical representation such as a bar graph, circular graph, etc. that only provides an estimation of tickets remaining to accumulate. Moreover, it may be advantageous to start such a representation at a non-zero position so not to overly concern a player that the bonus if far away. In such cases, the graphical representation could start at a one-third or one-half position, for example.

Figure 22B:
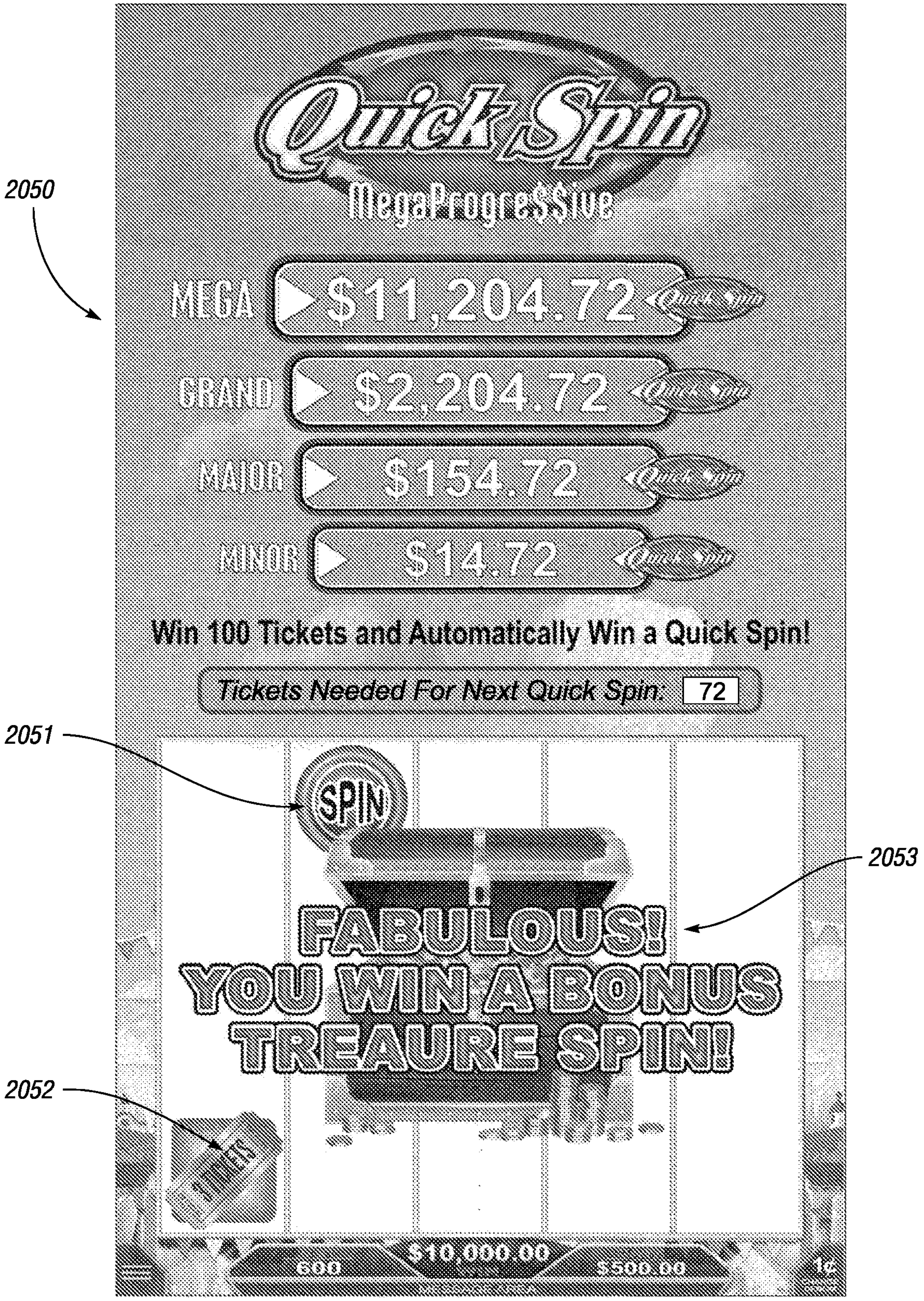

FIG. 22B shows a screen shot 2050 of a primary slot game outcome triggering the bonus game. In one embodiment, the bonus game is triggered about 1% of the primary game spins. Those skilled in the art will understand that the percentage may be less than or greater than 1%. In this instance, the slot game outcome is Spin Icon 2051 aligning along an active payline. As shown, the player also wins 3 tickets based on the Ticket Icon 2052 aligning along an active payline. Optionally, the primary game screen may display a notice 2053 of the bonus game being triggered.

Figure 22C:
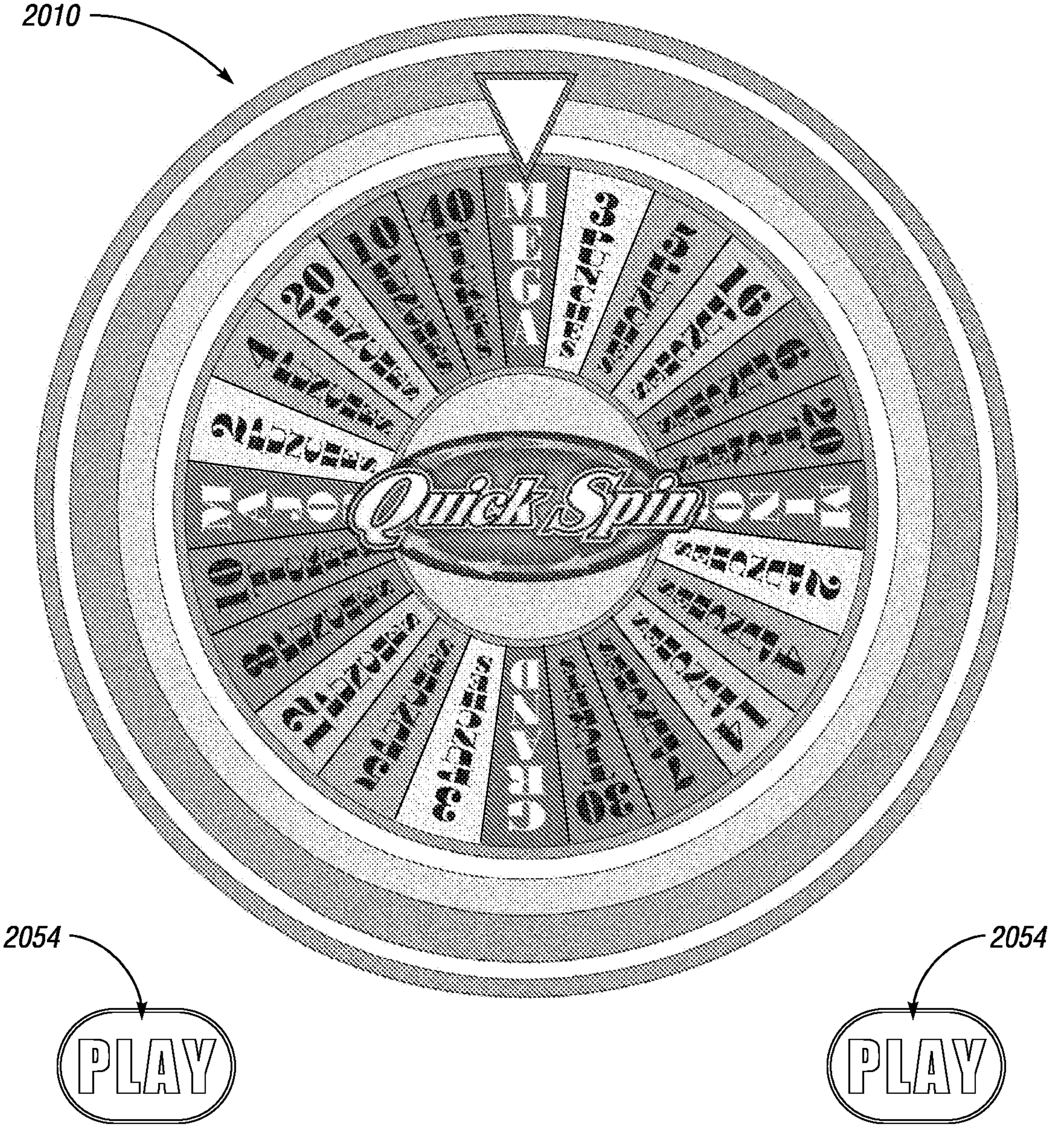
Figure 22D:
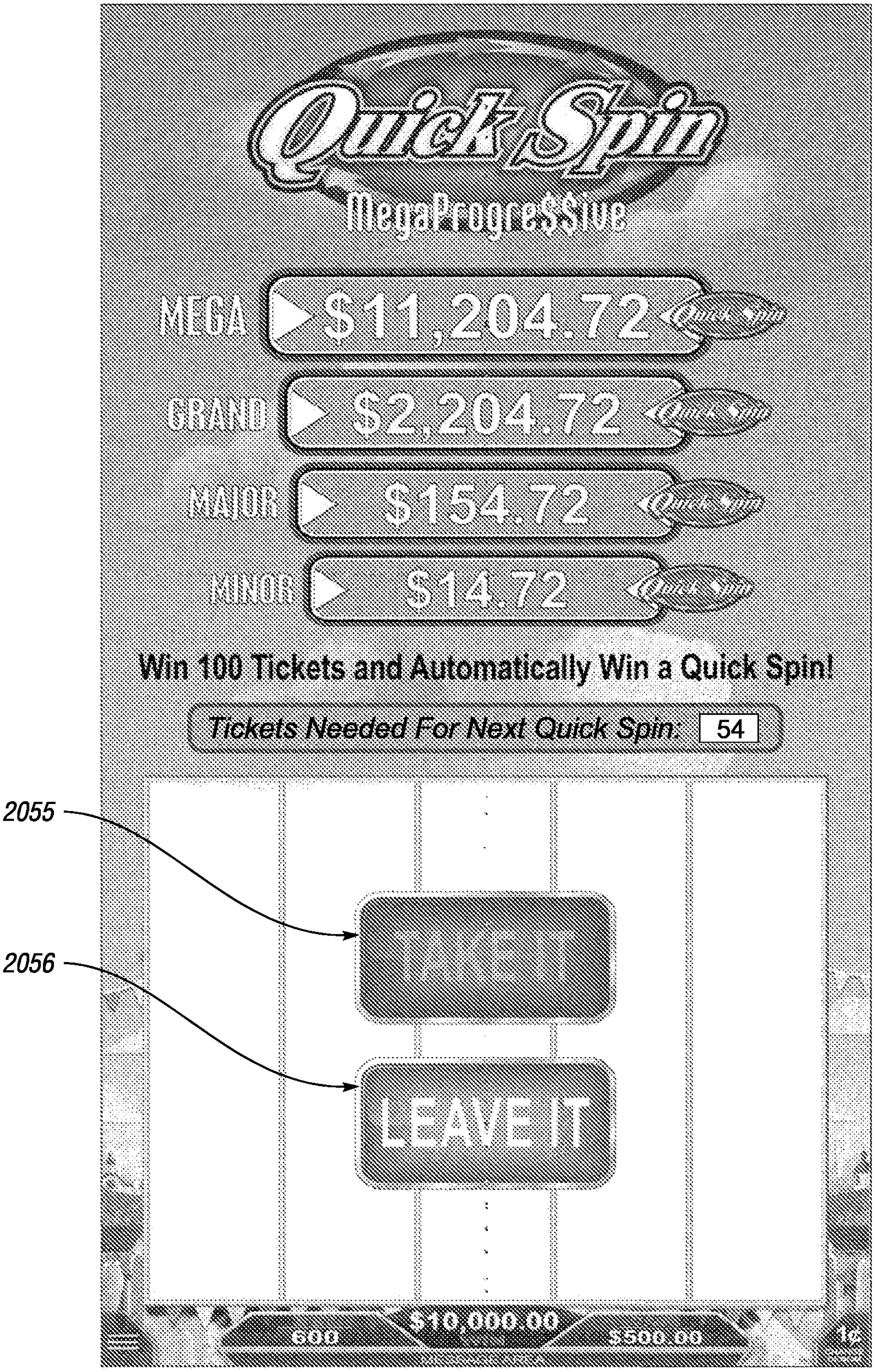
Figure 22E:
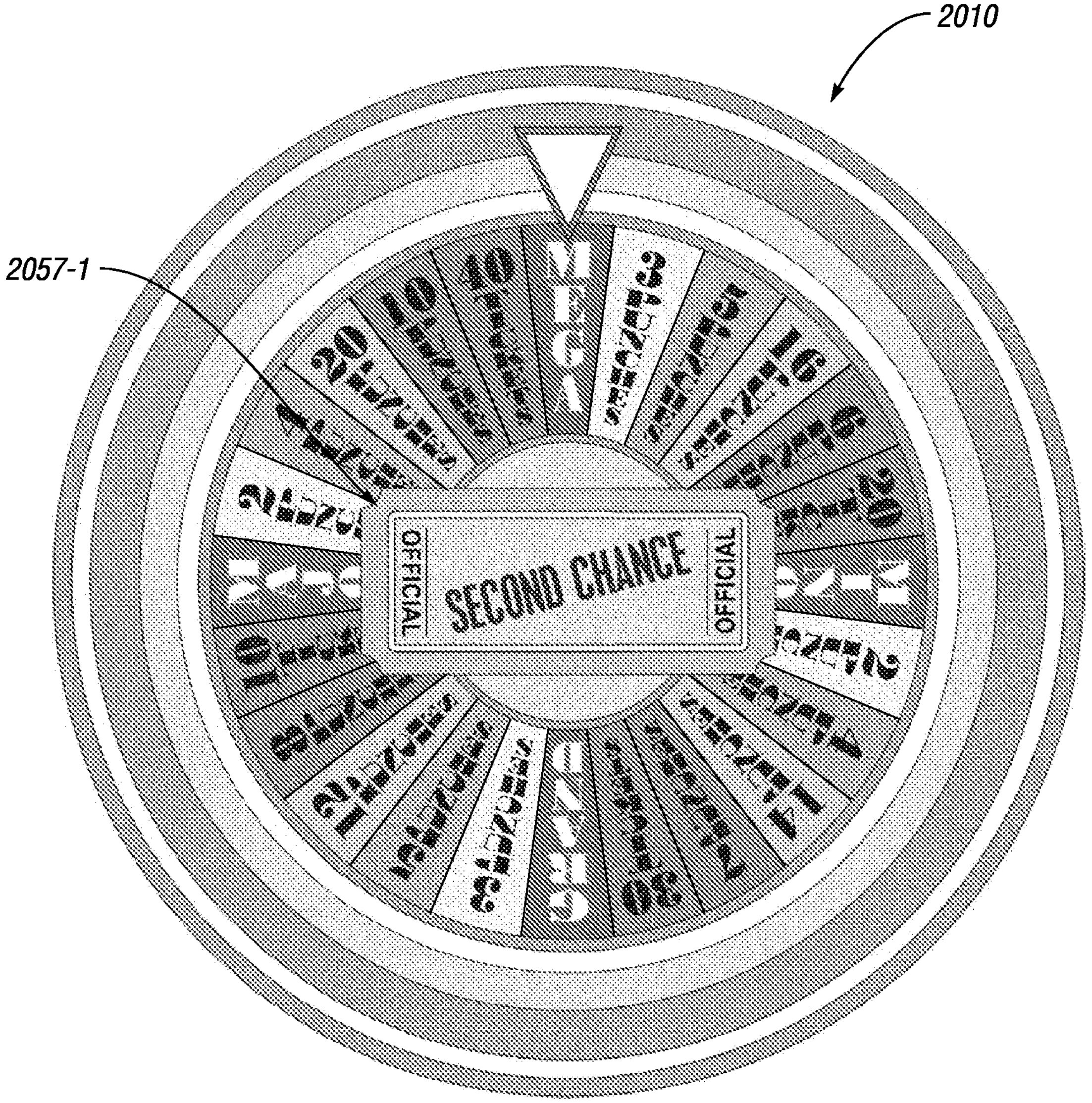
Figure 22F:
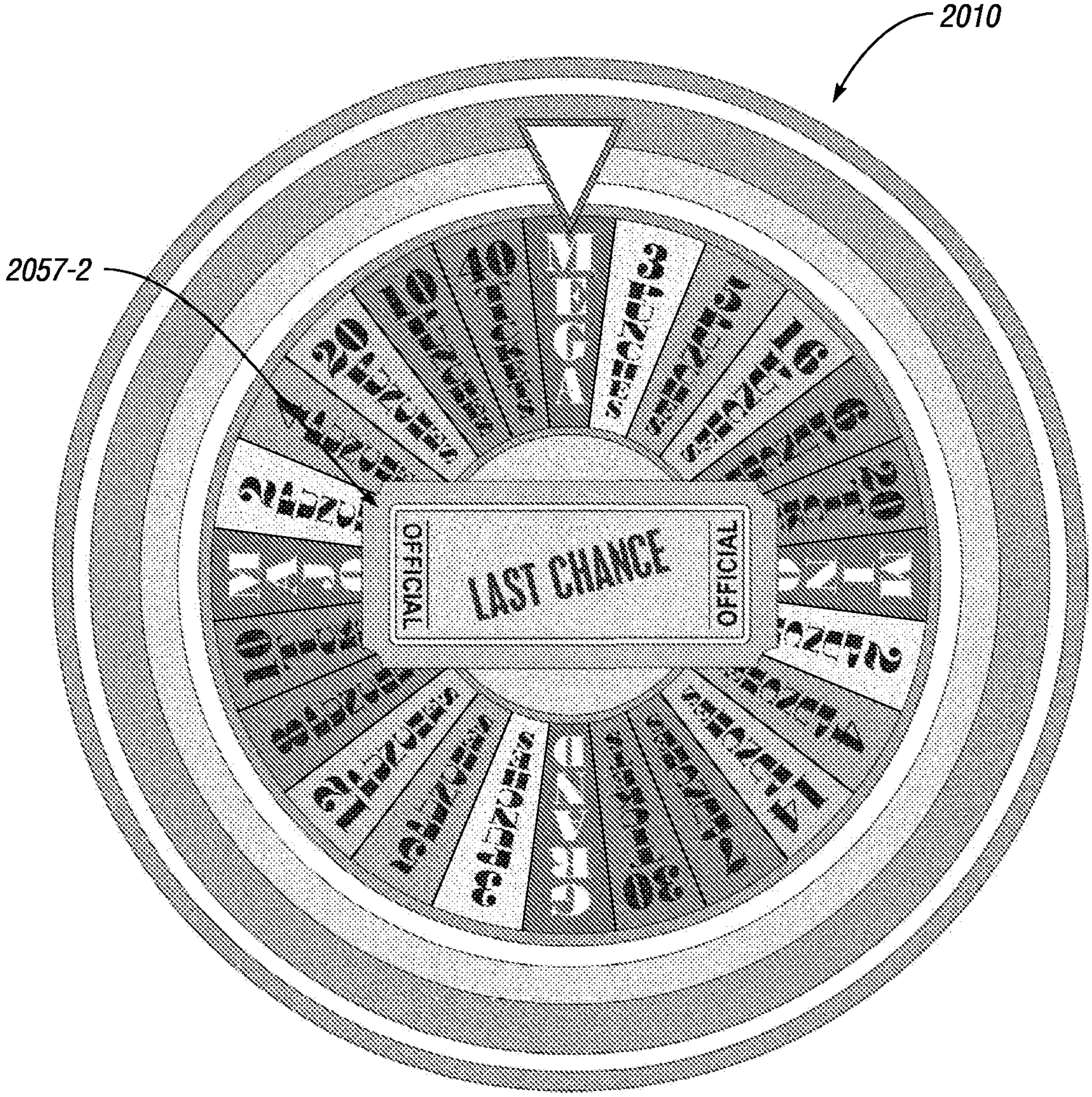

FIG. 22C shows the bonus wheel 2010 ready for player activation via one or more play icons 2054. FIG. 22D shows an optional take it or leave feature whereby the player may either keep a bonus wheel prize via a Take It icon 2055 or elect to try again for a better prize via a Leave It icon 2056. In one embodiment, the player has three chances to spin the bonus wheel 2010. Those skilled in the art will understand that the player may be permitted to spin the bonus wheel 2010 more of less than three times. FIGS. 22E and 22F show the bonus wheel 2010 with indications of the spin number 2057-1 (second chance) and 2057-2 (last chance).

Figure 22G:
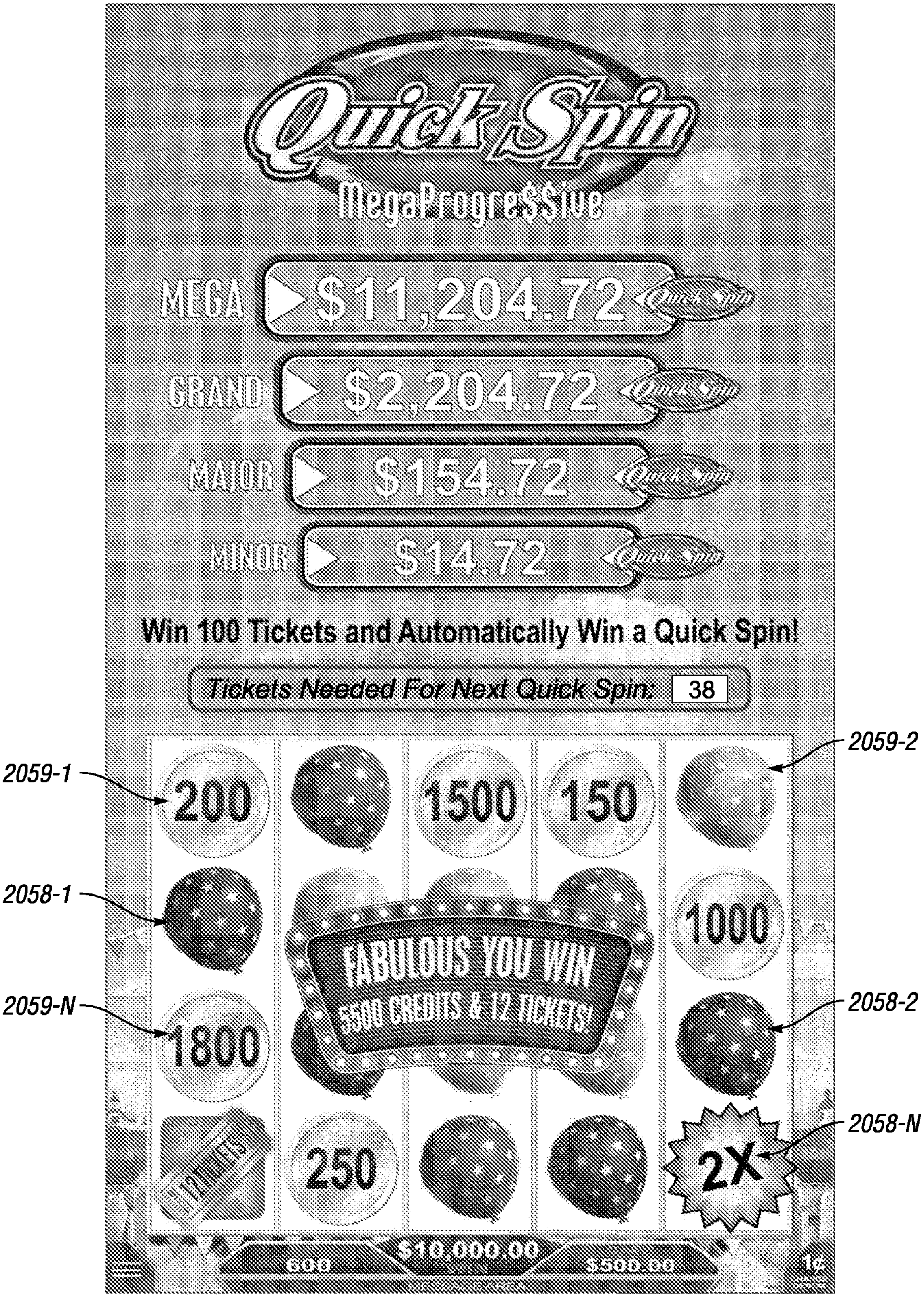
Figure 22H:
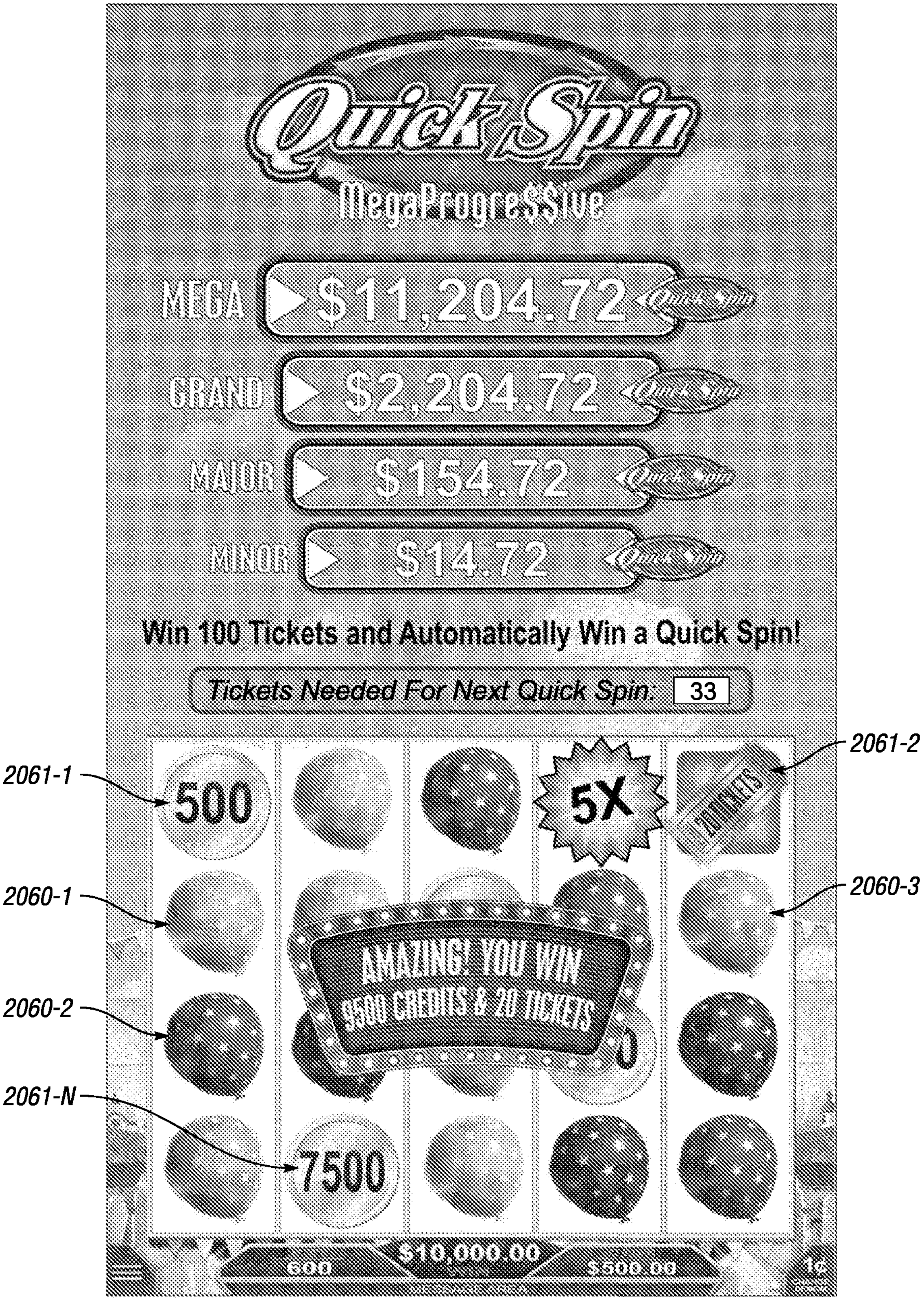

FIGS. 22G and 22H show an optional punchboard feature. In one embodiment, the player may opt to exchange tickets for a chance to interact with a punchboard. FIGS. 22G and 22H show the punchboard with virtual balloons 2058-1 through 2058-N concealing prizes 2059-1 through 2059-N. During play, as the player touches a virtual balloon the virtual balloon pops to reveal the concealed prize 2059-1 through 2059-N. The prize amounts and number of tickets required to play the punchboard is a function of the math and return to player associated with the machine.

Figure 22I:
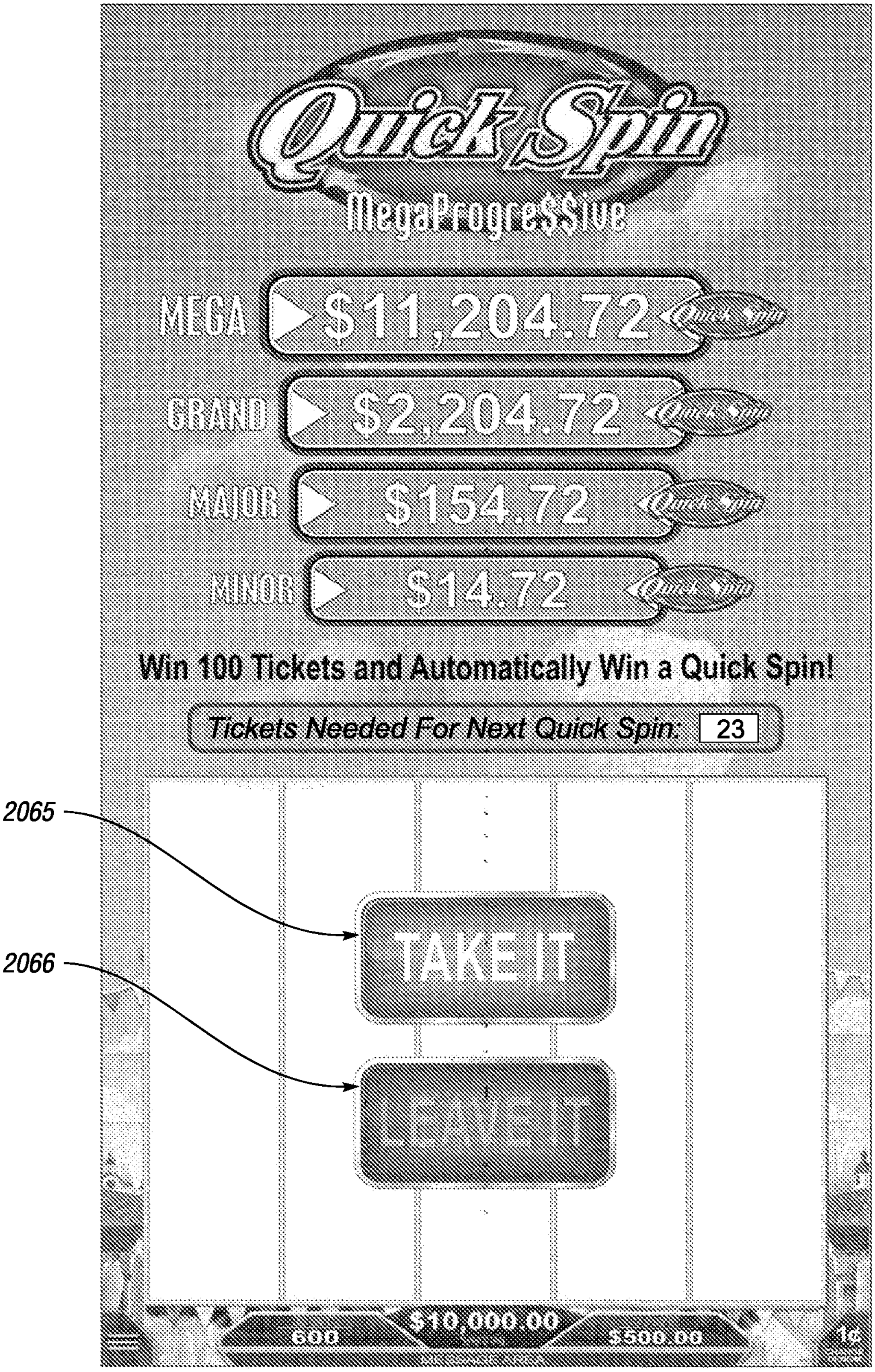

FIG. 22G shows an optional punchboard feature. In one embodiment, the player may opt to exchange tickets for a chance to interact with a punchboard. FIG. 22G shows the punchboard with virtual balloons 2058-1 through 2058-N concealing prizes 2059-1 through 2059-N. During play, as the player touches a virtual balloon the virtual balloon pops to reveal the concealed prize 2059-1 through 2059-N. The prize amounts and number of tickets required to play the punchboard is a function of the math and return to player associated with the machine. FIG. 22H shows another punchboard with virtual balloons 2060-1 through 2060-N concealing prizes 2061-1 through 2061-N. Like the bonus wheel 2010, as shown in FIG. 22I, the punchboard feature may utilize a Take It icon 2065 or elect to try again for a better prize via a Leave It icon 2066.

Figure 22J:
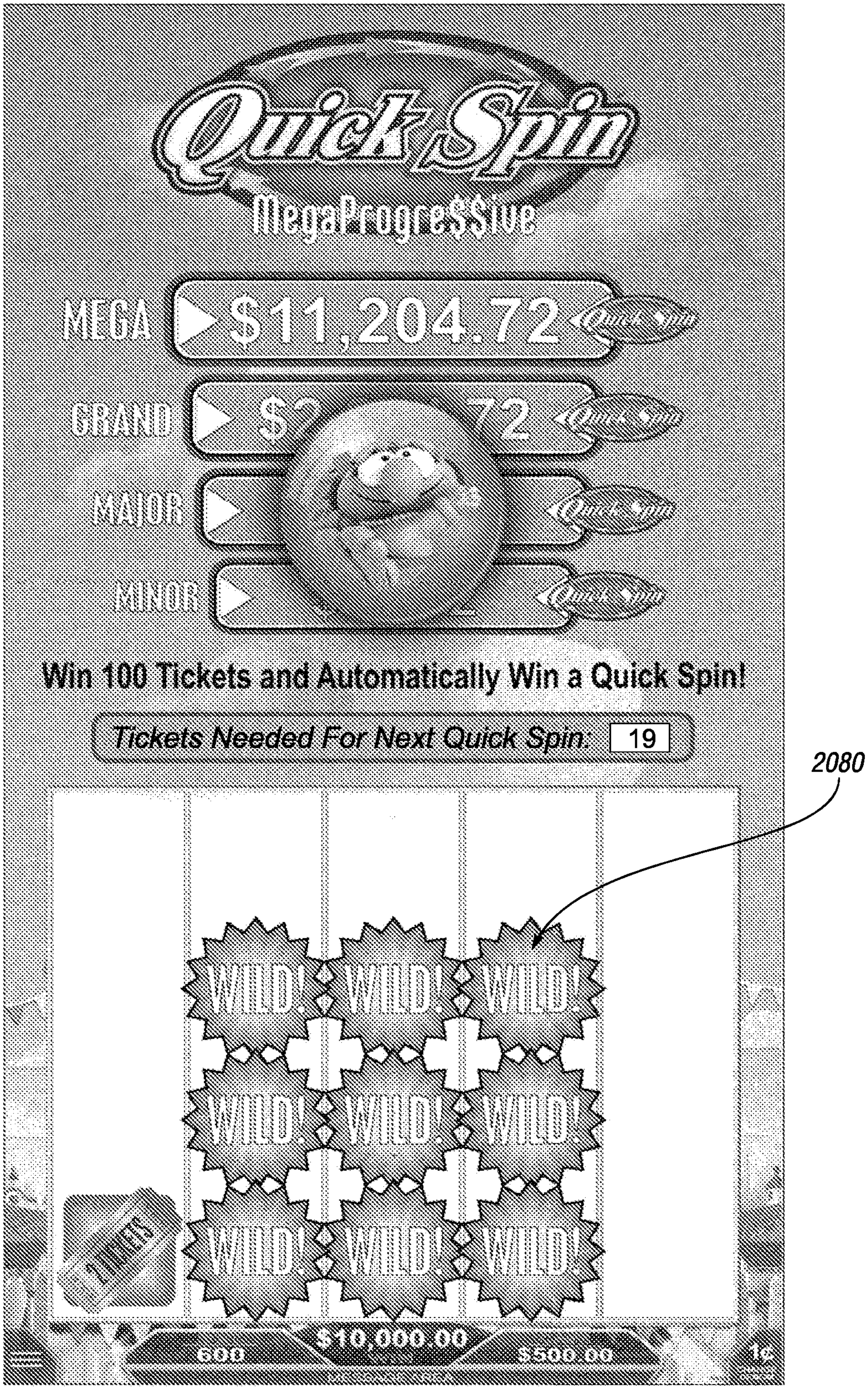

FIG. 22J shows an optional expanding wild feature. In one embodiment, the expanding wild feature 2080 is triggered by one or more primary game outcomes (e.g., three special symbols appearing on the primary game screen or aligning along an active payline).

Figure 22K:
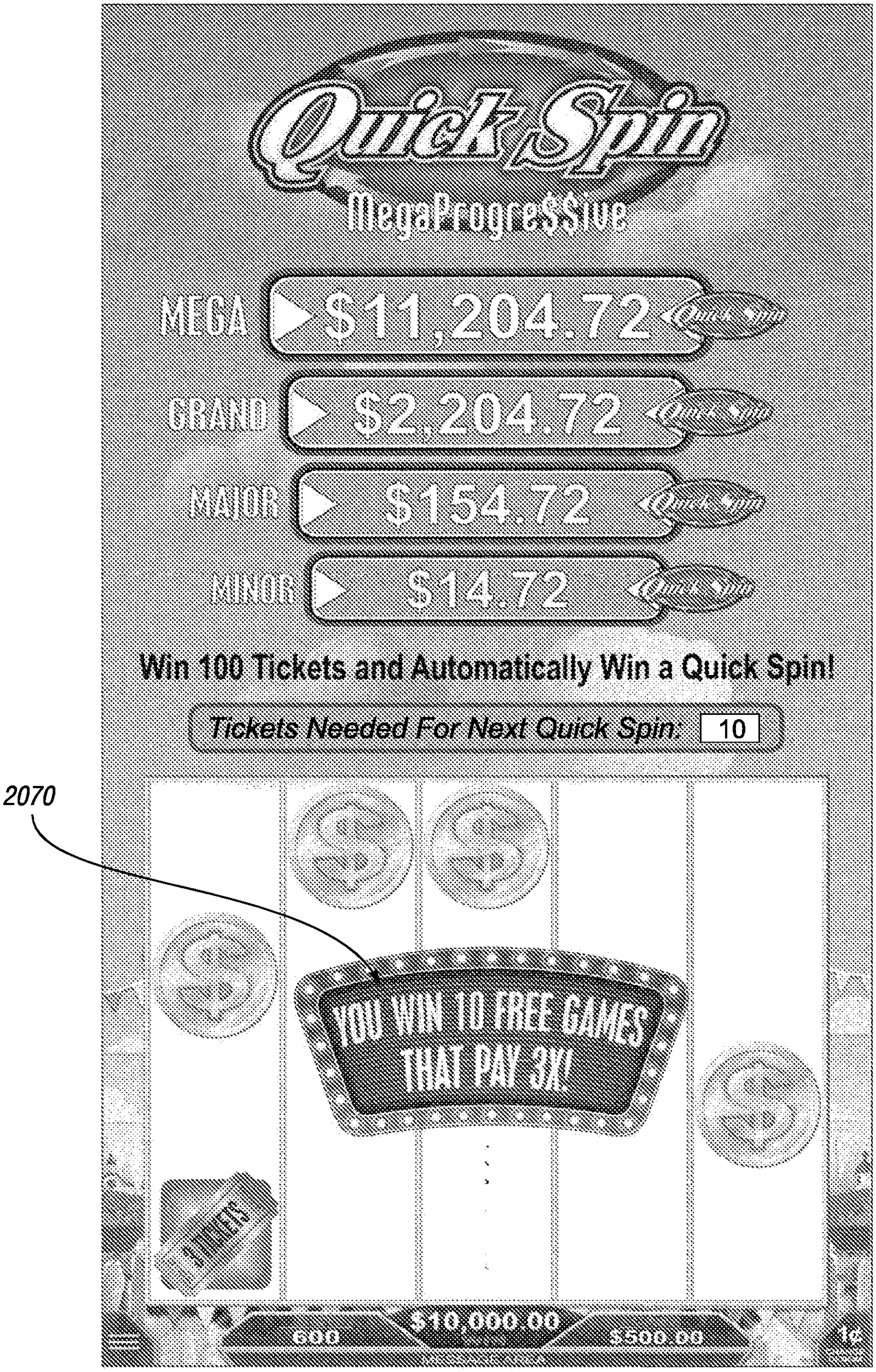

FIG. 22K shows an optional free spins multiplier feature 2085. In one embodiment, pre-established primary game outcomes trigger the free spins and multiplier feature. For example, 3 like primary game symbols trigger 10 free spins and a 2× multiplier; 4 like primary game symbols trigger 10 free spins and a 3× multiplier; and 5 like primary game symbols trigger 10 free spins and a 4× multiplier.

Figure 23:
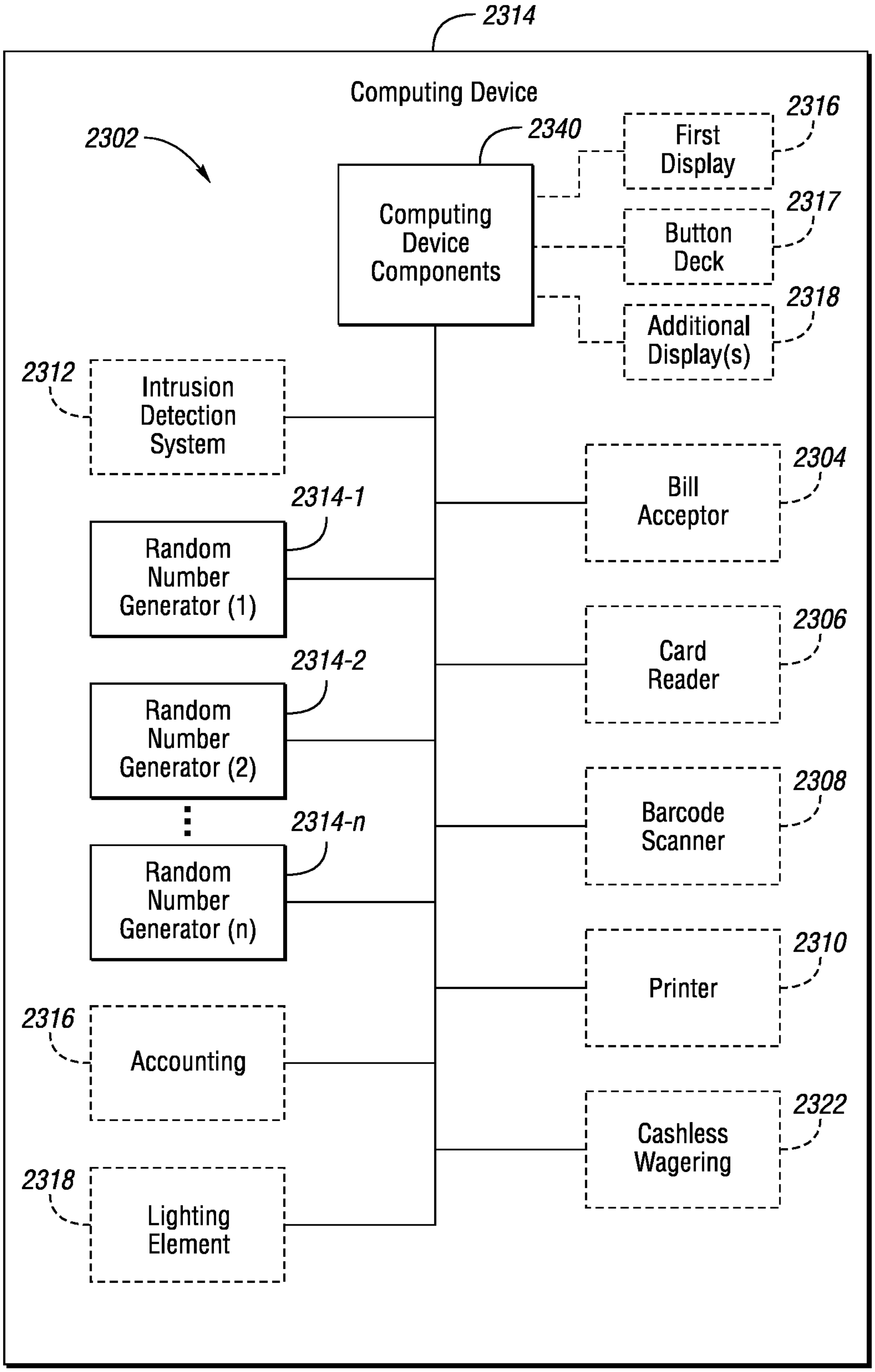
FIG. 23 illustrates a diagram of exemplary gaming device hardware of the type that may be used to facilitate the embodiments of the present invention including a plurality of random number generators.

FIG. 23 is a block diagram of a gaming device 2314 that may be used with system 100 (shown in FIG. 1) or system 200 (shown in FIG. 2). The gaming device 2314 is a computing device 400 (such as an EGM illustrated in FIG. 3) that includes a plurality of computing device components 2302 positioned within a cabinet or other housing. In one embodiment, computing device component manager or processor 2340 includes first display 2316, a button deck display 2317 and additional display(s) 2318. In addition, gaming device 2314 may include other gaming device components 2302 including a bill acceptor or bill validator 2304, cashless wagering components 2322, a card reader 2306, a barcode scanner 2308, a printer 2310, an intrusion detection system 2312, a plurality of randomization devices 2314-1, 2314-2 and 2314-*n* (such as a plurality of RNGs or PRNGs), and an accounting interface 2316 that are positioned within, or coupled to, the cabinet or housing of the gaming device. The multiple RNGs or PRNGs allow for player selectable or switchable RNGs or PRNGs. The terms "random number generators" (RNG) and "pseudo random number generators" (PRNG) are used interchangeably herein as absolute true randomness may not be practical or even necessary for electronic gaming machines' RNGs or PRNGs. In one embodiment, gaming device 2314 may also include at least one lighting element 2318 coupled to the cabinet or housing. Those skilled in the art will recognize the many alternatives available to the game designer such as other button locations, types, optional equipment, sound systems, etc.

Traditionally, a new slot game is installed on the casino floor for a trial period, usually between 30 and 120 days. During the trial period, the casino analyzes the performance data of a particular EGM to determine if each particular slot game should remain on the casino floor or not, e.g., reach a minimum win threshold or not. If the casino decides to keep the EGM, the casino either purchases the EGM, obtains either a daily fee or participation agreement or engages in another type financial transaction or arrangement. If the performance of the EGM is poor, the EGM is either returned to the manufacturer or the casino may ask that a new game theme be substituted or the existing game theme be converted to a new theme. The unfortunate result of the casino/supplier relationship is only approximately 25% to 35% of all EGMS perform well enough to meet the high-performance thresholds of most casinos. The low acceptability rate comes at a high cost in time, manpower and money to EGM manufacturers. A key metric for the performance of EGMs is time-on-device which directly relates to EGM win, known as win per unit (WPU), as compared to the house average machine WPU or zone average machine WPU. Accordingly, the longer players stay and play a particular EGM, the higher average win for the casino and therefore a greater possibility of player acceptance and the casino choosing to buy or lease the EGM. A great number of other performance metrics may be gathered and analyzed by the casino in addition to coin-in and WPU to determine the destiny of a new slot game or theme.

Due to the nature of the game mechanics of some games players may have a higher chance of hitting a "hot streak" with high volatility games than low volatility games but conversely players may also have a much higher chance of hitting a "cold streak" or a streak that can have a devastating effect on players' bankrolls. During such periods, the actual EGM return to player percentage (RTP) is lower than the prescribed average EGM return to player percentage (RTP) of a particular game and relates to cumulative losses over time and not necessarily consecutive losses. The terms "cold streak" and "hot streak" are common phrases used by many gamblers and well known in the industry and those skilled in the art. While many players certainly like the "big win" aspects of EGMs, what players often remember most are games where they encountered a protracted "cold streak" that effectively broke the player's bankroll for the play session or resulted in a significant loss in a relatively short period of time. This effect from some game mathematics and mechanics, including high volatility games, may take a game from a player's "favorite game" to a player's "most hated game" which may mean the end of play for that game for a particular player. The overall effect of this from a manufacturer's standpoint may be the game needs to be removed from a casino floor or converted to a different game theme. The volatility stabilizing sub-event embodiments, according to the present invention, reduce the probability of a player encountering these devastating "cold streaks."

There are also many intangibles that come into play which, although difficult to qualify or quantify, nevertheless exist, at least in the player's mind. While there is no mathematical basis, player psychology and superstition can often affect players and their playing habits. Moreover, these effects can be amplified in higher value or higher play frequency players. Higher value and higher play frequency players are often those who gamble often, sometimes on a weekly or even daily basis and often may be some of the casino's most valuable players.

While the instances of "cold streaks" may be a real tangible effect of game mechanics of some games, including high volatility games, player psychology and superstition may also lead to a player believing they are on a "cold streak." When psychology and superstition come into play, players may resort to changing many things to break a "cold streak." These may include removing a players' card, changing a players' card, cashing out and then reinserting a ticket-in-ticket-out voucher, inserting more cash, adjusting game sound, using alternative buttons to initiate play, pounding on machines, stopping one or more reels during a spin, adjusting game speed, etc., or eventually just leaving the machine. Even though most players know these are superstitions, when "cold streaks" occur players may try anything to get out of the "cold streak." The selectable or switchable RNGs or PRNGs or altering the internal state of a RNG or PRNG of the embodiments of the present invention offer players the opportunity to actually change the outcome of future plays of the EGM for at least that play session. Switching to alternative RNGs or altering the internal state of a RNG provides differing future outcomes as the random numbers generated by the RNG will, for practical purposes, never be identical. As used herein, one definition of a play session is the duration of play from when a player starts play to when a player stops play on a particular EGM.

The results of an RNG cannot be predicted, only changed, randomly without bias. Some of the time, a player will do better, at least in the short run, with the switched or newly selected RNG, sometimes the player will do worse with the switched or newly selected RNG and sometimes there will be little or no apparent change with the switched or newly selected RNG as in reality, the outcomes will continue to follow the same return to player percentage (RTP) model of the EGM as before or have a neutral net effect over time. However, if in fact a player has experienced or is experiencing a "cold streak," resulting in a lesser RTP, the player may tend to perceive a greater probability of breaking the "cold streak" due to a "Gambler's Fallacy.". As an example, although a particular game may have an average RTP of 89%, the player's "cold streak" may have resulted in a lower RTP of 57% over a given time period. Accordingly, future play that returns to an average of 89% may be seen, by the player, as an improvement leading to a longer time-on-device and net win for that particular EGM. Even a sub-par increase to 80%, will be seen by the player as an improvement, hopefully leading to a longer time-on-device and net win for that particular EGM. For the player, perception is reality. This potential added time-on-device and resulting net win for a particular game or theme may increase overall performance of the EGM and be the difference between a failed game being returned to the manufacturer or converted to a new game rather than being converted to a sale, lease or participation placement or other financial transaction model.

Figure 24A:
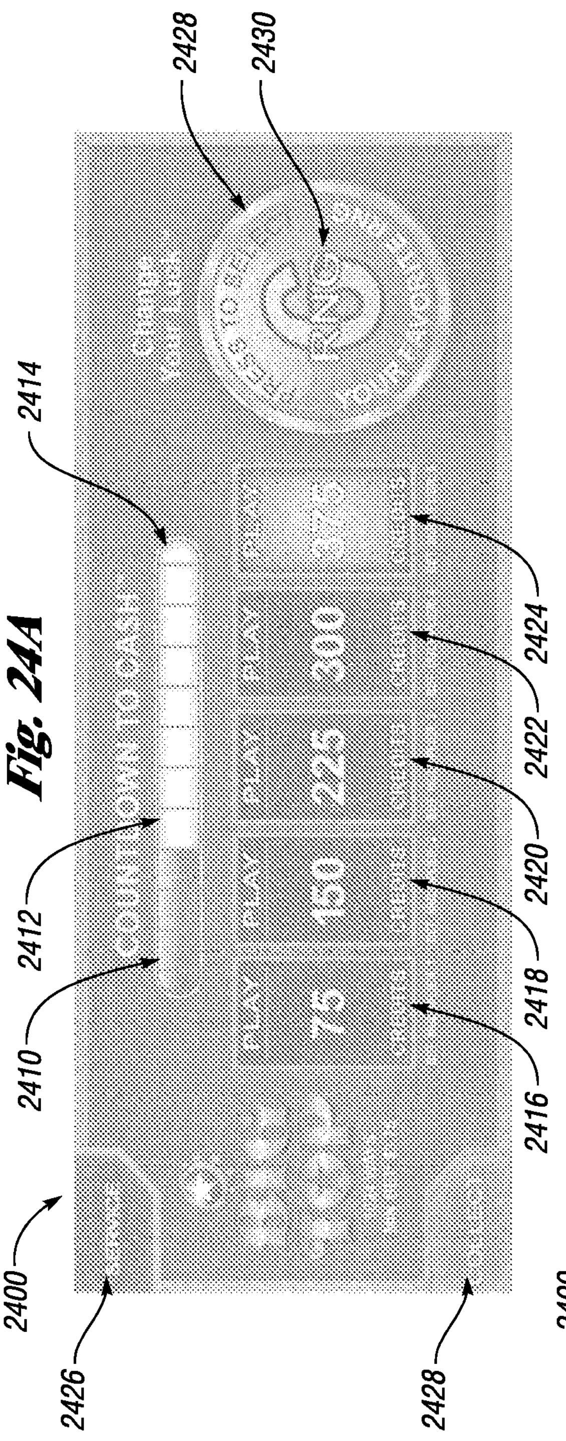
FIGS. 24A through 24C illustrate representative metering systems located on a touch screen LED button deck 2400 utilizing the embodiments of the present invention.
Figure 24B:
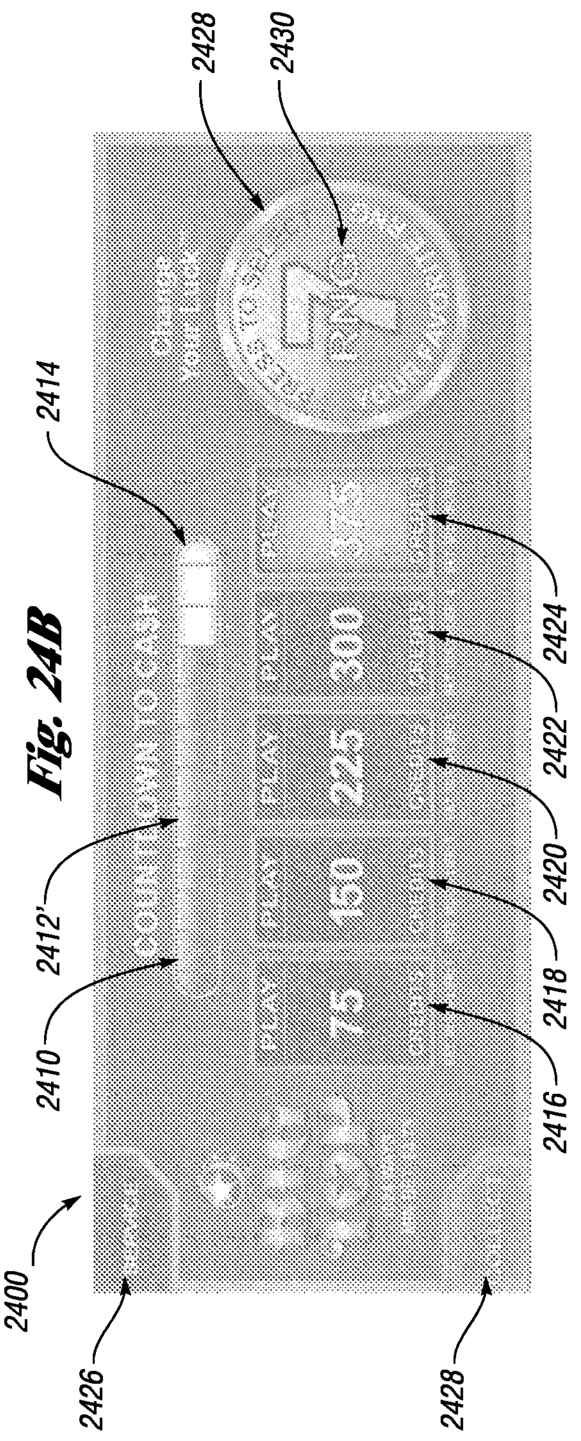
Figure 24C:
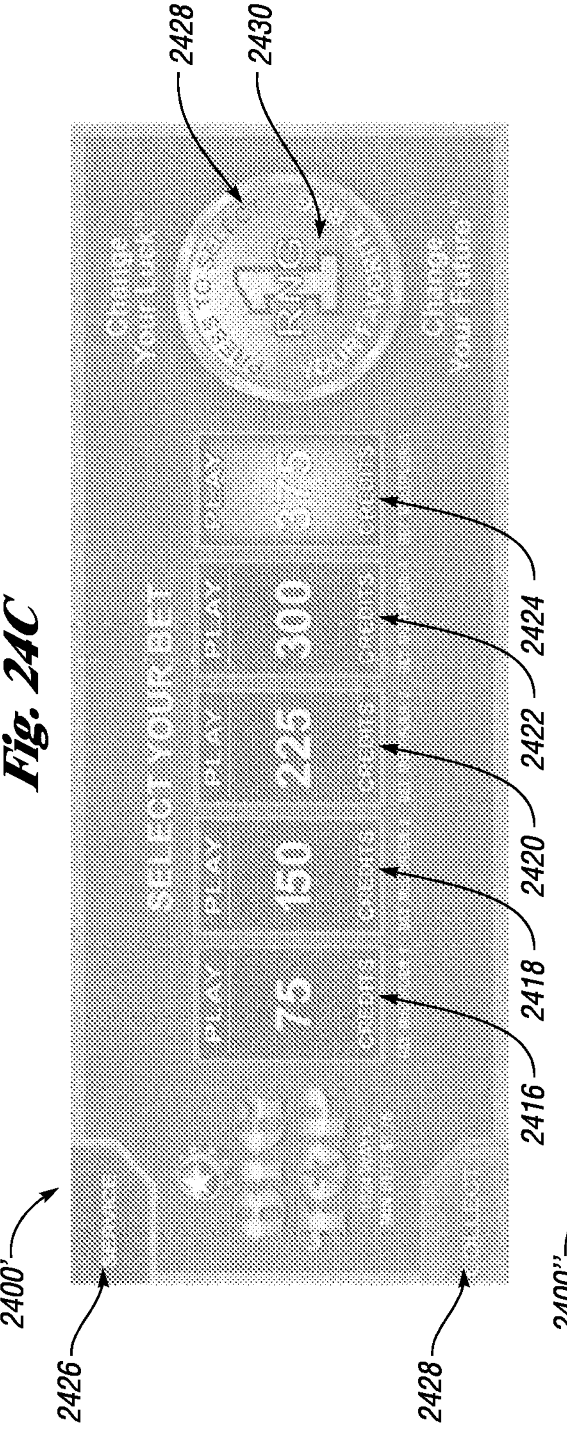

FIGS. 24A through 24C illustrate representative metering systems located on a touch screen LED button deck 2400 utilizing the embodiments of the present invention. Those skilled in the art will recognize that while embodiments of the present invention are shown as implemented on a GUI of a touch screen display, other button options such as mechanical, electronic, electromechanical, separated individual, etc., may be utilized in any similar embodiments which utilize buttons or similar plyer input means. These and other embodiments are adaptable to persistent style slot games as previously described and may also be adapted to other EGM games found in a casino. When the higher predictability increased number of smaller discrete RNG sub-events is implemented, a meter 2412 of some type, as well known in the art, such as circular meters, bar graphs, pie style meters, etc., may be employed which may provide the player an indication of how many smaller discrete RNG sub-events have occurred 2410 and therefore, how many additional smaller discrete RNG sub-events need to occur to trigger the bonus or feature. For example, if the number of smaller discrete RNG sub-events to trigger a bonus or feature is 10, the meter illustrates, either exactly or illustratively only, the meter progressing to the trigger point 2414. FIG. 24A illustrates the meter 2412 about 30% of the way to trigger point 2414 to a bonus, feature or other award while in FIG. 21B the meter 2410 has progressed to about 80% of the way 2410' to a bonus award. Accordingly, a player is alerted that a bonus or feature is closer to being awarded. If the number of smaller discrete RNG sub-events to trigger a bonus or feature is ten, and one event has already occurred, the probability of hitting that bonus or feature is about 135:1 for the last nine sub-events for a game with a probability to award a bonus or feature about every 150 plays. In such cases, the player visibly understands that the game is far from awarding a bonus or feature in which case they may leave or bypass the particular game. Accordingly, it may be preferable to start a meter, without any indicia and/or precise accuracy, at a non-zero point to avoid alarming a player that a feature or bonus occurrence may be harder to reach. Conversely, if the number of smaller discrete RNG sub-events to trigger a bonus or feature is ten and nine sub-events have already occurred, the probability of hitting that feature or bonus is about 15:1 for the last event. In such cases, the player visibly understands that the game is close to awarding a bonus or feature. Those skilled in the art will recognize that the terms "bonus," "feature" or "award" may be used interchangeably.

One advantage of providing sub-event wins or meter advancement on losing primary game outcomes is that it results in players feeling like they have won something rather than simply losing the wager. That is, while not winning a monetary or credit award related to the primary game outcome, the player has advanced the Countdown to Cash™ meter thus improving chances of reaching the triggering point for being awarded a bonus, feature or other goal. Players are thereby encouraged and therefore tend to play longer, e.g., additional time-on-device.

FIG. 24A includes a number of function buttons such as a service button 2426, a collect button 2428 for a cash out operation and bet or wager amount buttons 2416, 2418, 2420, 2422 and 2424. In addition, touch screen button deck 2400 also includes a Change Your Luck™ button 2428 which allows the player to selectively choose a RNG. As illustrated, Change Your Luck™ button 2428 may be pressed by a player to either selectively change to another RNG or in a different embodiment, a different RNG is randomly selected and the player alerted that a RNG change has been made or indicates a RNG identifier 2430 to the player. The player selectable RNG embodiments allow the player to press Change Your Luck™ button 2428 whereby the processor utilizes RNG results from a different actual RNG or different virtual RNG rather than the current RNG. Virtual RNGs as used herein means and/or refers to multiple instances of different, similar or identical software RNGs that co-reside within the same EGM computing device. There is no limit to how many actual or virtual RNGs may be employed. As shown in FIG. 24A, the current RNG identifier 2430 is RNG 6. After the player presses the Change Your Luck™ button 2428, the next actual RNG or virtual RNG in a group is selected becoming operable for game results and identified as RNG 7 as shown in FIG. 24B. The sequencing and player notification of individual actual RNGs or virtual RNGs may be by any convenient means such as counting up from the currently selected individual actual RNG or virtual RNG to the next available individual actual RNG or virtual RNG, i.e., 1, 2, 3, 4, 5, . . . n (repeat). Conversely, the sequencing and player notification of individual actual RNG or virtual RNG may be by any convenient means such as counting down from the currently selected individual actual RNG or virtual RNG to the next available individual actual RNG or virtual RNG, i.e., n . . . 4, 3, 2, 1 (repeat). Those skilled in the art will understand that there are many different types of RNGs and PRNGs, such as hardware or software based, with or without incorporating entropy, which may be employed for slot machine games and the like. Actual or virtual RNGs may be further distinguished from one another by utilizing differing seeds or keys or seed or key algorithms, differing start times, system clock times, processor directed differing RNG enablement types, etc. Those skilled in the art will recognize that the use of multiple actual or virtual RNGs may be applicable to iGaming, video gaming, real money gambling or other applications where additional or differing randomization may be desired.

FIG. 24C illustrates a touch screen button deck 2400' similar to the touch screen button decks of FIG. 24A and FIG. 24B which does not include any Countdown to Cash™ functionalities.

Figure 24D:
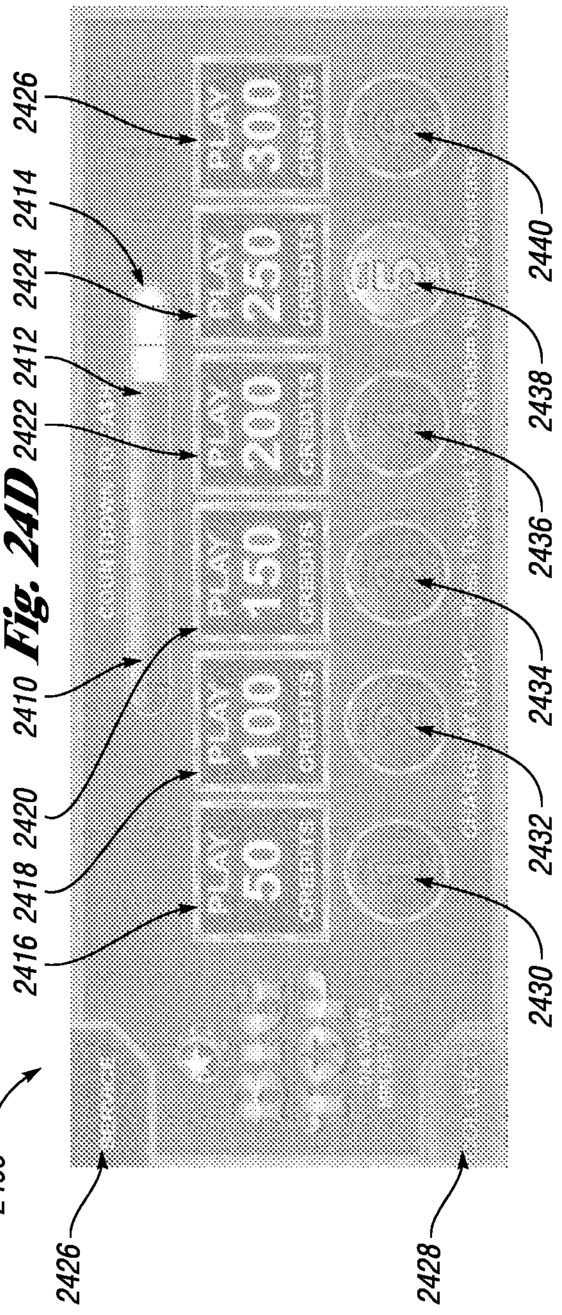
FIG. 24D includes a number of function buttons such as a service button, a collect button for a cash out operation and bet or wager amount buttons.

FIG. 24D illustrates representative metering systems located on a touch screen LED button deck 2400" utilizing the embodiments of the present invention. When the higher predictability plurality of RNG sub-events is implemented, a meter 2412 of some type, as known in the art, such as circular meters, bar graphs, pie style meters, etc., may be employed which may provide the player an indication of how many smaller discrete RNG sub-events have occurred 2410 and therefore, how many additional smaller discrete RNG sub-events remain r to trigger the bonus or feature.

One advantage of providing sub-event wins on losing primary game outcomes is that it results in players feeling like they have won something rather than simply losing the wager. That is, while not winning a monetary or credit award related to the primary game outcome, the player has advanced the Countdown to Cash™ meter thus improving chances of reaching the triggering point for being awarded a bonus, feature or other goal. Players are thereby encouraged and therefore tend to play longer, e.g., additional time-on-device and/or increase win on that particular EGM and associated game or theme.

FIG. 24D includes a number of function buttons such as a service button 2426, a collect button 2428 for a cash out operation and bet or wager amount buttons 2416, 2418, 2420, 2422 and 2424. In addition, touch screen button deck 2400" also includes a plurality of Change Your Luck™—Press To Select Your Random Number Generator buttons 2430, 2432, 2434, 2436, 2438 and 2440 which allows the player to selectively choose a RNG. As illustrated, Change Your Luck™—Press To Select Your Random Number Generator buttons 2430, 2432, 2434, 2436, 2438 and 2440 may be pressed by a player to selectively change to another RNG. The player selectable RNG embodiment allows the player to press Change Your Luck™—Press To Select Your Random Number Generator buttons 2430, 2432, 2434, 2436, 2438 and 2440 whereby the processor utilizes the RNG results from the selected actual RNG or virtual RNG rather than the current RNG. To aid the player in understanding which RNG is currently being utilized, nonutilized RNGs have been dimmed out thereby highlighting the active RNG which is illustrated as RNG 5. When the player selects and presses another Change My Luck—Press To Select Your Random Number Generator button 2430, 2432, 2434, 2436, 2438 and 2440, the previous RNG selection is dimmed out and the dimming of the selected RNG is removed resulting in the highlighting of the then active RNG. While there is no limit to how many actual or virtual RNGs may be employed, an ideal number of RNGs may be less than 10. Those skilled in the art will recognize that in addition to the embodiments illustrated herein, various alternative selection means are possible and the various Change My Luck buttons illustrated may be located anywhere on or in the EGM and may be virtual buttons, physical buttons or similar.

Figure 25:
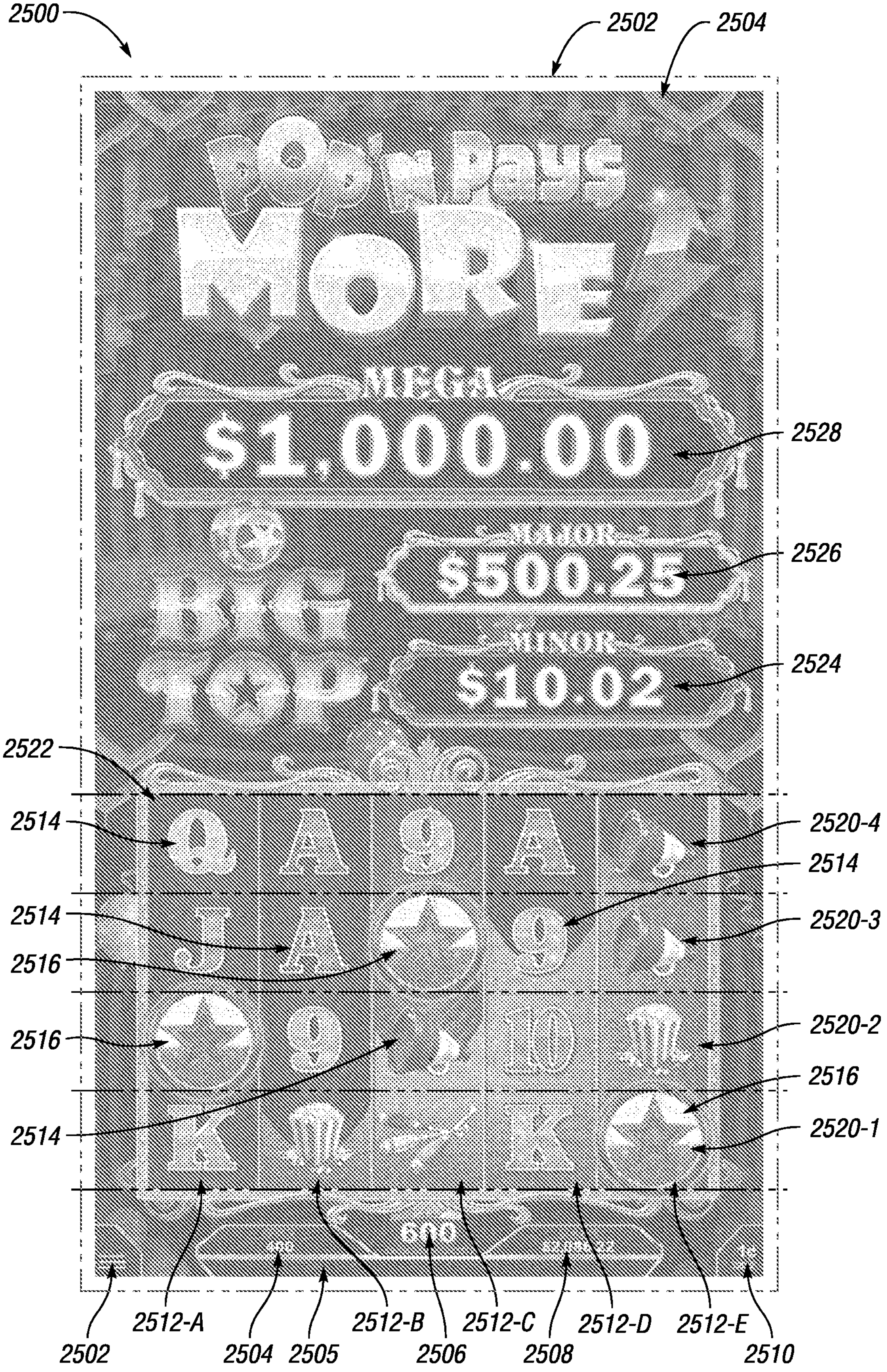
FIG. 25 illustrates an EGM which divides the traditional single event RNG model into a number of smaller RNG sub-events to reduce the frequency of "cold streaks" and make such games more predictable.

FIG. 25 illustrates an EGM2500 with embodiments which divide the traditional single event RNG model into a number of smaller RNG sub-events to reduce the frequency of "cold streaks" and make such games more predictable. While smaller RNG sub-events may effectively be a binary outcome, either awarded sub-events or non-awarded sub-events, they may also award random or pre-assigned outcomes while continuing to reduce "cold streaks." In addition, the touch screen button decks and associated GUIs illustrated and described in FIGS. 24A through 24D are part of the EGM 2500 but not shown in FIG. 25.

EGM 2500 includes a primary game display 2504 which may be associated with the touch screen button decks 2400 as illustrated in FIGS. 24A through 24D or others later described and illustrated herein and housed within cabinet 2502, which is schematically illustrated. Although not illustrated in FIG. 25, EGM 2500 may also include many other peripherals, features, attract lighting, sound equipment, processors, toppers, candles, wheels, associated mechanical or electronic equipment, etc., that have been previously described herein.

EGM 2500 may be controlled by mechanical buttons, electromechanical buttons, electronic buttons, LED or LCD touch screens or similar as well known in the art (not shown). Such controls may include but not limited to play buttons, denomination buttons, sound adjust buttons, help buttons, speed buttons, etc.

EGM cabinet 2502 is shown with a portrait-oriented display 2504. Although a single portrait display is illustrated, other display configurations are possible such as dual landscape-oriented displays, triple landscape-oriented displays, single landscape-oriented displays, etc. and may include flat screens, curved screens, j-curve screens, wave shaped screens, etc. Other displays or communication devices may also be utilized such as slot machine toppers, candles, etc.

The game illustrated includes dividing the traditional single event RNG model into a number of incremental RNG sub-events to reduce the frequency of "cold streaks" making such games more predictable. The embodiments of the present invention may also award random or pre-assigned outcomes to at least one or more sub-events while continuing to reduce "cold streaks." In the case of the embodiments of the present invention, the random outcomes of the sub-events may be visually displayed through meters and the like to the player or may be hidden or may be displayed in differing ways. The volatility stabilizing sub-events model may be implemented in many ways such as fully controlling the awarding of bonuses or features, allowing for multiple sub-event outcomes simultaneously, adding a standard single event random outcome such as a target of 65% of the bonuses, features or awards controlled by the volatility stabilizing sub-event model and 35% standard single event random outcome, allowing for some volatility stabilizing sub-events to be weighted more or less than others to add more irregularity to the model, etc. Those skilled in the art will recognize there are many differing implementations of the embodiments of the present invention.

Located on the display 2504 are a representation of a plurality of video reels 2512, located within video reel area 2522. As illustrated, the game may include a number of individual vertically oriented video reels 2512-A, 2512-B, 2512-C, 2512-D and 2512-E and four horizontal rows 2520-1, 2520-2, 2520-3 and 2520-4. Accordingly, the video reel area 2522 illustrated includes four rows and five reels. Such a reel configuration lends itself to either "line" play, "ways" games or other game styles. While the embodiment illustrated includes five vertical video reels, any number of reels may be utilized and the reels may also be horizontally oriented as opposed to vertical and may even have a angular or diagonal orientation. Moreover, some embodiments may also include a design wherein the number of reels may change, either randomly or as prescribed. The video reels may also include a number of symbols 2514 that when arranged in a predetermined pattern or sequence, provide the player with an award. In addition, video reels 2512-A, 2512-B, 2512-C, 2512-D and 2512-E may include free spin symbols 2516 or special character symbols, free game symbols, monetary or credit awards, etc., not shown. Many other symbols, such as "royal symbols" (9, 10, Jack, Queen, King or Ace) may also exist along with other symbols such as popcorn, megaphones, clubs, jewels, dollar bills, coins with monetary or credit values, etc.

The display 2504 may also include a game status information area which provides information such as bet amount 2504, win amount 2506, if any, credit or monetary balance 2508 and messaging area 2505. In addition, other function buttons may be included such as an information and help function button 2502 that may switch to alternative screens such as help area screens, sound adjust, speed adjust, etc., and/or a denomination change button 2510 which allows the player to change the standard denomination of bet, i.e., 10, 50, 250, 500, $1, $2 or $5, for example. In addition, other graphical elements such as progressive award amounts may be included and displayed such as minor progressive 2524, a 2526 major progressive and mega progressive 2528. While three progressives are illustrated, any number of discrete progressives may be included such as a single progressive, two progressives, three progressives, four progressives or more. Moreover, such progressives may be stand alone for a single machine, multiple machines connected together in a small localized area, sometimes referred to as a local area progressive (LAP) or a larger on property group of machines sometimes referred to as a wide area progressive (WAP). These may even be expanded to include multiple casino properties or even multiple states or countries and may include differing game themes that are associated with the progressives.

Figure 26A:
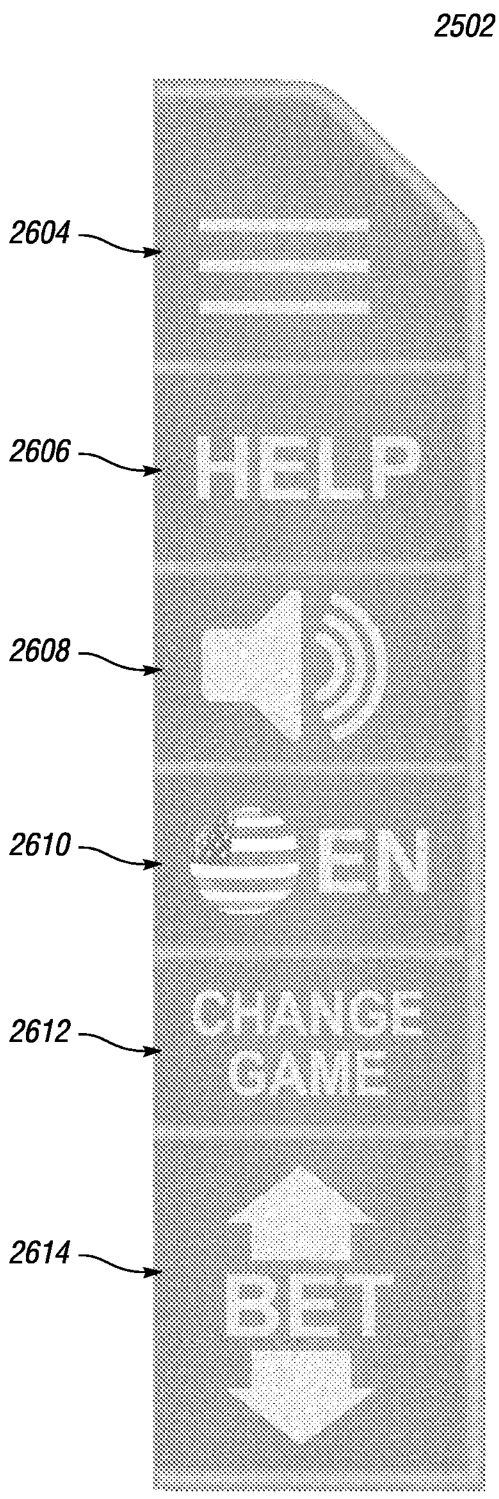
FIG. 26A illustrates a pop-up menu that appears on the game display once a player presses or touches the information and help button of EGM illustrated in FIG. 25.

FIG. 26A illustrates a pop-up menu 2502 that appears on the game display once a player presses or touches the information and help button 2502 of EGM 2500 illustrated in FIG. 25. The pop-up menu 2502 illustrated in FIG. 26A includes a pop-up menu which includes a return to game button 2604, a help button 2606, a sound adjust button 2608, a language select button 2610, a change game button 2612 and a change bet button 2614. Those skilled in the art will recognize that a wide variety of functions may be included and displayed in different ways.

Figure 26B:
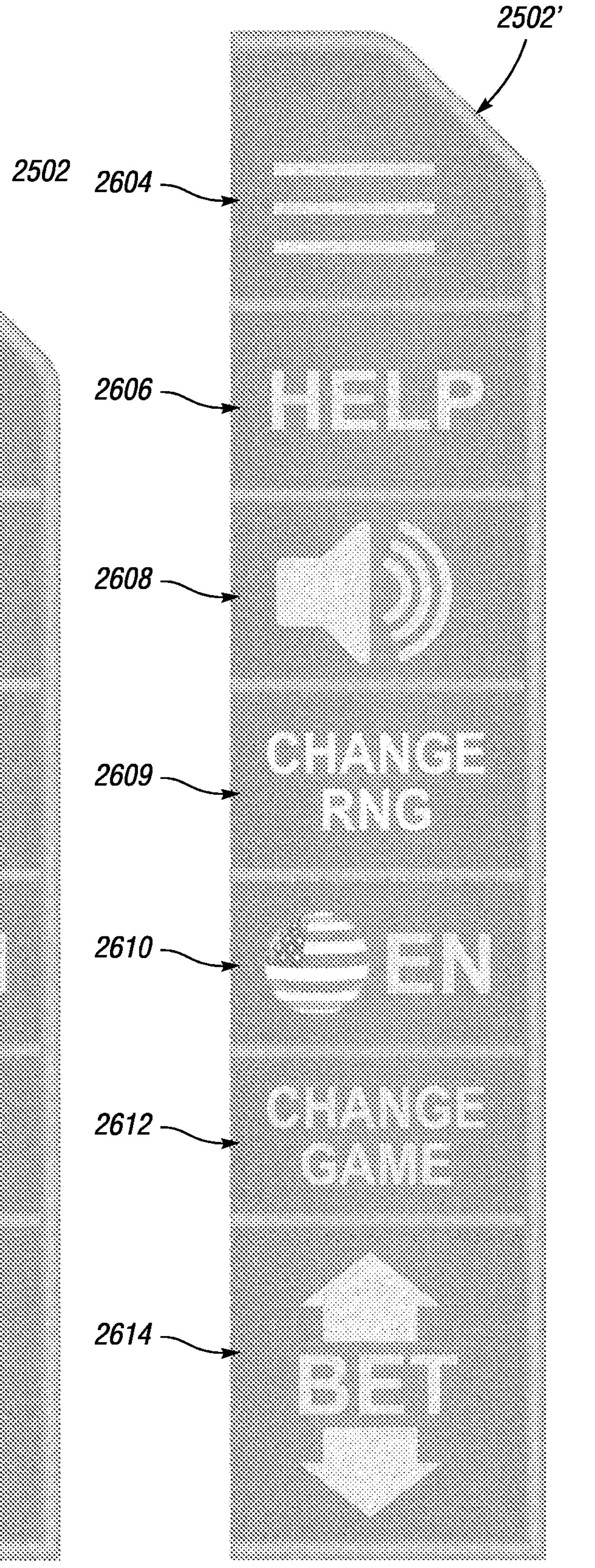
FIG. 26B illustrates a similar pop-up menu that appears on the game display once a player presses or touches the information and help button of EGM illustrated in FIG. 25.

FIG. 26B illustrates a similar pop-up menu 2502' that appears on the game display once a player presses or touches the information and help button 2502 of EGM 2500 illustrated in FIG. 25. The pop-up menu 2502' illustrated in FIG. 26B includes a pop-up menu which includes a return to game button 2604, a help button 2606, a sound adjust button 2608, a change RNG button 2609, a language select button 2610, a change game button 2612 and a change bet button 2614.

Figure 26C:
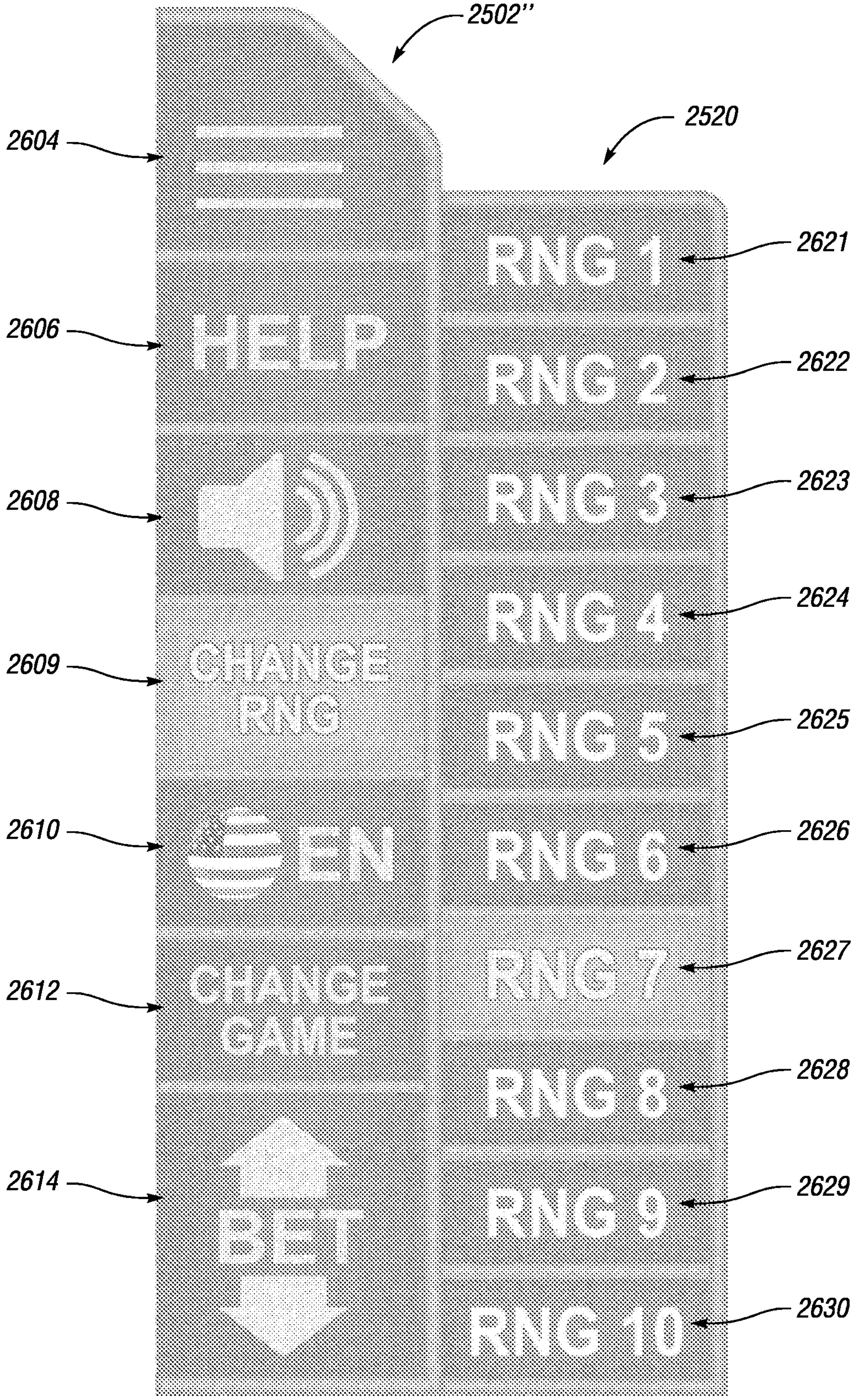
FIG. 26C illustrates the pop-up menu of FIG. 26B expanded once the Change RNG button has been pressed.

FIG. 26C illustrates the pop-up menu 2502" of FIG. 26B expanded once the Change RNG button has been pressed. As illustrated, the Change RNG button 2609 is now highlighted. The expanded pop-up menu 2520 on the right side includes a plurality of different RNG buttons designated RNG 1 thorough RNG 10, 2621 through 2630 respectively, which are selectable by the player. As illustrated, the player has selected RNG 7, which is optionally highlighted. Once RNG 7 is selected, the pop-up menu 2502" may automatically or semiautomatically close or require the player to press the close button 2604. Those skilled in the art will recognize that various alternative selection and closure means are possible.

Figure 27A:
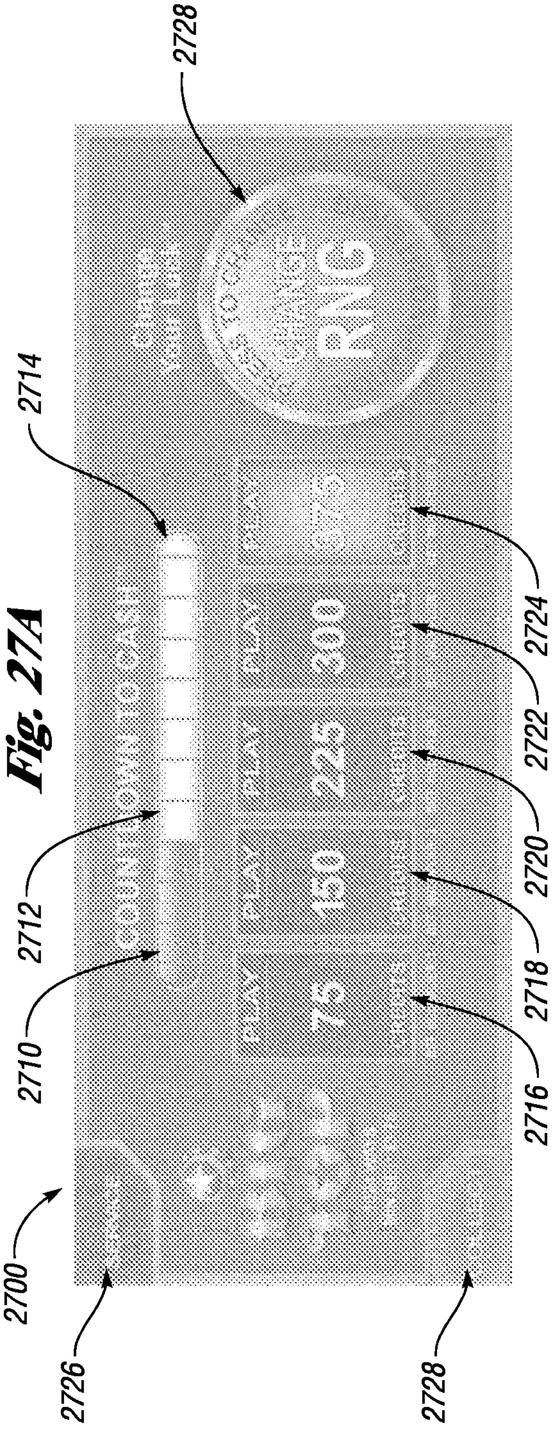
FIGS. 27A and FIG. 27B illustrate representative metering systems located on a touch screen LED button deck 2700 utilizing the embodiments of the present invention.
Figure 27B:
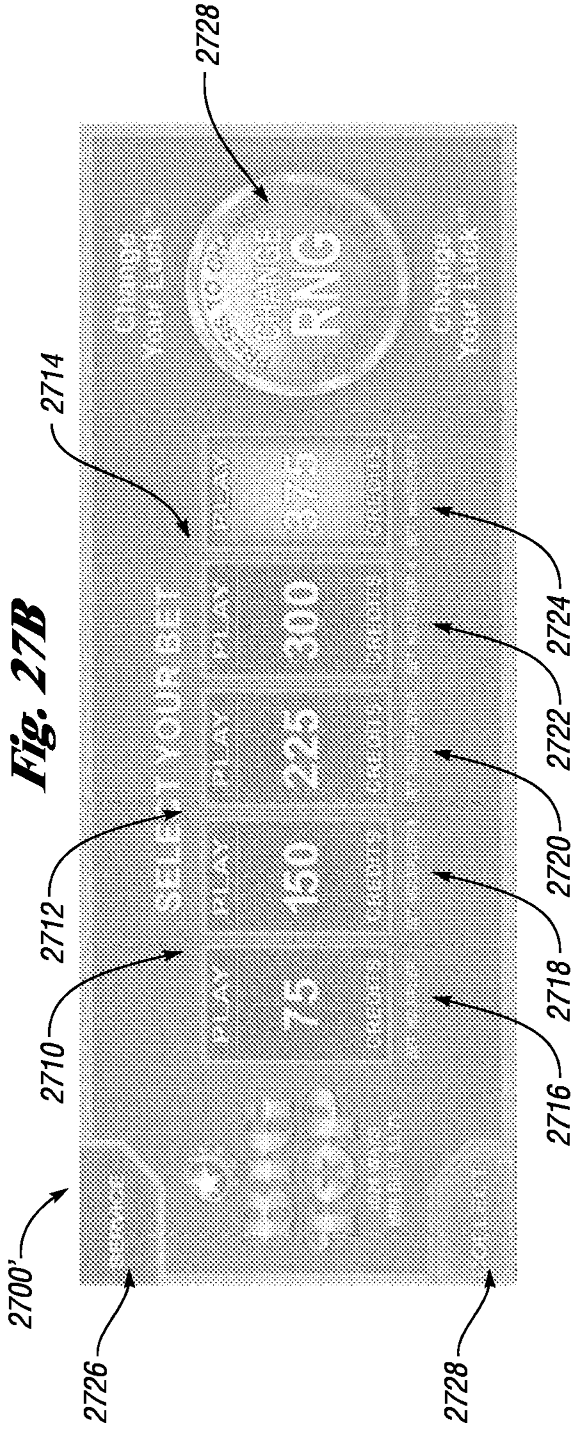

FIG. 27A and FIG. 27B illustrate representative metering systems located on a touch screen LED button deck 2700 utilizing the embodiments of the present invention. When the higher predictability increased number of smaller RNG sub-events is implemented, a meter 2712 of some type, well known in the art, such as circular meters, bar graphs, pie style meters, etc., may be employed which may provide the player an indication of how many smaller RNG sub-events have occurred 2710 and therefore, how many additional smaller RNG sub-events remain to trigger the bonus or feature. For example, if the number of smaller discrete RNG sub-events to trigger a bonus or feature is ten, the meter illustrates, either exactly or illustratively only, the meter progressing to the trigger point 2714. FIG. 27A illustrates the meter 2712 about 30% of the way to trigger point 2714 to award a bonus, feature or other award. Accordingly, a player is alerted that a bonus or feature is closer to being awarded as the meter progress toward trigger point 2714. If the number of smaller discrete RNG sub-events to trigger a bonus or feature is ten and one event has already occurred, the probability of hitting that bonus or feature is about 135:1 for the last nine sub-events for a game with math designed to award a bonus or feature about every 150 plays. In such cases, the player visibly understands that the game is far from awarding a bonus or feature in which case the player may leave or bypass the particular game. Accordingly, it may be better to start a meter, without any indicia and/or precise accuracy, at a non-zero point so not to alert a player that a feature or bonus occurrence may be harder to reach. Conversely, if the number of smaller discrete RNG sub-events to trigger a bonus or feature is ten and nine sub-events have already occurred, the probability of hitting that feature or bonus is about 15:1 for the last event. In such cases, the player visibly understands that the game is close to awarding a bonus or feature. Those skilled in the art will recognize that the terms "bonus" and "feature" may be used interchangeably. In addition, one or more sub-events may already be triggered or pre-triggered by the processor prior to the start of a new game cycle after awarding a bonus or feature to further add excitement for the player. For example, immediately after a bonus or feature is awarded in a ten sub-event embodiment, a game may start with ten sub-events needed to trigger a bonus or feature or in the alternative, start with a number of sub-events, e.g., 3, already triggered for added excitement.

FIG. 27A includes a number of function buttons such as a service button 2726, a collect button 2728 for a cash out operation and bet or wager amount buttons 2716, 2718, 2720, 2722 and 2724. In addition, touch screen button deck 2700 also includes a Change Your Luck™ button 2728 which allows the player to change to another RNG. The player changeable RNG embodiment allows the player to press Change Your Luck™ button 2728 whereby the processor utilizes RNG results from a different actual RNG or different virtual RNG than the current RNG or select from a pool of RNGs including the current RNG. While there is no limit to how many actual or virtual RNGs may be employed, a practical number of RNGs may be 5, 10 or whatever suits the game engineers. After the player presses the Change Your Luck™ button 2728, an actual RNG or virtual RNG from a group is selected and then becomes operable for providing game results, through its mathematical output, and is either identified to the player or not. Those skilled in the art will understand that there are many different types of RNGs and PRNGs, such as hardware or software based, with or without incorporating entropy, which may be employed for slot machine games and the like. Actual or virtual RNGs may be further distinguished from one another by utilizing differing seeds or keys or seed or key algorithms, differing start times, system clock times, processor directed differing RNG enablement types, etc. In addition, those skilled in the art will recognize that the various functionalities, attributes and/or other details of the embodiments illustrated and described may be applicable to other embodiments illustrated and described.

FIG. 27B illustrates a touch screen button deck 2700' similar to the touch screen button deck of FIG. 27A which does not include any Countdown to Cash™ functionalities. Those skilled in the art will recognize that in addition to the embodiments illustrated herein, various alternative selection means are possible.

Figure 28:
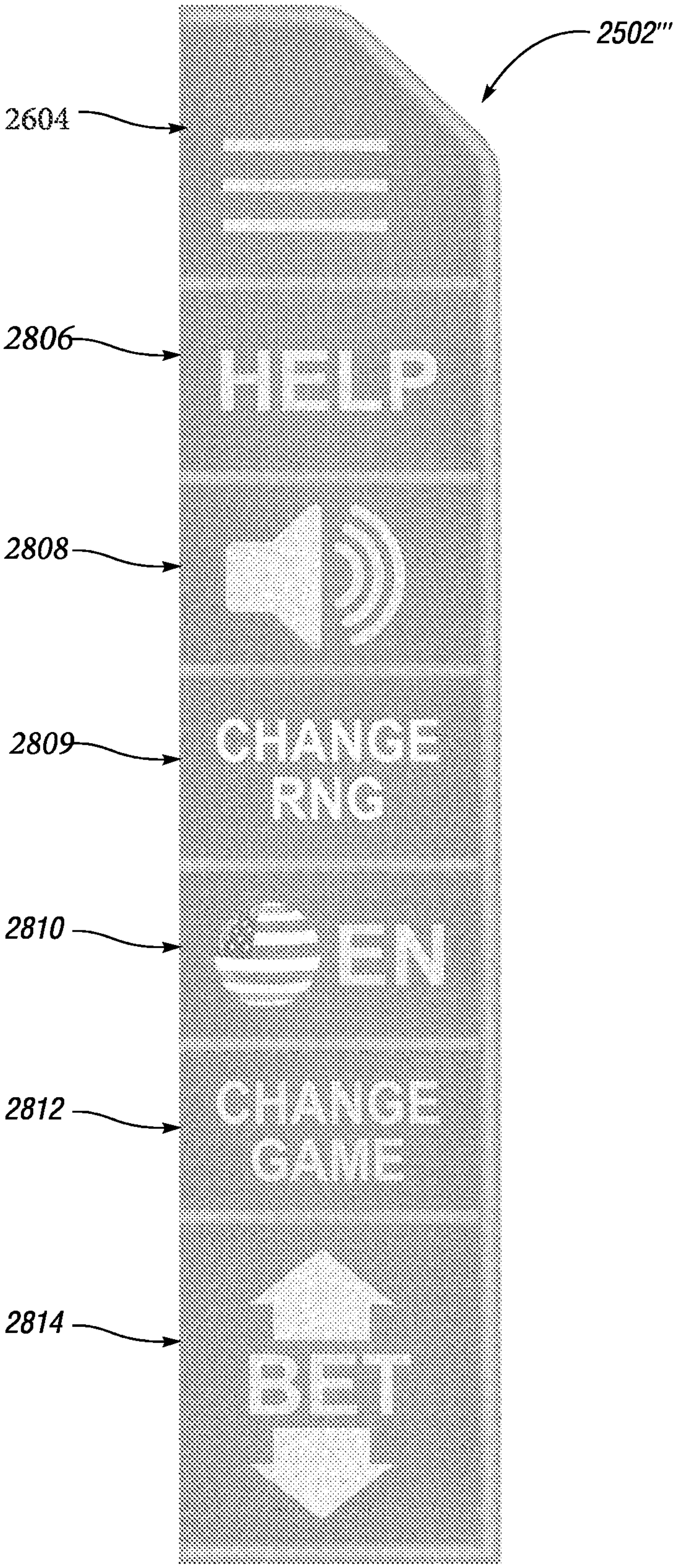
FIG. 28 illustrates a similar pop-up menu that appears on the game display once a player presses or touches the information and help button of EGM illustrated in FIG. 25.

FIG. 28 illustrates a similar pop-up menu 2502''' that appears on the game display once a player presses or touches the information and help button 2802 of EGM2500 illustrated in FIG. 25. The pop-up menu 2502''' illustrated in FIG. 28 includes a pop-up menu which includes a return to game button 2604, a help button 2804, a sound adjust button 2806, a change RNG button 2808, a language select button 2810, a change game button 2812 and a change bet button 2814. Similar to the RNG change functionality described in FIG. 27A and FIG. 27B, a player may press Change RNG button 2808 to change to a different RNG or RNG pool as previously described.

Figure 29:
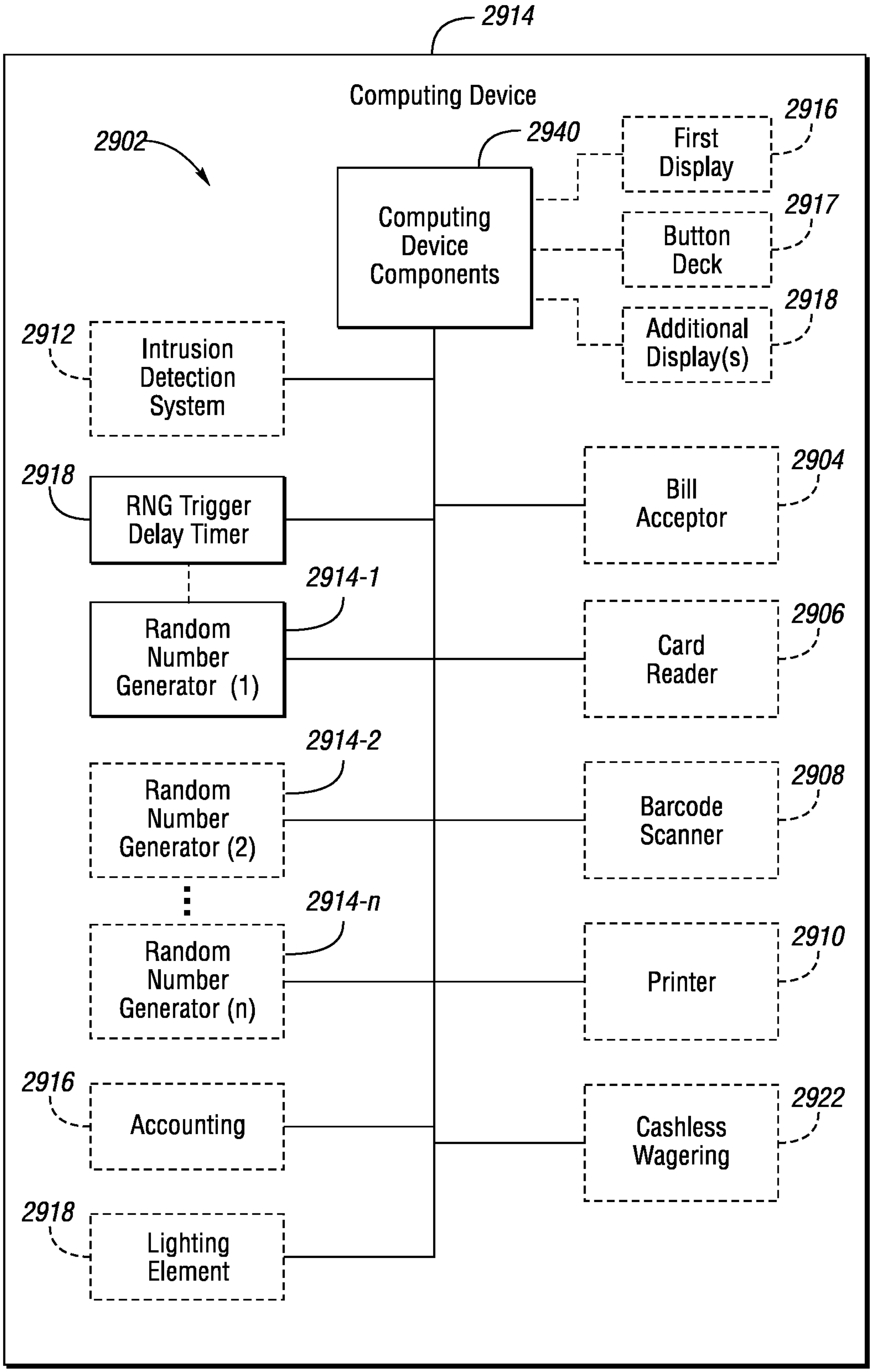
FIG. 29 is a block diagram of a gaming device that may be used with the system shown in FIG. 1 or the system shown in FIG. 2.

FIG. 29 is a block diagram of a gaming device 2914 that may be used with system 100 (shown in FIG. 1) or system 200 (shown in FIG. 2). The gaming device 2914 is a computing device 400 (such as an EGM illustrated in FIG. 3) that includes a plurality of computing device components 2902 positioned within a cabinet or other housing. In one embodiment, computing device component manager or processor 2940 include first display 2916, a button deck display 2917 and additional display(s) 2918. In addition, gaming device 2914 may include a plurality of gaming device components 2902 including a bill acceptor or bill validator 2904, cashless wagering components 2922, a card reader 2906, a barcode scanner 2908, a printer 2910, an intrusion detection system 2912, a randomization device 2914-1 or optional additional RNGs, 2914-2 and **2914-*n* (such as a plurality of RNGs or PRNGs), and an accounting interface 2916 that are positioned within, or coupled to, the cabinet or housing of the gaming device. For any of the RNGs described relating to FIG. 29**, a player may select a RNG trigger delay which effectively advances the RNG to different result sets. For example, once the RNG trigger delay timer is initiated, play of any a game may be suspended for a random or prescribed time period, e.g., 2 seconds. During this time the RNG may be advanced several thousand results by drawing and discarding results, depending on the speed of the RNG and therefore present differing game results for immediate or future game plays. Any delay in calling for a RNG result in any embodiment, will advance the RNG results as the RNG continually generates new results and therefore those results will be skipped during the delay period, whether the delay period be predetermined, random or by other means. Those skilled in the art will recognize there are numerous ways to implement the delay. During the suspension period, the delay button may include visual notification to the player such as flashing or rotating RGB lighting, sound effects, etc. For entropy-based RNGs, PRNGs or cryptographically secure pseudorandom number generator (CSPRNG) or cryptographic pseudorandom number generator (CPRNG), altering the entropy state of the system will accomplish similar goals. Those skilled in the art will recognize there are a number of ways to accomplish this, depending on the particular RNGs, PRNGs, CSPRNG or CPRNG, e.g., for/dev/random/the mere act of pushing the Change RNG button would necessarily alter the entropy state sufficiently.

Figure 30A:
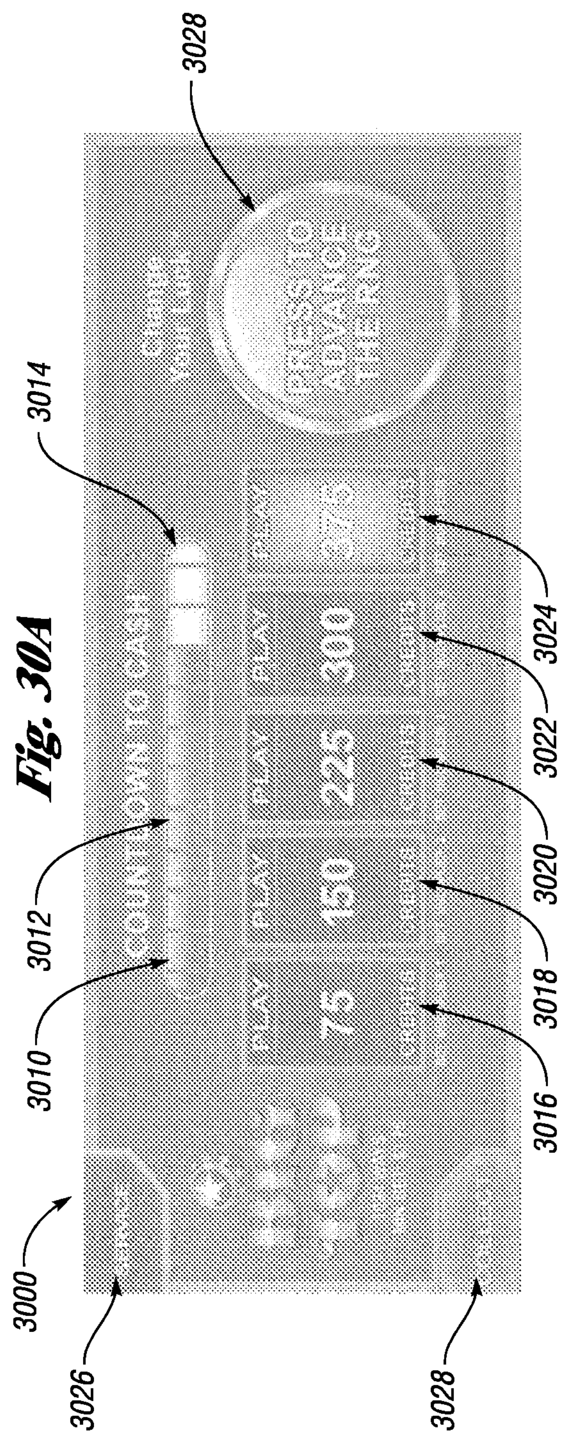
FIG. 30A includes a number of function buttons such as a service button, a collect button for a cash out operation and bet or wager amount buttons.

FIG. 30A illustrates representative metering systems located on a touch screen button deck 3000 utilizing the embodiments of the present invention. When the higher predictability increased number of smaller sub-events is implemented, a meter 3012 of some type, as well known in the art, such as circular meters, bar graphs, pie style meters, etc., may be employed which may provide the player an indication of how many smaller sub-events have occurred 3010 and therefore, how many additional sub-events need to occur to reach the trigger point 3014 to trigger the bonus or feature. For example, if the number of smaller sub-events to trigger a bonus or feature is ten, the meter illustrates, either exactly or illustratively only, the meter progressing to the trigger point 3014. These and other embodiments are adaptable to persistent style slot games as previously described and may also be adapted to other EGM games found in a casino.

FIG. 30A illustrates the meter 3012 about 80% of the way to trigger point 3014 to a bonus, feature or other award. Accordingly, a player is alerted that a bonus or feature is close to being awarded as the meter progress toward trigger point 3014. In such cases, the player visibly understands that the game is, on average, not far from awarding a bonus, feature or other award.

As detailed above, one advantage of providing sub-event wins on losing primary game outcomes is that it results in players feeling like they have won something rather than simply losing the wager. That is, while not winning a monetary or credit award related to the primary game outcome, the player has advanced the Countdown to Cash™ meter thus, on average, improving chances of reaching the triggering point for being awarded a bonus, feature or other goal. Players are thereby encouraged and therefore tend to play longer, e.g., additional time-on-device.

FIG. 30A includes a number of function buttons such as a service button 3026, a collect button 3028 for a cash out operation and bet or wager amount buttons 3016, 3018, 3020, 3022 and 3024. In addition, touch screen button deck 3000 also includes a Change Your Luck™ button 3028 which advances or delays RNG results. After a player presses the Change Your Luck™ button 3028, the processor delays, advances or even resets to an earlier result of the RNG to different result sets. For example, once the Change Your Luck™ button 3028 is initiated, play of any a game may be suspended for a random or prescribed time period, e.g., 2 seconds. In doing so, RNG results may advance several thousand results, depending on the speed of the RNG and therefore present differing game results for immediate or future game plays. During the suspension period, the delay button may include visual notification to the player such as flashing or rotating RGB lighting, sound effects, etc. Those skilled in the art will understand that there are many different types of RNGs and PRNGs, such as hardware or software based, which may be employed for slot machine games and the like. Actual or virtual RNGs may be further distinguished from one another by utilizing differing seeds or keys or seed or key algorithms, differing start times, system clock times, processor directed differing RNG enablement types, etc. In addition, those skilled in the art will recognize that the various functionalities, attributes and/or other details of the embodiments illustrated and described may be applicable to other embodiments illustrated and described. These and other embodiments are adaptable to persistent style slot games as previously described and may also be adapted to other EGM games found in a casino.

Figure 30B:
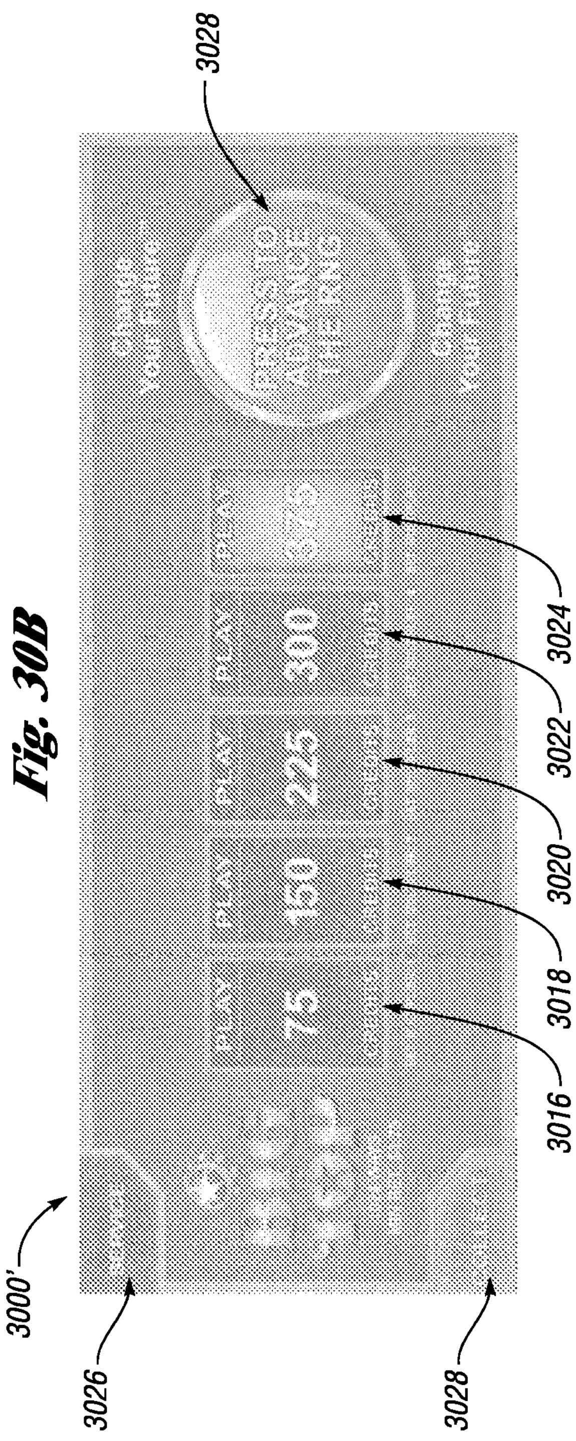
FIG. 30B illustrates a touch screen button deck similar to the touch screen button deck of FIG. 30A which does not include any Countdown to Cash functionalities.

FIG. 30B illustrates a touch screen button deck 3000' similar to the touch screen button deck of FIG. 30A which does not include any Countdown to Cash functionalities. Those skilled in the art will recognize that in addition to the embodiments illustrated herein, various alternative selection means are possible.

Figure 31:
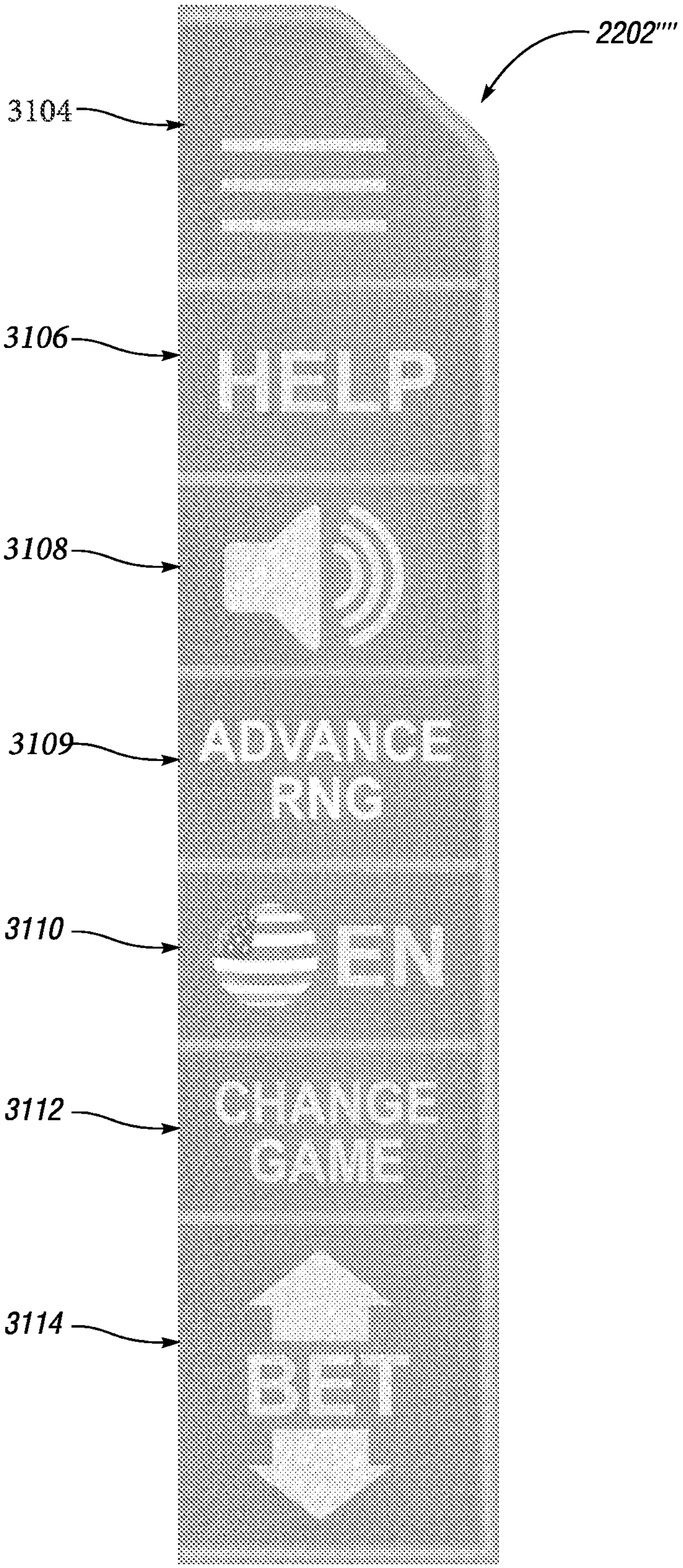
FIG. 31 illustrates a pop-up menu that appears on the game display once a player presses or touches the information and help button of EGM illustrated in FIG. 25.

FIG. 31 illustrates a pop-up menu 2502' that appears on the game display once a player presses or touches the information and help button 2502 of EGM 2500 illustrated in FIG. 25. The pop-up menu 2502' illustrated in FIG. 31 includes a return to game button 3104, a help button 3104, a sound adjust button 3106, an advance RNG button 3108, a language select button 3110, a change game button 3112 and a change bet button 3114. Pressing the Advance RNG button 3108 serves the same function of delaying or advancing the RNG as described in FIG. 29A and FIG. 29B. Those skilled in the art will recognize that text or labels describing RNG functions or functionality, such as "Press to Advance the RNG", Change Your Luck™, Change RNG, etc., are for illustration purposes only as many descriptive messages are possible leading to the same results as described herein.

Although the invention has been described in detail with reference to several embodiments, additional variations and modifications exist within the scope and spirit of the invention as described and defined in the following claims.

We claim:

1. A gaming system comprising:
- a gaming machine including a monetary input device configured to receive a physical item associated with a monetary value, a user interface, at least one processor running executable instructions related to a game of chance, a game display and memory in communication with said at least one processor;
- at least one random number generator in communication with the processor;
- wherein said at least one random number generator in communication with the processor generates random game outcomes; and
- wherein a player may selectively delay the processor from utilizing results from the at least one RNG to change a future game outcome by interacting with the gaming machine.

2. The gaming system of claim 1 wherein the delay is measured as a period of time and/or number of RNG results.

3. The gaming system of claim 1 wherein the gaming machine includes a button configured to allow the player to selectively delay the processor.

4. The gaming system of claim 3 wherein the button is located on a game display.

5. The gaming system of claim 3 wherein the button is located on a gaming machine button deck.

6. The gaming system of claim 3 wherein the button is a physical button.

7. The gaming system of claim 3 wherein the button is a virtual button located on a touch screen display.

8. The gaming system of claim 1 wherein the player selectable delay utilizing results of the at least one RNG results in a delay of the time until a new game may be initiated by a player.

9. The gaming system of claim 8 wherein the delay of time until a new game may be initiated by a player is pre-established.

10. The gaming system of claim 8 wherein the delay of time until a new game may be initiated by a player is randomly determined.

11. The gaming system of claim 1 wherein the processor is configured to notify a player that a delay utilizing results from the at least one RNG is occurring.

12. The gaming system of claim 1 wherein the processor is configured to notify a player that a delay utilizing results from the at least one RNG has ended and play may resume.

13. The gaming system of claim 1 wherein the processor is configured to notify a player that (i) a delay utilizing results from the at least one RNG is occurring and (ii) that the delay utilizing results from the at least one RNG has ended and play may resume.

14. The gaming system of claim 1 wherein the delay utilizing results from the at least one RNG changes future bonus event outcomes.

15. The gaming system of claim 1 wherein the delay utilizing results from the at least one RNG changes the outcome of future games of chance and future bonus event outcomes.

16. The gaming system of claim 1 wherein the delay of said outcome results from the at least one random number generator changes future game of chance outcomes.

17. The gaming system of claim 1 wherein the delay of said outcome results from at least one of said plurality of random number generators changes future bonus event outcomes.

18. The gaming system of claim 1 wherein the delay of said outcome results from at least one of said plurality of random number generators changes the outcome of future games of chance and future bonus event outcomes.

19. The gaming system of claim 14 wherein said bonus event is play of a bonus game.

20. The gaming system of claim 1 wherein said game of chance is a slot game, keno game, bingo game or video poker game.

21. A gaming system comprising:
- a gaming machine including a monetary input device configured to receive a physical item associated with a monetary value, a user interface, at least one processor running executable instructions related to a game of chance, a game display and memory in communication with said at least one processor;
- at least one random number generator in communication with the processor;
- wherein said at least one random number generator is in communication with the processor generates random game outcomes; and
- wherein a player may prevent game play by initiating a delay period to change a future game outcome by not utilizing RNG results during a period of game play prevention.

22. The gaming system of claim 21 wherein the delay is measured as a period of time and/or number of RNG results.

23. The gaming system of claim 21 wherein the gaming machine includes a button configured to allow the player to selectively delay the processor interacting with the gaming machine.

24. The gaming system of claim 23 wherein the button is located on a game display.

25. The gaming system of claim 23 wherein the button is located on a gaming machine button deck.

26. The gaming system of claim 23 wherein the button is a physical button.

27. The gaming system of claim 23 wherein the button is a virtual button located on a touch screen display.

28. The gaming system of claim 21 wherein the player selectable delay utilizing results of the at least one RNG results in a delay in time until a new game may be initiated by a player.

29. The gaming system of claim 21 wherein the delay period until a new game may be initiated by a player is pre-established.

30. The gaming system of claim 22 wherein the delay period until a new game may be initiated by a player is randomly determined.

31. The gaming system of claim 21 wherein the processor is configured to notify a player that a delay utilizing results from the at least one RNG is occurring.

32. The gaming system of claim 21 wherein the processor is configured to notify a player that a delay utilizing results from the at least one RNG has ended and play may resume.

33. The gaming system of claim 21 wherein the processor is configured to notify a player (i) that a delay utilizing results from the at least one RNG is occurring and (ii) that a delay utilizing results from the at least one RNG has ended and play may resume.

34. The gaming system of claim 21 wherein the delay utilizing results from the at least one RNG changes future bonus event outcomes.

35. The gaming system of claim 21 wherein the delay utilizing results from the at least one RNG changes the outcome of future games of chance and future bonus event outcomes.

36. The gaming system of claim 21 wherein the delay of said outcome results from the at least one random number generator changes future game of chance outcomes.

37. The gaming system of claim 21 wherein the delay of said outcome results from at least one of said plurality of random number generators changes future bonus event outcomes.

38. The gaming system of claim 21 wherein the delay of said outcome results from at least one of said plurality of random number generators changes the outcome of future games of chance and future bonus event outcomes.

39. The gaming system of claim 35 wherein said bonus event is play of a bonus game.

40. The gaming system of claim 21 wherein said game of chance is a slot game, keno game, bingo game or video poker game.

41. A gaming system comprising:

a gaming machine including a monetary input device configured to receive a physical item associated with a monetary value, a user interface, at least one processor running executable instructions related to a game of chance, a game display and memory in communication with said at least one processor;

at least one random number generator in communication with the processor;

wherein said at least one random number generator in communication with the processor generates random game outcomes; and wherein a player may selectively delay the processor from utilizing results from the at least one RNG to change a future game outcome by interacting with the gaming machine and preventing game play for a delay period wherein the delay period is measured as a period of time and/or number of RNG results.

42. The gaming system of claim 41 the gaming machine includes a button configured to allow the player to selectively delay the processor interacting with the gaming machine.

43. The gaming system of claim 42 wherein the button is a physical button.

44. The gaming system of claim 42 wherein the button is a virtual button located on a touch screen display.

45. The gaming system of claim 41 wherein the processor is configured to notify a player that a delay utilizing results from the at least one RNG is occurring.

46. The gaming system of claim 41 wherein the processor is configured to notify a player that a delay utilizing results from the at least one RNG has ended and play may resume.

47. The gaming system of claim 41 wherein the delay of said outcome results from the at least one random number generator changes future game of chance outcomes.

48. The gaming system of claim 41 wherein said game of chance is a slot game, keno game, bingo game or video poker game.

49. A gaming method comprising:

utilizing a monetary input device configured to receive a physical item associated with a monetary value and a user interface configured to:

enable a player to select a wager for a game of chance and enable said player to initiate a cash out operation;

at least one processor running executable instructions to operate a game of chance on a gaming machine including one or more displays and memory in communication with said at least one processor;

at least one random number generator in communication with the processor generates random game outcomes; and wherein a player may selectively delay the processor from utilizing results from the at least one RNG to change a future game outcome by interacting with the gaming machine.

50. The gaming method of claim 49 wherein the delay is measured as a period of time and/or number of RNG results.

51. The gaming method of claim 49 further comprising interacting with the gaming machine by pressing a button on the gaming machine.

52. The gaming method of claim 51 wherein the button is located on a game display.

53. The gaming method of claim 51 wherein the button is located on a gaming machine button deck.

54. The gaming method of claim 49 wherein the button is a physical button.

55. The gaming method of claim 51 wherein the button is a virtual button located on a touch screen display.

56. The gaming method of claim 49 wherein the player selectable delay utilizing results of the at least one RNG results in delaying the time until a new game may be initiated by a player.

57. The gaming method of claim 56 wherein the delay period until a new game may be initiated by a player is pre-established.

58. The gaming method of claim 56 wherein the delay period until a new game may be initiated by a player is randomly determined.

59. The gaming method of claim 49 further comprising notifying a player that a delay utilizing results from the at least one RNG is occurring.

60. The gaming method of claim 49 further comprising notifying a player that a delay utilizing results from the at least one RNG has ended and play may resume.

61. The gaming method of claim 49 further comprising notifying a player that (i) a delay utilizing results from the at least one RNG is occurring and (ii) a delay utilizing results from the at least one RNG for a period of time has ended and play may be resumed.

62. The gaming method of claim 49 wherein the delay utilizing results from the at least one RNG for a period of time delay changes future bonus event outcomes.

63. The gaming method of claim 49 wherein the delay utilizing results from the at least one RNG for a period of time delay changes the outcome of future games of chance and future bonus event outcomes.

64. The gaming method of claim 49 wherein the delay of said outcome results from the at least one random number generator changes future game of chance outcomes.

65. The gaming method of claim 49 wherein the delay of said outcome results from at least one of said plurality of random number generators changes future bonus event outcomes.

66. The gaming method of claim 50 wherein the delay of said outcome results from at least one of said plurality of random number generators changes the outcome of future games of chance and future bonus event outcomes.

67. The gaming method of claim 66 wherein said bonus event is play of a bonus game.

68. The gaming method of claim 49 wherein said game of chance is a slot game, keno game, bingo game or video poker game.

69. A gaming method comprising:

utilizing a monetary input device configured to receive a physical item associated with a monetary value and a user interface configured to:

enable a player to select a wager for a game of chance and enable said player to initiate a cash out operation;

at least one processor running executable instructions to operate a game of chance on a gaming machine including one or more displays and memory in communication with said at least one processor;

at least one random number generator in communication with the processor generates random game outcomes; and wherein a player may prevent game play by initiating a delay period to change a future game outcome by not utilizing RNG results during a period of game play prevention.

70. The gaming method of claim 69 wherein the delay is measured as a period of time and/or number of RNG results.

71. The gaming method of claim 69 further comprising interacting with the gaming machine by pressing a button on the gaming machine.

72. The gaming method of claim 71 wherein the button is located on a game display.

73. The gaming method of claim 72 wherein the button is located on a gaming machine button deck.

74. The gaming method of claim 72 wherein the button is a physical button.

75. The gaming method of claim 71 wherein the button is a virtual button located on a touch screen display.

76. The gaming method of claim 69 wherein the player selectable delay utilizing results of the at least one RNG results in delaying the time until a new game may be initiated by a player.

77. The gaming method of claim 69 wherein the delay period until a new game may be initiated by a player is pre-established.

78. The gaming method of claim 69 wherein the delay period until a new game may be initiated by a player is randomly determined.

79. The gaming method of claim 69 further comprising notifying a player that a delay utilizing results from the at least one RNG is occurring.

80. The gaming method of claim 69 further comprising notifying a player that a delay utilizing results from the at least one RNG has ended and play may resume.

81. The gaming method of claim 69 further comprising notifying a player that (i) a delay utilizing results from the at least one RNG is occurring and (ii) a delay utilizing results from the at least one RNG has ended and play may resume.

82. The gaming method of claim 69 wherein the delay utilizing results from the at least one RNG for a period of time delay changes future bonus event outcomes.

83. The gaming method of claim 69 wherein the delay utilizing results from the at least one RNG for a period of time delay changes the outcome of future games of chance and future bonus event outcomes.

84. The gaming method of claim 69 wherein the delay of said outcome results from the at least one random number generator changes future game of chance outcomes.

85. The gaming method of claim 69 wherein the delay of said outcome results from at least one of said plurality of random number generators changes future bonus event outcomes.

86. The gaming method of claim 69 wherein the delay of said outcome results from at least one of said plurality of random number generators changes the outcome of future games of chance and future bonus event outcomes.

87. The gaming method of claim 85 wherein said bonus event is play of a bonus game.

88. The gaming method of claim 69 wherein said game of chance is a slot game, keno game, bingo game or video poker game.

89. A gaming method comprising:

utilizing a monetary input device configured to receive a physical item associated with a monetary value and a user interface configured to:

enable a player to select a wager for a game of chance and enable said player to initiate a cash out operation;

at least one processor running executable instructions to operate a game of chance on a gaming machine including one or more displays and memory in communication with said at least one processor;

at least one random number generator in communication with the processor generates random game outcomes; and wherein a player may selectively delay the processor from utilizing results from the at least one RNG to change a future game outcome by interacting with the gaming machine and game play prevention for a delay period wherein the delay period is measured as a period of time and/or number of RNG results.

90. The gaming method of claim 89 further comprising interacting with the gaming machine by pressing a button on the gaming machine.

91. The gaming method of claim 90 wherein the button is a physical button.

92. The gaming method of claim 90 wherein the button is a virtual button located on a touch screen display.

93. The gaming method of claim 89 further comprising notifying a player that a delay utilizing results from the at least one RNG is occurring.

94. The gaming method of claim 89 further comprising notifying a player that a delay utilizing results from the at least one RNG has ended and play may resume.

95. The gaming method of claim 89 wherein the delay of said outcome results from the at least one random number generator changes future game of chance outcomes.

96. The gaming method of claim 89 wherein said game of chance is a slot game, keno game, bingo game or video poker game.

* * * * *